(12) United States Patent
Noguchi et al.

(10) Patent No.: US 7,506,950 B2
(45) Date of Patent: Mar. 24, 2009

(54) DATA PROCESSING APPARATUS, PRINTING APPARATUS AND METHOD OF CREATING MASK PATTERN

(75) Inventors: Eri Noguchi, Yokohama (JP); Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 11/733,374

(22) Filed: Apr. 10, 2007

(65) Prior Publication Data

US 2007/0236526 A1    Oct. 11, 2007

(30) Foreign Application Priority Data

Apr. 11, 2006  (JP) .............. 2006-108906

(51) Int. Cl.
*B41J 2/205* (2006.01)
(52) U.S. Cl. .................. 347/15; 358/1.2; 358/1.9; 347/41
(58) Field of Classification Search ......... 347/15, 347/43, 41; 358/1.2, 1.9, 3.01–3.03, 3.06, 358/501, 520
See application file for complete search history.

(56) References Cited

U.S. PATENT DOCUMENTS

| | | | |
|---|---|---|---|
| 5,594,478 A | 1/1997 | Matsubara et al. | 347/41 |
| 5,604,520 A | 2/1997 | Matsubara et al. | 347/43 |
| 5,831,642 A | 11/1998 | Matsubara et al. | 347/9 |
| 6,203,133 B1 | 3/2001 | Tanaka et al. | 347/15 |
| 6,557,964 B2 | 5/2003 | Kawatoko et al. | 347/15 |
| 6,601,939 B2 | 8/2003 | Fujita et al. | 347/15 |

FOREIGN PATENT DOCUMENTS

| | | |
|---|---|---|
| JP | 5-031922 | 2/1993 |
| JP | 9-046522 | 2/1997 |
| JP | 2002-029097 | 1/2002 |
| JP | 2002-144552 | 5/2002 |
| JP | 2005-197873 | 7/2005 |

OTHER PUBLICATIONS

Ayako Uji, et al., U.S. Appl. No. 11/695,298, filed Apr. 2, 2007.
Eri Noguchi, et al., U.S. Appl. No. 11/697,880, filed Apr. 9, 2007.
T. Mitsa, et al., "Digital Halftoning Using A Blue Noise Mask", SPIE 1452, 1991, pp. 47-56.

*Primary Examiner*—Lamson D Nguyen
(74) *Attorney, Agent, or Firm*—Fitzpatrick, Cella, Harper & Scinto

(57) ABSTRACT

A data processing apparatus includes a mask processor for performing a mask process for binary data, which is obtained by a binarization process using a dot arrangement pattern, by using mask patterns having print permitting pixels to generate binary data used for each of a plurality of scans of a print head to a same area of a print medium. A logical product pattern obtained by a logical product operation of an arrangement pattern of the print permitting pixels in at least one of the mask patterns and the dot arrangement pattern satisfies the characteristics of (a) frequency components of a low frequency region are fewer than that of a high frequency region, and (b) peaks of the frequency components do not exist in a region lower side of half of the low frequency region.

19 Claims, 43 Drawing Sheets

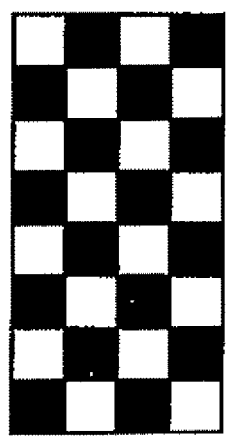
(b)
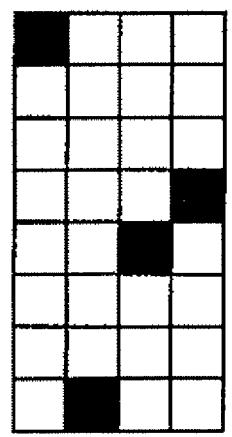
(d)
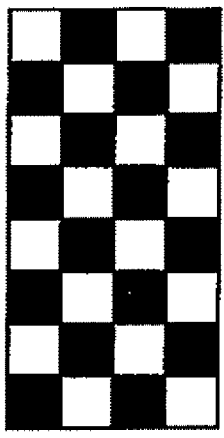
(c)
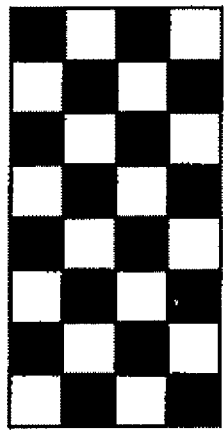
(e)
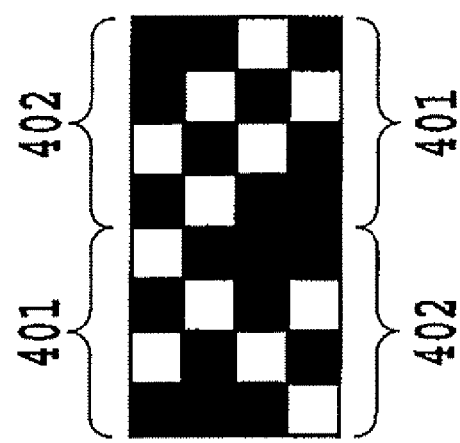
(a)
FIG. 2

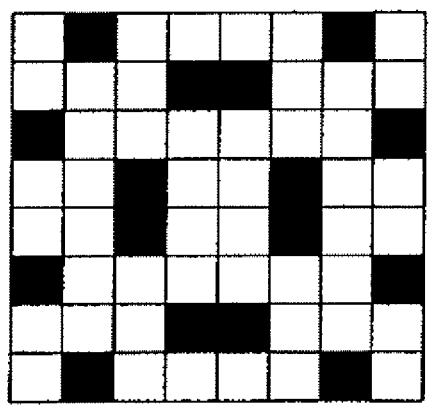
LEVEL 1
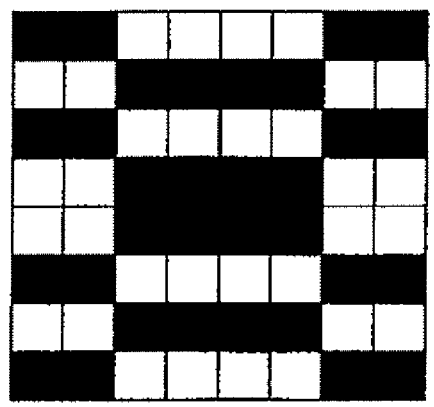
LEVEL 2
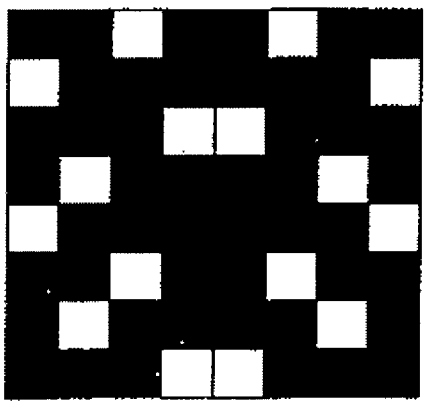
LEVEL 3
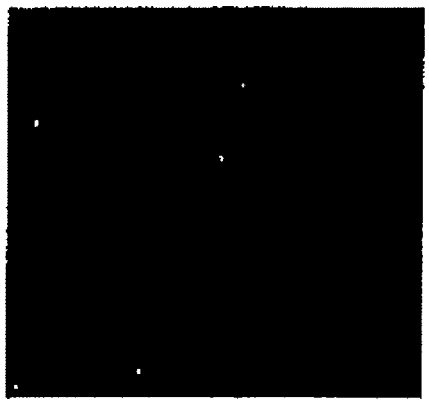
LEVEL 4
FIG.11

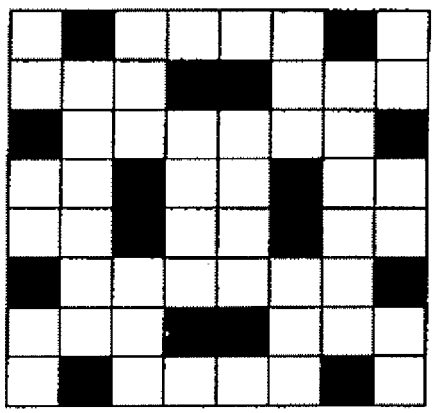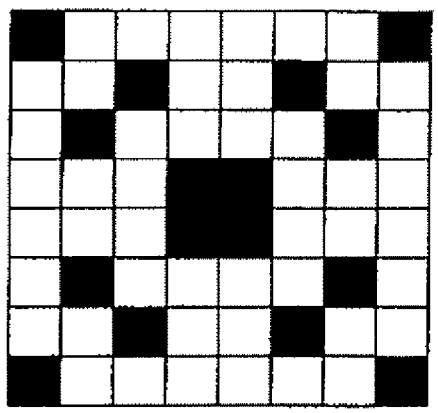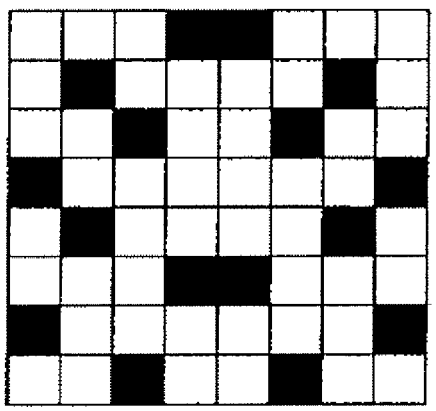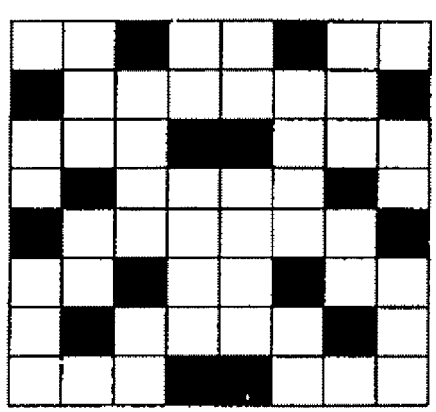
FIG.12

C 1

Y1

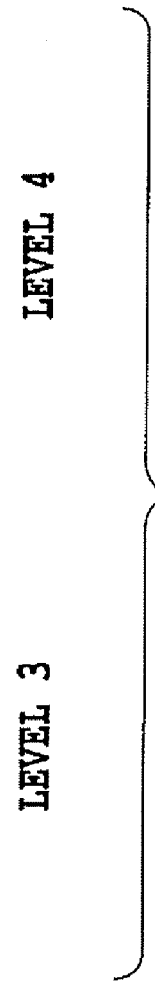
FIG.40B
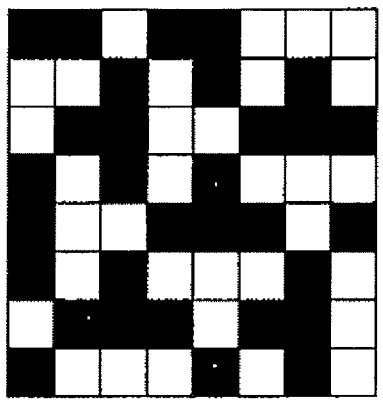
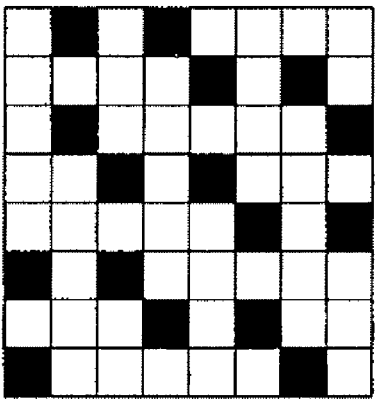
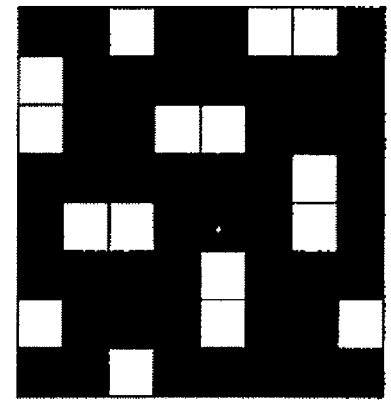
FIG.40A

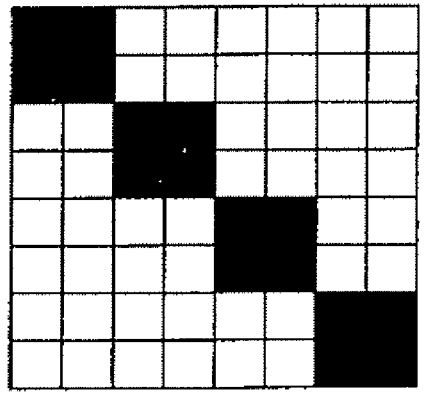
P1
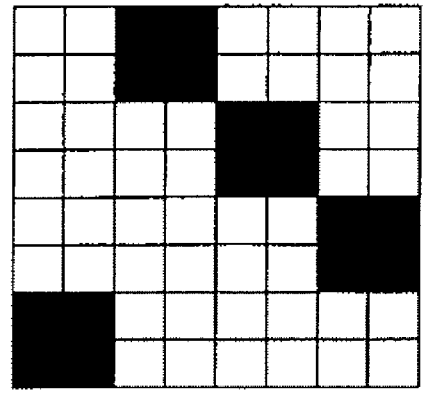
P2
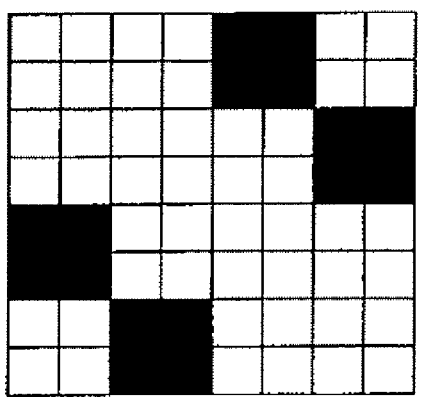
P3
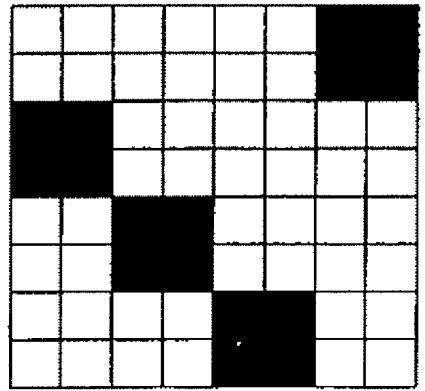
P4
FIG.41

DATA PROCESSING APPARATUS, PRINTING APPARATUS AND METHOD OF CREATING MASK PATTERN

BACKGROUND OF THE INVENTION

1. Field of the Invention

The present invention relates to a data processing apparatus, a printing apparatus and a method for creating a mask pattern. Specifically, the present invention relates to processing in which image data is converted to dot data by using a dot arrangement pattern and then the dot data is divided by using a mask pattern into a plurality of dot data, each of which will be used for each of a plurality of times of scanning of a print head.

2. Description of the Related Art

With the diffusion of information processing equipment such as personal computers in recent years, printing apparatuses as image forming terminals have also been rapidly developing and diffusing. Of those various printing apparatuses, an ink jet printing apparatus that executes ink ejection to perform printing on a print medium such as paper, cloth, plastic sheet and OHP sheet in particular has become mainstream in regard to personal use. And this is because such an ink jet printing apparatus has excellent advantages such as being of low-noise and non-impact type printing, high-density and high-speed printing operations, easy adaptable for color printing, and of low-cost.

Advances in ink jet printing technique have been facilitated image quality improvement, faster and more economical printing, thereby contributing to the diffusion of printing apparatuses into personal users. The diffusion of personal computers and digital cameras has also contributed to the diffusion of printing apparatuses. These digital cameras include the digital camera that functions alone, as well as the digital camera that is integrated into other device, for example a mobile phone. Due to such extensive diffusion, personal users have also been requiring more improvement of image quality. Particularly, in recent years, a print system in which photographs can be readily printed at home and the printed result has an image quality comparable to silver salt photographs have been required.

In ink jet printing apparatuses, granularity has so far been seen as a problem when compared to silver salt photographs. Various measures have been proposed in order to reduce such granularity. For example, known is an inkjet printing apparatus equipped with an ink system in which light cyan and light magenta whose color material concentration are lower are added to regular cyan, magenta, yellow and black. In such an ink jet printing apparatus, the granularity can be reduced by using ink such as light cyan and light magenta in a low image density region. Meanwhile, in a high image density region, a wider color reproduction range and smooth gradation can be realized by using regular cyan and magenta inks when printing.

There is another method for reducing the granularity by designing smaller size of dots to be formed on a print medium. This can be generally realized by reducing the volume of an ink droplet to be ejected from an ejection opening of a print head. In this case, it is possible to print a high resolution image without reducing printing speed by reducing the volume of ink droplets as well as having more ejection opening at higher arrangement density.

Many approaches have been proposed for binarization processing i.e. the processing in which multiple-valued data representing the image to be printed is converted to binary data indicating whether the ink droplet should be ejected to form dots on a print medium or not. Of these approaches, for example, many types of printing apparatuses have been provided in recent years, in which binarization processing is performed in two steps in such a way that quantization processing is performed to reduce the number of gradation levels to several levels in the first step and the resulting quantized data is finally binarized in the second step. In this approach, since gradation is represented by a plurality of density levels for one pixel output from a host apparatus, the approach is preferable for application in which gradation is important, such as a photographic image quality. Furthermore, this can divide the load of data processing into two steps or processes, thus enabling suppressing the reduction of processing speed even if the amount of data to be processed is increased by the increase of printing resolution and ink color types.

Several methods have been proposed and implemented; in which data is quantized to several levels of multiple-valued data and then the multiple-valued data is converted to binary data. For example, Japanese Patent Laid-open No. 9-46522 describes a method in which a dot arrangement pattern determining the printing or nonprinting of four dots for each 2×2 area is used for one pixel that can have five levels of gradation values, to execute the binarization process. This document also describes a method in which a plurality of dot arrangement patterns for each 2×2 area are prepared for the same gradation value and these dot arrangement patterns are used sequentially or randomly. According to this method, the dot arrangement pattern for each gradation is not fixed, thus reducing pseudo outlines and the "sweeping together phenomenon" that occurs at the edge part of an image. The method also can equalize the use of a plurality of printing elements provided on a print head.

Japanese Patent Laid-open No. 2002-29097 describes reducing printing time by using a print head that has two ejection opening arrays, both arrays ejecting the same color ink droplets but each array having different characteristics each other, as well as by using these two ejection opening arrays to employ the method of switching printing/nonprinting per array (column thinning out). It also discloses the method in which a plurality of different dot arrangement patterns for the same gradation value are arranged for dealing with each of various adverse effects.

In the ink jet printing apparatuses, especially in a serial-type ink jet printing apparatus for personal users, the method referred as multi-pass printing is often employed.

FIG. 1 is a diagram illustrating the multi-pass printing and schematically showing a print head and a printing pattern by scanning of the print head. The print head is designated by a reference numeral 1001, which has 16 nozzles (ejection openings) in this Figure for simplifying the description. Sixteen nozzles are divided into four nozzle groups (first to forth groups), each nozzle group including four nozzles. A mask pattern is designated by a reference numeral 1002, indicating the pixels that enable nozzles to be used for printing (print permitting pixel; i.e. mask data area which outputs data "1" representing ejection without masking that data) as black pixels. The patterns corresponding to four nozzle groups are complementary each other, so that, by superposing these patterns, the printing in the region corresponding to 4×4 pixels can be completed.

Respective patterns designated by reference numerals 1003 to 1006 illustrate the process in which an image is being completed by repeating printing scanning. After each printing scanning, a print medium is conveyed by the width of the nozzle group in the direction of an arrow in the Figure. Thus, for the same region of the print medium (the region corresponding to the width of each nozzle group), printing of an image is completed by four times of printing scanning.

During the process of manufacturing an ink jet print head, it is unavoidable that there is a slight variation of the ejecting direction and the volume of ejected ink among a plurality of nozzles. In a serial-type printing apparatus, the amount of paper conveyed during an interval between printing scanning periods may include error in a mechanism. Such variation and error can cause adverse effects on an image such as streaks and uneven density when printing is performed by ejecting ink onto the print medium. By employing multi-pass printing described above, however, these adverse effects can be reduced. Even if there are variations in the ejection characteristics of nozzles and the amount of paper conveyed, these variations can be distributed to a plurality of times of scanning, thus making streaks and uneven density less visible. FIG. 1 shows an example of 4-pass printing in which 4 times of print scans are performed for the same image area. However, multi-pass printing is not limited to 4-pass printing. Multi-pass printing maybe two-pass printing in which an image is completed by twice of print scans or may be the printing in which an image is completed by five or more times of scanning.

In addition, in the multi-pass printing, the number of dots to be printed by each printing scanning can be adjusted and the printing frequency of the nozzle that is liable to cause a problem can be reduced by devising the arrangement of a mask pattern. That is, configurations meeting various purposes can be employed apart from the purposes of preventing streaks and uneven density described above. For example, Japanese Patent Laid-open No. 2002-144552 describes masks in which the arrangement pattern of print permitting pixels of the mask is excellently dispersed. In multi-pass printing, it is known that when the printing position of a certain scan is shifted from the regular position determined relative to the printing positions of other scan, patterns (textures) by the print permitting pixels in the mask pattern applied can be visually recognized. Even in such a case, according to a mask pattern described in Japanese Patent Laid-Open No. 2002-144552, since the mask pattern that is excellently dispersed and thus visually preferable is used, the same texture as the mask pattern is not visually obtrusive or less visible, thus suppressing adverse effects on image quality.

When multi-pass printing is performed by using the dot data binarized according to the dot arrangement patterns described in Japanese Patent Laid-open Nos. 9-46522 and Nos. 2002-29097, there is a problem that uneven density occurs or a problem that the pattern of a mask pattern appears as a texture, depending on a printing image.

FIG. 2 illustrates the processing in which dot data for each of twice of scanning is created by using a mask for the image data binarized according to a dot arrangement pattern. In the Figure, pattern (a) shows four input pixels binarized according to the dot arrangement pattern as the dot arrangement pattern itself used for the binarization. One dot arrangement pattern composed of 4×2 pixels represents one gradation value by the number of dots arranged. The example in the Figure shows the four dot arrangement patterns having the same gradation value (five dots), which are composed of two species of dot arrangement patterns 401 and 402.

When mask processing is performed for the printing image expressed by these dot arrangement patterns by using masks (b) and (c) for two-pass multi-pass printing, respective dot patterns formed by respective scanning becomes patterns (d) and (e). As seen from the Figure, formed dots place a disproportionate emphasis on the pattern by one of two scanning, thus causing uneven density in a completed image. This is because the dot arrangement pattern composing a printing image and a mask pattern synchronize or interfere each other. In addition, if there is such an interference, effects of multi-pass printing for reducing variation and streaks cannot be exhibited sufficiently.

Japanese Patent Laid-open No. 5-031922 discloses one method for dealing with the similar kind of problem. This document describes that dots are thinned by using the thinning pattern of the same duty that is not synchronized with the arrangement of the specific gradation value among dot arrangements as a binary image obtained by an area coverage modulation. This can suppress the interference between the dot arrangement pattern composing an image and the mask pattern, thus preventing dots from unevenly being distributed to certain scanning.

According to the configuration for suppressing interference described in Japanese Patent Laid-open No. 5-031992, it is possible that the number of dots to be formed by each of a plurality of times of scanning is made to be equal. However, in the configuration, the relation among a plurality of dot arrangements formed by a plurality of times of scanning is not considered. Consequently, for example, the pattern of formed dots may have a certain type of geometric shape, which may make streaks and the like more visible.

As to this problem, Japanese Patent Laid-open No. 2002-144552, as described above, discloses a mask pattern in which the dispersiveness of dot arrangement is increased by mask processing that is, the document discloses a mask pattern which makes above-mentioned streaks and the like less visible. In the mask pattern described in Japanese Patent Laid-open No. 2002-144552, however, the dot arrangement of image data to be processed by that mask is not considered. That is, only the dispersibility of print permitting pixels in the mask is considered. Therefore, especially when the image to be mask-processed has certain dot arrangement pattern such as one described in Japanese Patent Laid-open No. 9-46522 and Japanese Patent Laid-open No. 2002-29097, the effects of the dot arrangement pattern can appear in a plurality of times of scanning. In this case, equal arrangement of the number of dots between a plurality of scanning is difficult to be realized although a dispersed dot arrangement can be obtained for each scanning.

In addition, in the configuration described in Japanese Patent Laid-open No. 5-031922, if gradation is represented by a simple dot arrangement of image such as the unit of relatively small number of pixels, for example, 4×4 pixels, the mask pattern that is not synchronized with the dot arrangement pattern of an image can be easily formed. If gradation is represented by the unit of relatively large number of pixels, however, the species of dot arrangement accordingly increases, so that it is difficult to form the mask pattern that is not synchronized with the dot arrangement pattern. Furthermore, it is difficult for the method described in Japanese Patent Laid-open No. 5-031922 to deal with the case where there is a plurality of patterns for representing the same duty.

SUMMARY OF THE INVENTION

The object of the present invention is to provide a data processing apparatus, a printing apparatus and a method for creating a mask that can reduce the interference of a dot arrangement pattern and a mask pattern processing the dot arrangement pattern, as well as that can make dispersibility of a dot arrangement by the mask well.

In the first aspect of the present invention, there is provided a data processing apparatus that performs a mask process for binary data, which is obtained by a binarization process using dot patterns, by using mask patterns to generate binary data used for each of a plurality of scans of a print head by which printing to a same area of a print medium is performed, said apparatus comprising: mask processing means for performing the mask process for binary data which is obtained by the binarization process using the dot patterns, by using the mask patterns having arrangements of print permitting pixels in which a logical product pattern obtained by a logical product operation of the arrangement of the print permitting pixels in the mask pattern and a dot arrangement in the dot arrangement pattern satisfies following characteristics; (a) frequency components of a low frequency region are fewer than that of a high frequency region; (b) peaks of the frequency components do not exist in a region lower side of half of the low frequency region.

In the second aspect of the present invention, there is provided a data processing apparatus that performs a mask process for binary data, which is obtained by a binarization process using dot patterns, by using mask patterns to generate binary data used for each of a plurality of scans of a print head by which printing to a same area of a print medium is performed, said apparatus comprising: mask processing means for performing the mask process for binary data which is obtained by the binarization process using the dot patterns, by using the mask patterns having arrangements of print permitting pixels in which a logical product pattern obtained by a logical product operation of the arrangement of the print permitting pixels in the mask pattern and a dot arrangement in the dot arrangement pattern satisfies following characteristics; (a) frequency components of a low frequency region are fewer than that of a high frequency region; (b) peaks of the frequency components do not exist in a region lower side of one-fourth of the low frequency region.

In the third aspect of the present invention, there is provided a data processing apparatus that performs a mask process for binary data, which is obtained by a binarization process using dot patterns, by using mask patterns to generate binary data used for each of a plurality of scans of a print head by which printing to a same area of a print medium is performed, said apparatus comprising: mask processing means for performing the mask process for binary data which is obtained by the binarization process using the dot patterns, by using the mask patterns having arrangements of print permitting pixels in which a logical product pattern obtained by a logical product operation of the arrangement of the print permitting pixels in the mask pattern and a dot arrangement in the dot arrangement pattern satisfies following characteristics; (a) frequency components of a low frequency region are fewer than that of a high frequency region; (b)peaks of the frequency components do not exist in a whole area of the low frequency region.

In the fourth aspect of the present invention, there is provided a data processing apparatus that performs a mask process for binary data, which is obtained by a binarization process using a plurality of dot patterns which correspond to different gradation levels, by using mask patterns to generate binary data used for each of a plurality of scans of a print head by which printing to a same area of a print medium is performed, said apparatus comprising: mask processing means for performing the mask process for binary data which is obtained by the binarization process using the plurality of dot patterns, by using the mask patterns having arrangements of print permitting pixels in which a logical product pattern obtained by a logical product operation of the arrangement of the print permitting pixels in the mask pattern and a dot arrangement in each of the plurality of dot arrangement patterns satisfies following characteristics; (a) frequency components of a low frequency region are fewer than that of a high frequency region; (b) peaks of the frequency components do not exist in a region lower side of one-fourth of the low frequency region.

In the fifth aspect of the present invention, there is provided a printing apparatus that performs printing by executing a plurality of scans of a print head to a same area of a print medium, said apparatus comprising: mask processing means for performing the mask process for binary data, which is obtained by the binarization process using dot patterns, by using the mask patterns, in order to divide the binary data obtained by the binarization process using the dot patterns into binary data used for each of the plurality of scans, wherein a logical product pattern obtained by a logical product operation of the arrangement of print permitting pixels in the mask pattern and a dot arrangement in the dot arrangement pattern has characteristics that frequency components of a low frequency region are fewer than that of a high frequency region and peaks of the frequency components do not exist in a region lower side of half of the low frequency region.

In the sixth aspect of the present invention, there is provided a printing apparatus that performs printing by executing a plurality of scans of a print head to a same area of a print medium, said apparatus comprising: mask processing means for performing the mask process for binary data, which is obtained by the binarization process using a plurality of dot patterns which correspond to different gradation levels, by using the mask patterns, in order to divide the binary data obtained by the binarization process using the plurality of dot patterns into binary data used for each of the plurality of scans, wherein a logical product pattern obtained by a logical product operation of the arrangement of print permitting pixels in the mask pattern and a dot arrangement in the dot arrangement pattern has characteristics that frequency components of a low frequency region are fewer than that of a high frequency region and peaks of the frequency components do not exist in a region lower side of one-fourth of the low frequency region.

In the seventh aspect of the present invention, there is provided a method of creating a mask pattern used for performing a mask process for binary data, which is obtained by a binarization process using a plurality of dot patterns which correspond to different gradation levels, to generate binary data used for each of a plurality of scans of a print head by which printing to a same area of a print medium is performed, said method comprising: a determining step of determining an arrangement of print permitting pixels in the mask pattern, wherein said determining step determines the arrangements of print permitting pixels so that a logical product pattern obtained by a logical product operation of the arrangement of the print permitting pixels in the mask pattern and a dot arrangement in each of the plurality of dot arrangement patterns has a characteristic that low frequency components of the logical product pattern are decreased.

In the eighth aspect of the present invention, there is provided a program that is read by an apparatus to cause the apparatus to function as a data processing apparatus that performs a mask process for binary data, which is obtained by a binarization process using dot patterns, by using mask patterns to generate binary data used for each of a plurality of scans of a print head by which printing to a same area of a print medium is performed, the program comprising: a code for performing the mask process for binary data which is obtained by the binarization process using the dot patterns, by using the mask patterns having arrangements of print permitting pixels in which a logical product pattern obtained by a logical product operation of the arrangement of the print permitting pixels in the mask pattern and a dot arrangement in the dot arrangement pattern has characteristics that frequency components of a low frequency region are fewer than that of a high frequency region and peaks of the frequency components do not exist in the low frequency region.

The arrangement of print permitting pixels of the mask pattern used in mask processing of the present invention is created by considering the superposing of the mask pattern on the dot pattern (logical product). More specifically, the distribution of print permitting pixels of the mask pattern is well dispersed with little low frequency components when it superposes on the dot pattern. Therefore, as to dot data of respective scanning generated by mask processing, the number of dots does not place a disproportionate emphasis on the dot data formed for a specific scanning and dots are well dispersed with in a certain region. This good dispersibility makes texture that may occur due to various factors visually unobtrusive, thus suppressing adverse effects on image quality.

Further features of the present invention will become apparent from the following description of exemplary embodiments (with reference to the attached drawings).

BRIEF DESCRIPTION OF THE DRAWINGS

FIG. 2 is a diagram showing a dot printing pattern in two-pass printing;

FIG. 11 is a diagram showing the dot arrangement patterns based on index data in accordance with the first embodiment;

FIG. 12 is a diagram showing the patterns to be considered in creating a mask, based on the dot arrangement patterns shown in FIG. 11;

FIGS. 40A and 40B are diagrams showing the dot arrangement patterns and the arrangement thereof respectively, in a fifth embodiment of the present invention;

FIG. 41 is a diagram illustrating the patterns to be considered in generating a mask in the fifth embodiment;

DESCRIPTION OF THE EMBODIMENTS

Embodiments of the present invention will be described in detail below with reference to drawings.

Figure 1:
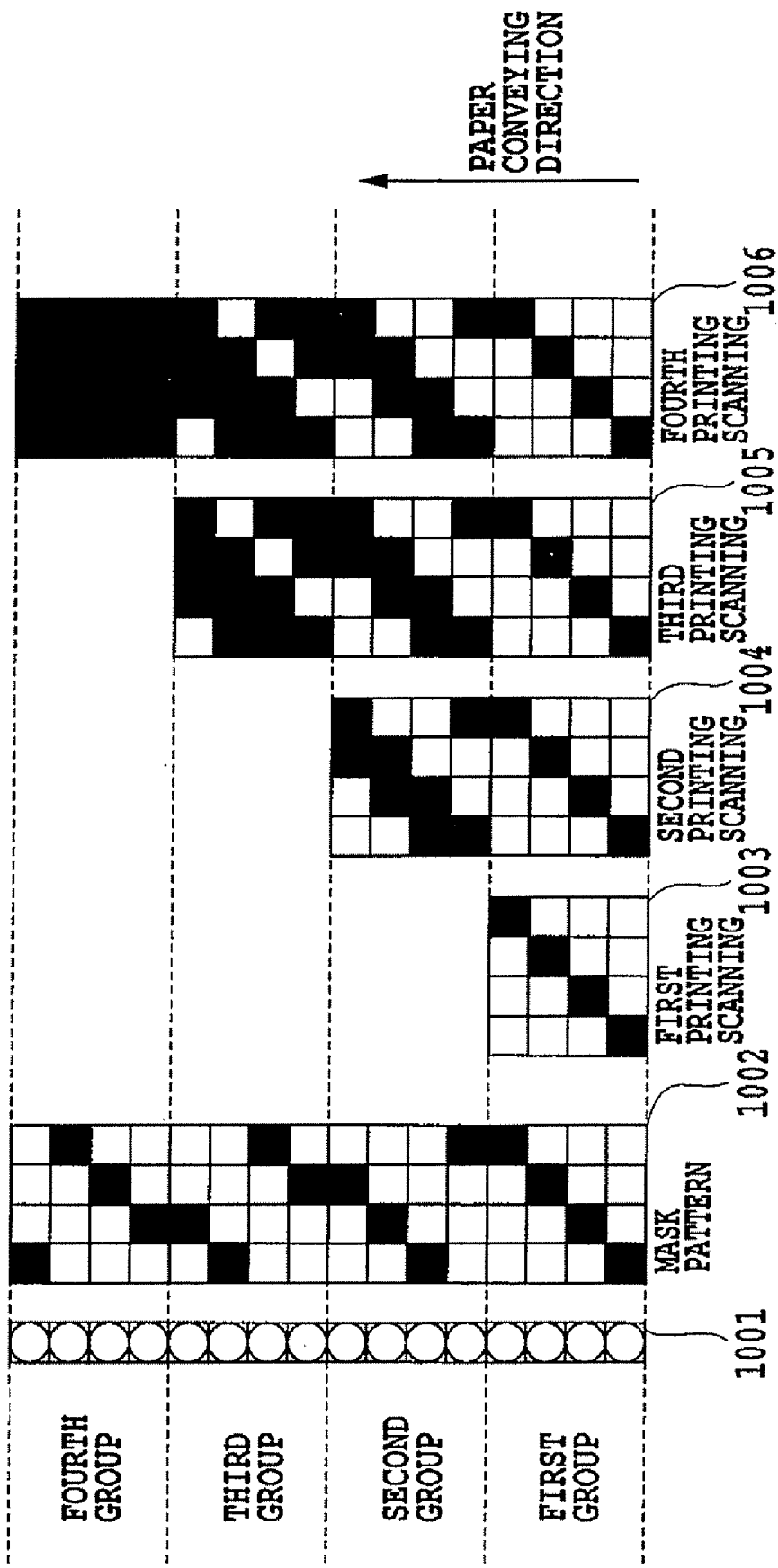
FIG. 1 is a diagram schematically showing a print head and a printing pattern in order to illustrate multi-pass printing.
Figure 3:
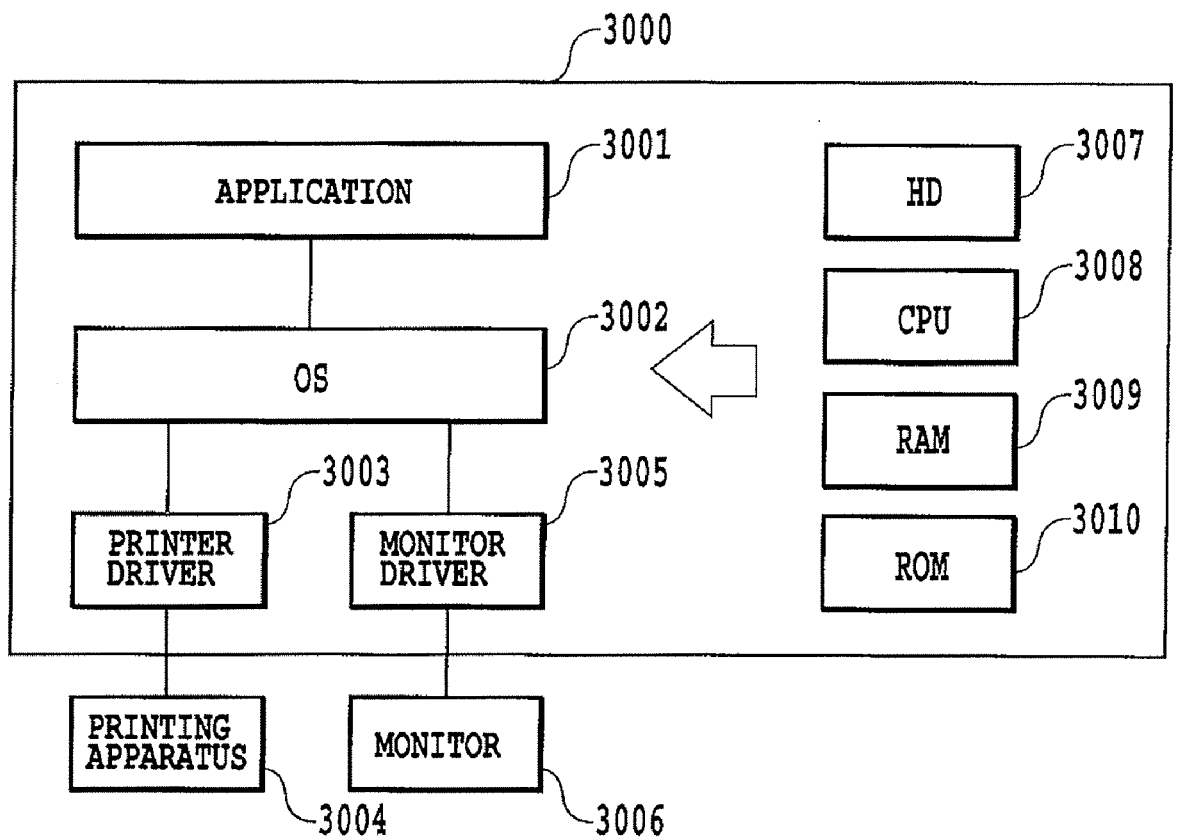
FIG. 3 is a block diagram mainly showing the configuration of hardware and software of a personal computer as an image processor in accordance with an embodiment of the present invention.

FIG. 3 is a block diagram mainly showing the configuration of hardware and software of a personal computer (hereinafter also simply referred as PC) as an image processing apparatus in accordance with an embodiment of the present invention.

In a host computer PC 3000 shown in FIG. 3, an operating system (OS) 3002 makes software i.e. application software 3001, a printer driver 3003 and a monitor driver 3005 operate. The application software 3001 performs processing such as word processing, spreadsheet and internet browsing. The monitor driver 3005 executes processing such as producing image data for being displayed on a monitor 3006.

The printer driver 3003 processes various groups of drawing instructions (image drawing instructions, text drawing instructions, graphic drawing instructions and the like) issued from the application software 3001 to OS 3002 to generate image data finally to be used in a printer 3004. Specifically, image processing, which will be described later in reference with FIG. 4 and the subsequent Figures, is executed to generate 5-value index data for color components of each of cyan (C), magenta (M), yellow (Y) and black (K) inks used in the printer 3004. In the printer 3004, the dot arrangement pattern corresponding to each value (level) of these 5 values is output based on the index data.

The host computer 3000 is equipped with CPU 3008, a hard disk (HD) 3007, RAM 3009, ROM 3010 and the like, as various types of hardware to make above-mentioned software operate. That is, CPU 3008 executes processing according to above-mentioned software programs stored in the hard disk 3007 or ROM 3010, and RAM 3009 is used as a work area when the processing is being executed.

The printer 3004 as a printing apparatus is a serial-type printer in which a print head ejecting ink scans over a print medium and ejects ink during the scan, so as to perform printing. The print head is prepared for each of inks C, M, Y and K and these print heads can scan on the print medium by being mounted on a carriage. In each print head, the arrangement density of ejection openings is 1200 dpi and each ejection opening ejects 2 pico-liters (pl) of ink droplet. The number of ejection openings of each print head is 512. In a multi-pass printing method according to this embodiment, printing is performed in the number of pass depending on each embodiment described later.

Figure 4:
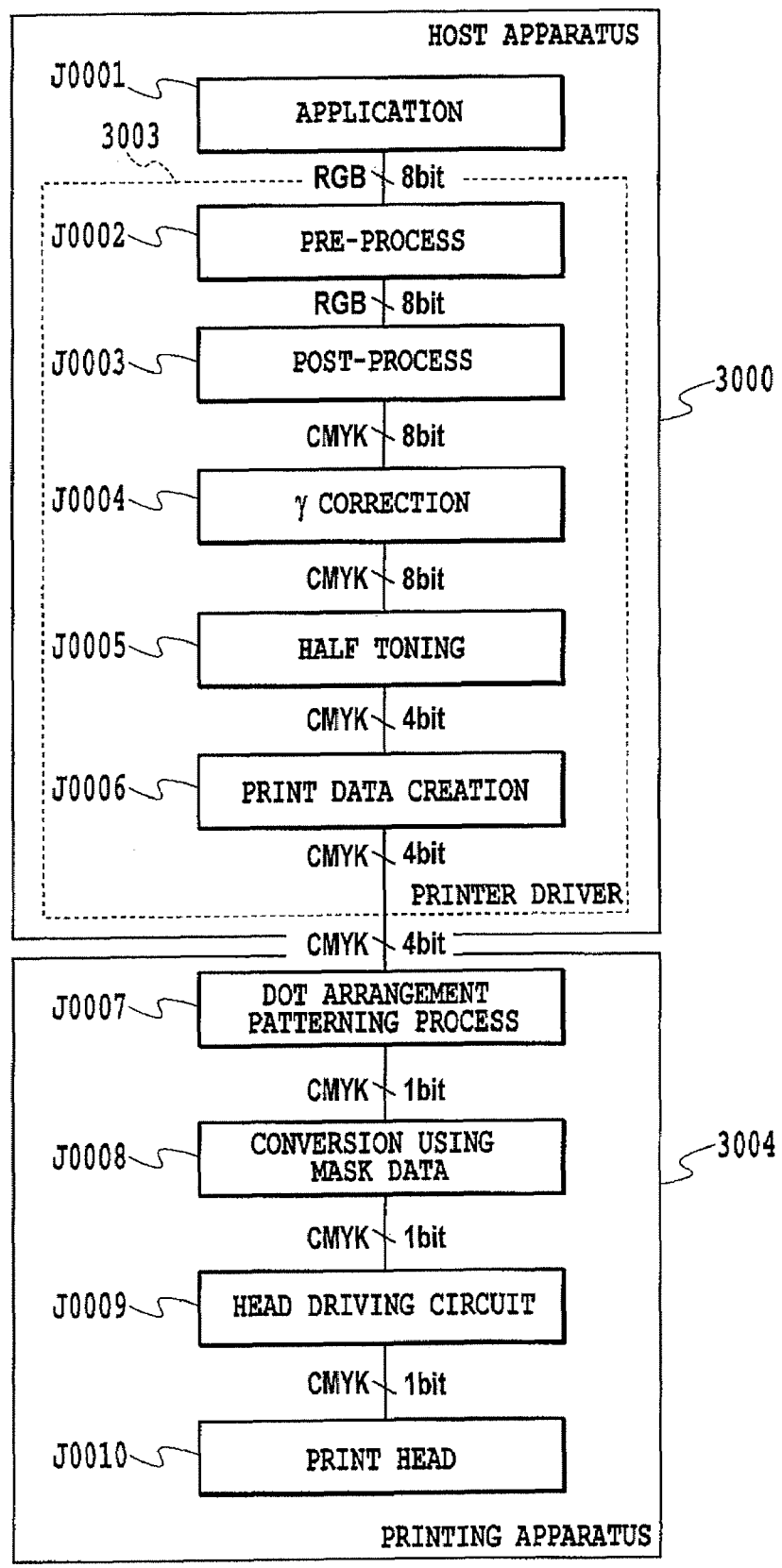
FIG. 4 is a block diagram illustrating the flow of image data conversion processing in a printing system applied in this embodiment.

FIG. 4 is a block diagram illustrating the flow of image data conversion processing in a printing system according to this embodiment. As described above in reference with FIG. 3, the printer (printing apparatus) in this embodiment is equipped with print heads J0010, each print head ejecting each of four color inks C, M, Y and K. Each processing shown in FIG. 4 is executed on the printer or a personal computer (PC) as a host apparatus.

An application J0001 executes processing for creating image data to be printed in the printer. When printing is performed, image data created by the application is transmitted to the printer driver. The printer driver has pre-process J0002, post-process J0003, γ correction J0004, half toning J0005 and print data creation J0006 as its processing. Each processing will be briefly described below.

The pre-process J0002 performs mapping of color gamut (Gamut). This processing performs data conversion for mapping the color gamut reproduced by image data R, G and B of a sRG standard to within the color gamut that can be reproduced by the printer. Specifically, 256-valued 8-bit R, G and B data is converted to 8-bit R, G and B data having different color gamut respectively, by using a three-dimensional look-up table (LUT).

Based on R, G and B data mapped into the above-mentioned color gamut, the post-process J0003 finds 8-bit color separation data Y, M and C respectively that are combination of inks for reproducing colors represented by the R, G and B data. In this processing, conversion is performed by using the three-dimensional LUT likewise as in the pre-process as well as by using interpolation calculation.

The γ correction J0004 converts the density value (gradation value) for each color component of color separation data obtained by the post-process J0003. Specifically, the conversion is performed in such a way that the above-mentioned color separation data can lineally correspond to the gradation characteristics of the printer, by using a one-dimensional LUT.

The half toning J0005 quantizes each of 8-bit color separation data Y, M and C into each of 4-bit data by performing quantization processing. In this embodiment, 256-valued 8-bit data is converted into 5-valued 4-bit data by using a multiple-valued error diffusion method. This 4-bit data is gradation value information as an index for conversion processing to a dot arrangement pattern i.e. a binarization processing in the printer.

The print data creation processing J0006 creates print data by adding printing control information to printing image information whose content is above-mentioned 4-bit index data.

When print data is sent to the printer by above-mentioned processing in the host apparatus, the printer performs dot arrangement patterning process J0007 and conversion using mask data J0008 for the input print data.

The dot arrangement patterning process J0007 performs binarization processing by outputting dot arrangement patterns, based on 5-valued index data. This enables the binary information as to whether ink should be ejected or not, which is used by the printer in printing, to be obtained.

Figure 5:
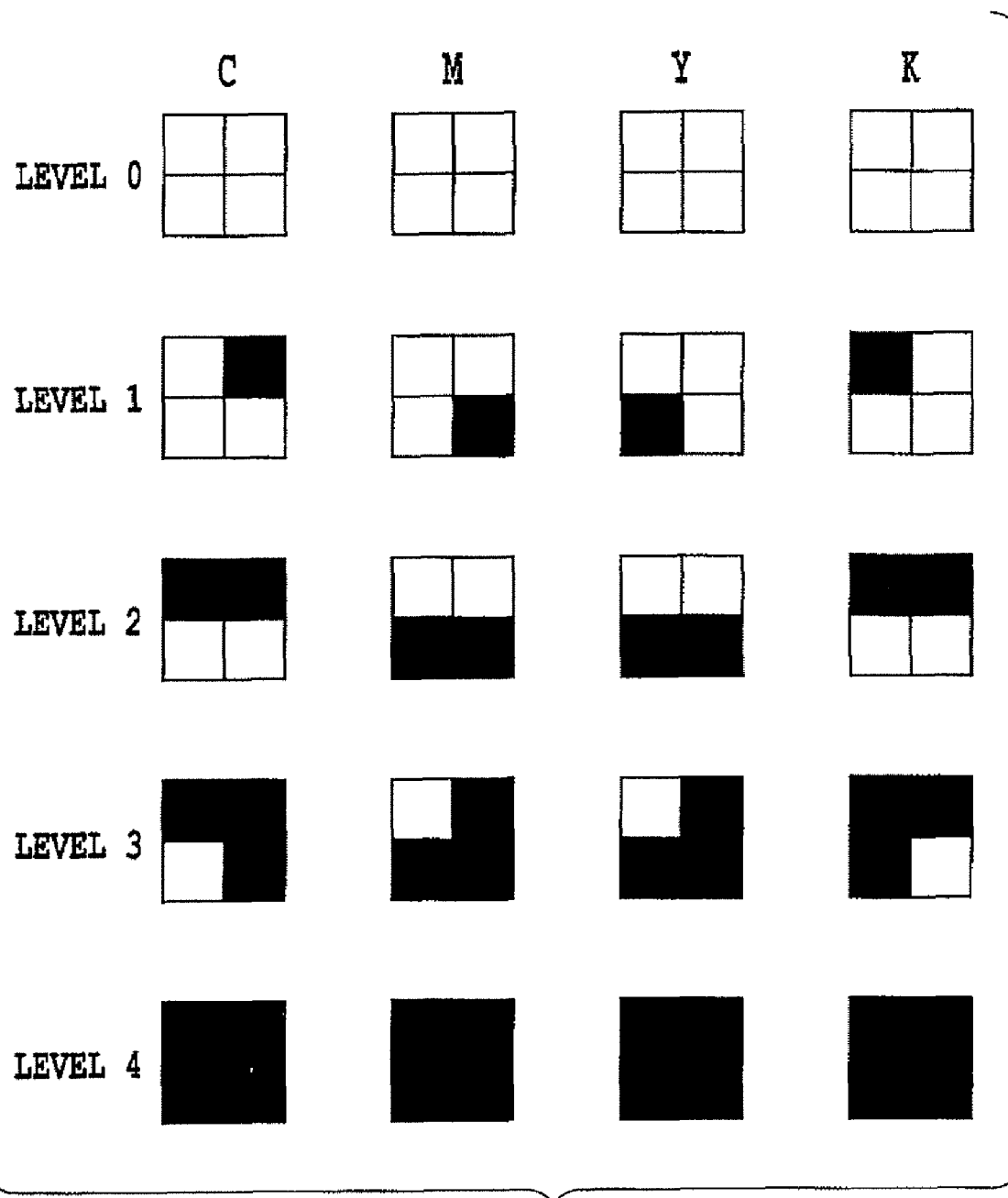
FIG. 5 is a diagram showing dot arrangement patterns based on index data in the embodiment.

FIG. 5 is a diagram showing dot arrangement patterns based on 5-valued index data in this embodiment. The dot arrangement patterns are determined for each of 5 values of gradation levels 0 to 4 indicated by index data for each of C, M, Y and K.

A 2×2 output pixel composed of 2 longitudinal pixels by 2 lateral pixels, shown in the Figure, corresponds to one input pixel that was output by the half toning processing. The size of this input pixel corresponds to pixel density of 600 dpi (dot/inch) both longitudinally and laterally. Each of a plurality of pixels composing one input pixel is an area where printing/nonprinting of dots (ejection/non-ejection of ink) is defined. A "black" area indicates pixels in which printing of dots are allowed (print permitting pixels) while a "white" area indicates pixels in which printing of dots are not allowed (non-print permitting pixels). The number of print permitting pixels by which dot printing is defined is determined depending on one of value of levels 1 to 4 indicated by index data.

One pixel of these dot arrangement patterns corresponds to the size of printing density of 1200 dpi (longitudinally) by 1200 dpi (laterally) in the printer in this embodiment. That is, the printer of this embodiment has a specification that one ink droplet of 2 pl is ejected from the print head of each color to form one dot for one pixel of 20 µm longitudinally by 10 µm laterally. The dot arrangement patterning process J0007 performs the processing for binarizing 5-valued data by using above-mentioned dot arrangement patterns to generate one-bit ejection data of "1" or "0" regarding the ejection opening corresponding to each area and a printing column.

When the dot arrangement patterning process is actually performed, as described later in reference with Figures such as FIG. 11, 2×2 patterns whose positions of "black" areas are different in dot arrangement patterns of each gradation level, shown in FIG. 5, are applied depending on the position and level of an input pixel.

Then, the conversion using mask data J0008 performs mask processing for the dot arrangement of each color determined by the dot arrangement patterning process J0007, by using a plurality of mask patterns, each of which is complementary each other. This generates ejection data for each scanning, composing multi-pass for each of C, M, Y and K colors. In the mask pattern used in this processing, as described in detail later in reference with FIG. 6 and subsequent Figures, its interference with the dot arrangement pattern used in the dot arrangement patterning process J0007 is reduced and the dispersibility of the print permitting pixel pattern of the mask itself is increased. Furthermore, in masks of a second embodiment of the present invention, which will be described later, in addition to above-mentioned features, the interference between respective patterns of a plurality of masks is also reduced.

The ejection data obtained by mask processing is supplied to a head driving circuit J0009 at appropriate timing for each of a plurality of times of scanning of multi-pass printing. One bit data of each color input into the head driving circuit J0009 is converted into driving pulses for the print heads J0010 and ink is ejected from each print head J0010 for each color at predetermined timing. Thus ink ejection depending on ejection data is performed to print an image on the print medium. In this embodiment, a plurality of mask data corresponding to a plurality of printing modes is stored in the memory of the printer. Further, the above-mentioned dot arrangement patterning process and conversion using mask data in the printer are executed by using their dedicated hardware circuits and under the control of CPU composing the control section of the printing apparatus. The printer that mainly performs conversion using mask data composes a data processing apparatus.

Several embodiments of methods for creating a mask pattern to be used or created in the above-mentioned printing system and of mask patterns according to the methods will be described below. Before that, the basic method for creating the mask pattern and the concept of a calculation repulsive force used therein will be described.

(Method of Creating Mask)

In the basic method for creating a mask described below, both a mask in which print permitting pixels are arranged and a dot arrangement pattern in which dots are arranged and which has the same size as that of the mask are referred as "plane" in order to simplify the description. Both print permitting pixels and dots that are arranged in these patterns are referred as simply "dot".

In the method of creating the masks according to the embodiment of the invention, for the planes of the masks and the dot arrangement pattern, first, the three planes of planes A1, A2 and A3 are set as shown in FIGS. 6A-6D. Then, repulsive forces are exerted between the dots within the identical plane and between the dots in the respective different planes. Also, the superposition of the dots of the different planes is permitted, and a repulsive force is exerted between such superposed dots. Thus, the arrangements of the dots within the respective planes are determined.

A method of determining the arrangements of the dots in the planes is broadly classified into two methods; a method which simultaneously determines arrangements of a plurality of planes (simultaneous generation), and a method which sequentially determines the arrangements of the respective planes (plane-by-plane generation). Moreover, for each of the above two generation methods, a manner of determining the arrangement of dots includes a method of arranging all the dots in the plane in a predetermined way and moving the arrangement, while making the entire plane being generated more dispersive (this method is hereinafter be referred to as an "arrangement moving method"). As other method, a method can be executed in which each dot is placed while making the entire plane being generated more dispersive (this method is hereinafter referred to as a "sequential arrangement method").

(Arrangement Moving Method)

The outline of an arrangement determination process for dots that is based on the arrangement moving method is as stated below.

For example, in case of determining the arrangements of the dots in the plane whose arrangement rate is 50%, an initial arrangement in which 1 bit data each being "1" are allocated at 50% of allocable positions is obtained by a binarization process, such as an error diffusion method, as to each of planes A1, A2 and A3. It should be noted that the reasons why the initial arrangements of the dots are obtained by employing the binarization technique are that the arrangements whose dispersiveness is favorable in an initial state to some extent can be obtained in correspondence with the binarization technique employed, and that a calculation time period or convergence time period till the final arrangement determination can be shortened in this way. In other words, the method of obtaining the initial arrangements is not essential in applying the present invention, but it is also allowed to adopt, for example, an initial arrangement in which the 1 bit data being "1" are allocated at random in the plane.

Then, a repulsive potential is calculated for all the dots in each of the planes A1, A2, A3 obtained as described above. Specifically, (i) Repulsive force is applied to the dots of the same plane depending on the distance between these dots.

(ii) Also, repulsive force is applied to the dots of different planes.

(iii) Different repulsive force is applied for the same plane and the different planes.

(iv) Dots of different planes are allowed to overlap one another, and repulsive force is applied to overlapping dots (two, three, or more dots) according to combinations of the overlapping dots.

Figure 7:
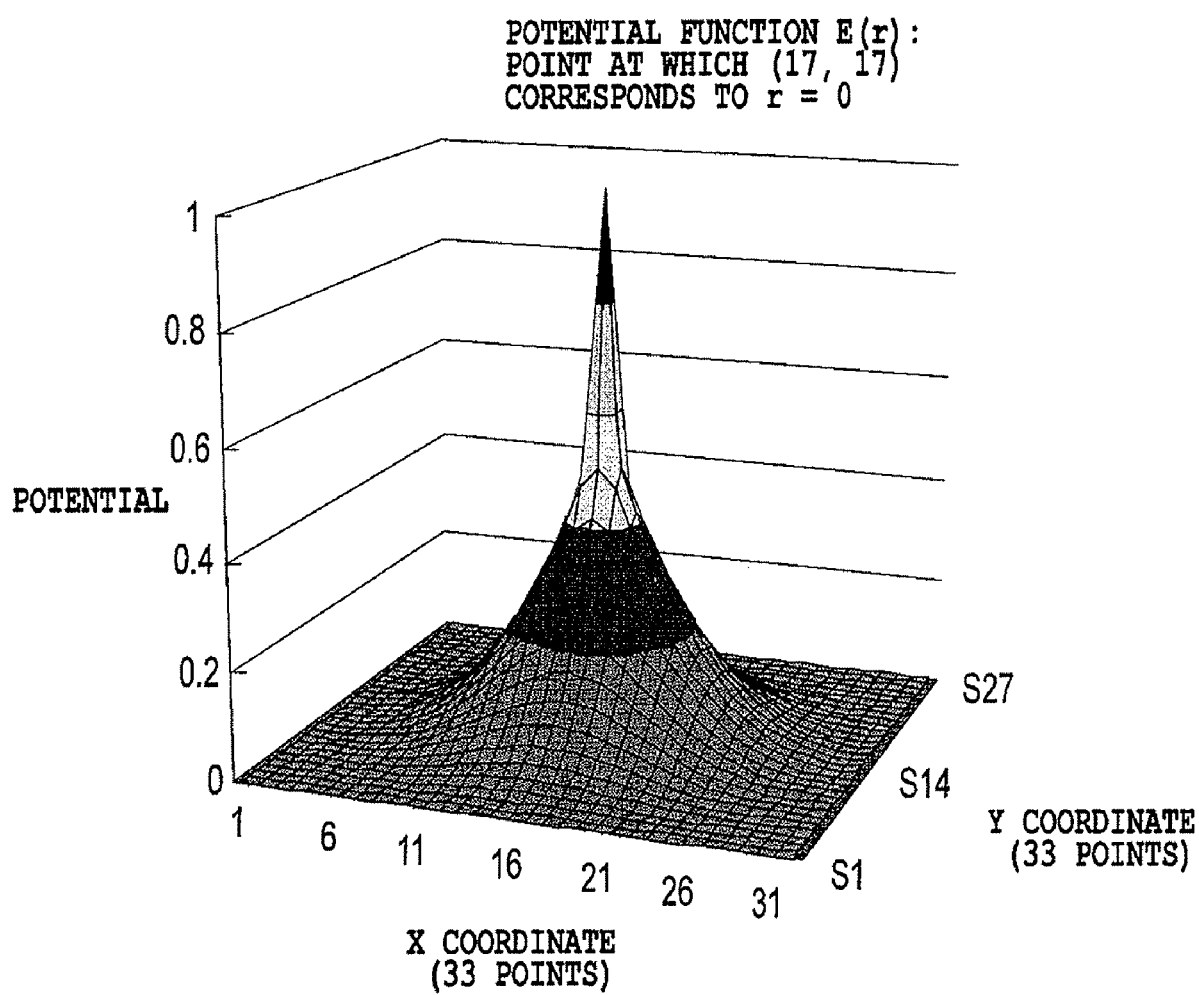
FIG. 7 is a view schematically showing the function of basic repulsive potential E(r) in accordance with this embodiment.

FIG. 7 is a diagram schematically showing a function for a basic repulsive potential E(r) according to the present embodiment.

As shown in FIG. 7, for the repulsive force function that is defined in the present embodiment, the coverage of the repulsive force is up to r=16 (16 positions on which dots are arranged). The potential that attenuates depending on the distance basically brings a high energy state, that is, an unstable state when dots are arranged close to one another. Thus, the convergence calculation makes it possible to avoid selection of a dense arrangement as much as possible. The shape of the repulsive force is more desirably determined by the ratio of the dots to all the allocable positions.

Further, in the case of considering the arrangement of the dot in which plural dots overlap one another, it may occur that the number of positions where dots are arranged exceed that of positions where dots can be arranged (for a resolution of 1200 dpi (dot/inch), 1200×1200 possible positions in a 1-inch square), and then the arranged dots are made overlapped each other. Accordingly, in calculating the repulsive potential of each dot, considerations need to be given for possible overlapping of dots each other. Thus, the function is defined so as to have a finite repulsive potential at r=0. This enables dispersion with possible overlapping of dots taken into account.

The present embodiment executes calculations such that a repulsive potential αE(r) is applied to the dots on the same plane, a repulsive potential βE(r) is applied to the dots on different planes, and a repulsive potential γs(n)E(r) is applied to overlapping dots. More specifically, a repulsive potential resulting from the presence of a certain dot is what is obtained by adding following potentials to the above repulsive potential: the repulsive potentials of dots on the same plane, dots on different planes, and an overlapping dots on different planes, respectively within the distance r from the certain dot.

For the above repulsive potentials, coefficients α, β, and γ are weighting coefficients and in the present embodiment, α=3, β=1, and γ=3. The values α, β and γ affect the dispersiveness of dots. The values α, β and γ can be actually determined by, for example, experimental optimization based on print images printed using the masks.

The coefficients (n) is used for an multiplying in addition to γ in order to disperse overlapping dots. The coefficient s(n) has a value corresponding to the number of overlaps so as to increase the degree of dispersion of the dots consistently with the number of overlaps. The present inventor experiments show that an appropriate dispersion can be achieved by using s(n) determined by either of the two equations:

$$s(n) = \sum_{i=1}^{n} nCi \text{ or } s(n) = \sum_{i=1}^{n-1} nCi \quad \text{[Equation 1]}$$

That is, when the n denotes the number of overlaps, the sum of numbers of combinations is denoted by s(n). Specifically, for an object dot for which repulsive force is to be calculated, overlapping dots (which are located at the same position as that of the object dot on the same plane or different planes) and overlapping dots located at the distance r from the object dot are searched. In this case, n denotes the number of overlaps common to overlapping of the object dot and the dot on the same plane and the different planes, which overlap the object dot at the same position, and overlapping of the dots which are located at the distance r from the object dot, on respective planes, and overlap each other in the same manner. Then, for these two positions, repulsive forces resulting from the overlapping dots are considered.

In the case of considering an example in which for two positions, dots are present commonly on a first plane, a second plane and a third plane, n is defined as 3. Then, repulsive force attributed to the overlapping of the three dots is allowed to act on these positions. Here, when the repulsive force resulting from the overlapping of the three dots is considered, the repulsive force of the overlapping of every two dots and the repulsive force of each dot are considered to act in a multiplexing manner together with the repulsive force of the overlapping of the three dots. In other words, with the plane A3 not taken into account, the overlapping may be considered to occur between two dots on the first plane and the second plane. With the second plane not taken into account, the overlapping may be considered to be the one between two dots on the first plane and the third plane. With the first plane not taken into account, the overlapping may be considered to occur between two dots on the second plane and the third plane. To calculate the multiplexing effect of overlapping of the dots, the repulsive force resulting from the combination of overlaps is defined and s(n) such as the one described above is used. The experiments show that this makes it possible to provide a highly dispersive dot arrangement.

When the total energy is determined which is equal to the sum of the repulsive potentials of all the dots, as described above, processing is executed to reduce the total energy.

This processing involves sequentially shifting each of the dots to one of the allocable positions located at a distance r of at most 4, at which position the repulsive potential of the shifted dot most decreases. This processing is repeated to reduce the total energy that is equal to the sum of the repulsive potentials of all the dots. In other words, the process of gradually reducing the total energy corresponds to the process of sequentially making the arrangement of the dots more dispersive, that is, the process of gradually reducing low frequency components of the dots.

Then, the rate of a decrease in total energy is calculated. If the rate is determined to be equal to or less than a predetermined value, the energy attenuating process is ended. It should be noted that the predetermined value can be determined, for example, on the basis of the results of actual printing and corresponds to a decrease rate at which an image with appropriately reduced low frequency components can be printed. Finally, respective planes with the rate of a decrease in total energy equal to or less than the predetermined value are set as final arrangements of the dots.

FIGS. 6A to 6D are diagrams schematically showing the repulsive potential calculation and total energy attenuating process, described above. More specifically, these figures include perspective views showing the three planes A1, A2, and A3 according to the present embodiment and plan views specifically showing movement of the dots. In the figures, the smallest squares show allocable positions of the dots. Positions overlapping each other among three overlapping planes correspond to the same allocable positions among the planes.

Figure 6A:
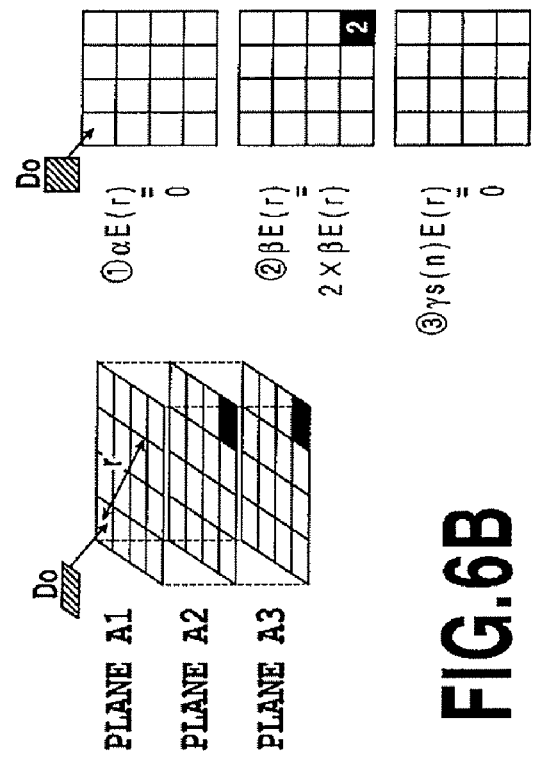
FIGS. 6A to 6D are diagrams schematically showing the calculation of repulsive potential and the attenuation processing of total energy.

FIG. 6A illustrates that when dots are present on the same plane, the repulsive force of these dots is added to (increases) the repulsive potential. In the example shown in the figure, one dot is present on the same plane A1 on which the dot Do of an object position is present at the distance r from that position. In this case, α=3 is applied, and a potential 1×αE(r) is added as the potential of the object dot Do.

Figure 6B:
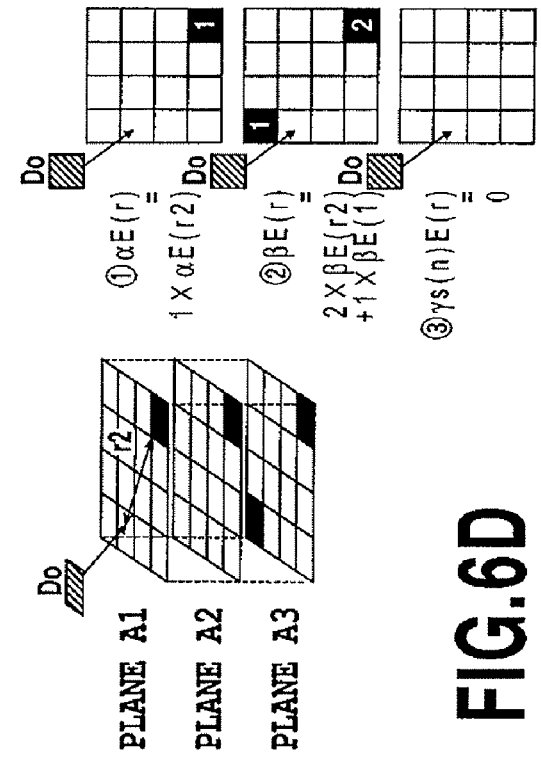

FIG. 6B is a diagram illustrating that dots a represent on planes (planes A2 and A3) different from that on which the object dot Do is present and that a repulsive potential is added on the basis of the relationship between the object dot and these two dots. The relationship between the object dot and these two dots is that between different planes. Then, β=1 is applied and a potential 2×βE(r) corresponding to the two dots is added.

Figure 6C:
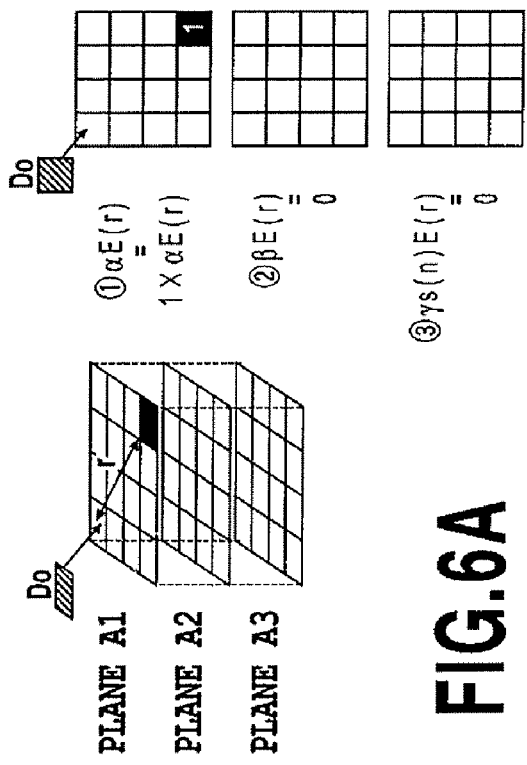

FIG. 6C is a diagram illustrating that dots a represent on the same plane on which the object dots is present and on planes different from that on which the object dot is present as is the case with the above two figures, and in addition, a dot is present on the same position of a different plane and then that dot and the object dot overlap each another, and illustrating the repulsive potential based on the relationship among these dots. Not only the conditions shown in FIGS. 6A and 6B are met but an dot is present at the same position on the plane A3, which is different from the plane A1 with the object dot Do present. Thus, the following potentials are added: the repulsive potential 1×αE(r) of one dot on the same plane, the repulsive potential 1×βE(0) of one dot on the different plane at the same position, the repulsive potential 2×βE(r) of two dots on the different planes, and the repulsive potential γs(2)× E(r) of overlapping to which γ=3 is applied at a overlap number n=2. As s result, in the dot arrangement shown in FIG. 5C, the sum of the repulsive potentials associated with the presence of the object dot Do is 1×βE(0)+1×αE(r)+2×βE(r)+ γs(2)×E(r).

Figure 6D:
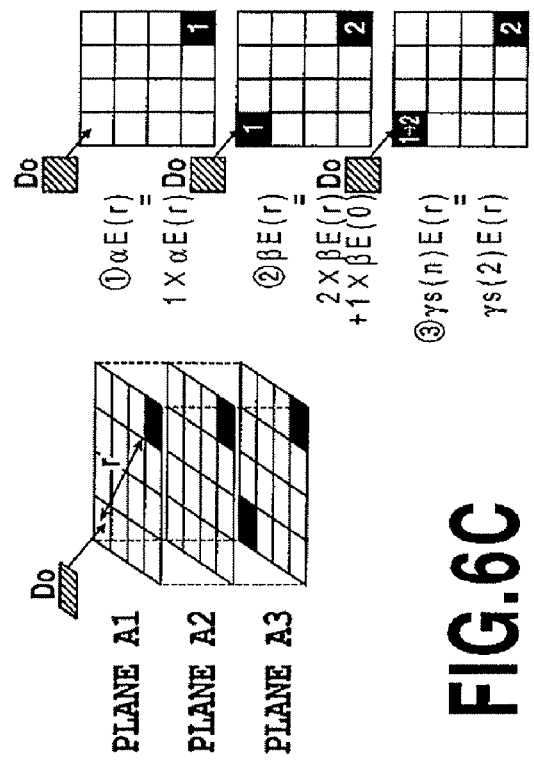

FIG. 6D is a diagram illustrating that in the dot arrangement shown in FIG. 6C, movement of the dot Do changes the sum of repulsive potentials of this dot. As shown in FIG. 6D, when the dot Do (located on the plane A1) shifts to an adjacent position on the same plane, the sum of the repulsive potentials associated with the presence of the dot Do changes into βE(1)+1×αE(r2)+2×βE(r2) because the distance changes into r2 from r and the number n of overlaps becomes 0. For the dot arrangement shown in FIG. 6C, the sum of the repulsive potentials 1×βE(0)+2×βE(r)+1×αE(r)+γs(2)×E(r) is compared with the sum of the repulsive potentials resulting from movement of the dot Do in FIG. 6D. This determines a change in the sum of the repulsive potentials after the movement.

In the above description, the sum of the repulsive potentials is obtained by determining the sum of energies of the dots between two positions, or of the dots among three positions when the dot is moved. However, this is for simplification and the sum of the repulsive potentials is of course obtained by integrating the repulsive potentials on the basis of the relationship between the dot of interest and dots including those of other possible positions other than the above dots.

If, of the dots for each of which the sum of the repulsive potentials is calculated as shown in FIGS. 6A to 6C, for example the dot Do shows the largest repulsive potential sum, changes in repulsive potential after the movement of the position of the pattern Do is determined as described in FIG. 6D and the dot Do is moved to the position with most decreasing of repulsive potential sum. This processing is repeated to enable a reduction in the total energy of the three planes. That is, the dot arrangement of the superposing of the three planes is appropriately distributed with few low frequency components.

The dots are appropriately dispersed among the three superposed planes A1, A2, and A3, and thus, the dots are also appropriately dispersed among the complementary masks in the case that these three masks are respectively masks for the multi-pass print of two-passes. Further, the dots of superposing of an arbitrary number (2, 3, 4, or 5) of these 6 planes are also appropriately dispersed and have few low frequency components.

In the above description, the arrangement moving method is applied to three plane masks which are used for the first pass and which are included in the masks for two passes. However, the arrangement moving method is not limited to this aspect but is applicable to all the planes to determine the arrangement of the dots. For the masks for two pass printing according to the present embodiment, the arrangement moving method is applicable to six plane masks for two passes. In this case, the range within which the dots are moved is not limited to nearby pixels. Arranged pixels may be moved on the basis of the relationship between the corresponding dots on different planes. Specifically, for example, a dot on one plane may be moved to a pixel on the same plane on which no dot is placed, and a dot placed on a pixel of another plane which corresponds to the moved pixel may be moved to a pixel on the same plane which corresponds the pixel on which the above dot was located. This makes it possible to change the arrangement relationship among the dots on all the planes involved in the repulsive potential calculation. Consequently, the positions of the dots can be changed to one another so as to minimize the potential energy.

(Sequential Arrangement Method)

This method is a method which sequentially arranges dots in a part of a plane where no dots have been arranged yet, as described above. This method sequentially places an dot on three planes one by one, for example, shown in FIGS. 6A to 6C and repeats this operation to arrange the dots according to arrangement rate of each plane. In this case, before a dot has been arranged, calculation is made of the possible repulsive potential between the dot of that position and each of the dots already arranged on the planes A1, A2, and A3. The repulsive potential can be calculated in the same manner as described above for the arrangement moving method. The difference between the present method and the arrangement moving method is that with reference to the example shown in FIGS. 6A to 6C, if in contrast to the above arrangement moving method, the dot Do, shown in these figures, has not been placed yet but is to be newly placed, the repulsive potential is calculated on the basis of the relationship between the dot Do and dots already arranged on the same plane A1 and on the different plane A2 or A3. As is also apparent from the description, at the initial stage where no dots have been arranged yet, the repulsive potential has the same value regardless of the position of the dot.

Next, among the repulsive potentials calculated under the assumption that the dot is placed on each of positions of the planes, a position having the minimum potential energy is determined. If plural positions show the minimum energy, random numbers are used to determine one of the plural positions. In the present embodiment, the position with the minimum energy is determined under the condition that on the same plane, no dot is placed on a position on which an dot has already been placed. This is because depending on a parameter such as the weighting coefficient or repulsive potential function, in the repulsive potential calculation, overlapping of dots on the same plane may result in the minimum energy as a result of the relationship between the object dot and dots on the other planes and because in this case, the overlapping is prohibited because only one dot is allowed to be placed on one position. An dot is placed on the determined position with the minimum potential energy. That is, data on that position is set to "1". Then, the method determines whether or not one dot has been placed on each of the planes A1, A2, A3. If this placement has not been finished, the processing is repeated.

When one dot has been sequentially placed on the planes A1, A2, and A3 in this order, the method determines whether or not dots have been arranged on up to 50% of all allocable positions. Once 50% of the dots have been arranged on each of the three planes, the present process is finished.

The above described sequential arrangement method also makes it possible to produce planes having characteristics similar to those of planes produced by the above arrangement moving method. That is, for the three planes obtained by the sequential arrangement method, the dots are appropriately dispersed in the superposed planes.

The above plane generating methods are further characterized by generating no such a periodic pattern as has regularly repeated dot arrangements. These methods do not generate, for example, such a periodic pattern as has repeated any checker pattern or any repeated Beyer type arrangements. Even if such a pattern is generated, re-setting the repulsive potential parameter enables convergence to the state in which generation of period patterns is avoided. Thus, the planes generated by the mask creating methods according to the present embodiment have aperiodic patterns.

In the above-mentioned description, the plane of a dot arrangement pattern and that of a mask is described as "plane" without discriminating between both planes in order to simplify the description. As described relating to each embodiment below, however, in calculating repulsive force, of those two types of planes, the plane corresponding to a dot arrangement pattern or dots within the plane are preliminary determined as a dot arrangement pattern. More specifically, dots arranged on the plane corresponding to a dot arrangement pattern are dealt with as being fixed and are not determined by the moving of the dot arrangement and the arrangement of dots depending on energy of repulsive potential. That is, in the embodiment of the present invention, dot arrangement is determined for the plane corresponding to a mask; and in determining the dot arrangement, the plane corresponding to a dot arrangement pattern or its dots is subjected to repulsive potential calculation. Specifically, when the dot arrangement on a plane corresponding to a mask is determined, the term of weighting coefficient α of repulsive potential calculation is applied to the plane corresponding to the mask. The terms of coefficients β and γ are applied to between the plane corresponding to the mask and the plane corresponding to other mask or a dot arrangement pattern.

Thus, the mutual interference can be reduced between the arrangement of print permitting pixels in a mask to be created and the dot arrangement pattern and also can make the arrangement pattern itself of print permitting pixels of the mask highly dispersed.

Methods for creating a mask by using above-mentioned basic method, in accordance with several embodiments of the present invention, will be described below.

Embodiment 1: 100% Even Mask for Two Pass Printing

Summary of the Embodiment

This embodiment relates to multi-pass printing of two-pass in which an image is completed by twice of scanning by using one print head equipped with a nozzle array ejecting cyan (C) ink as a printing element. A mask used for the two-pass printing has a pattern whose interference with a dot arrangement pattern is reduced and which is well dispersed. This prevents dots formed by each scanning from being unevenly distributed in number. Furthermore, since dots are dispersedly formed in each scanning, even if there is a deviation of printing position for example, texture that may be caused by the deviation is visually unobtrusive, thus suppressing adverse effects on image quality.

Figure 8:
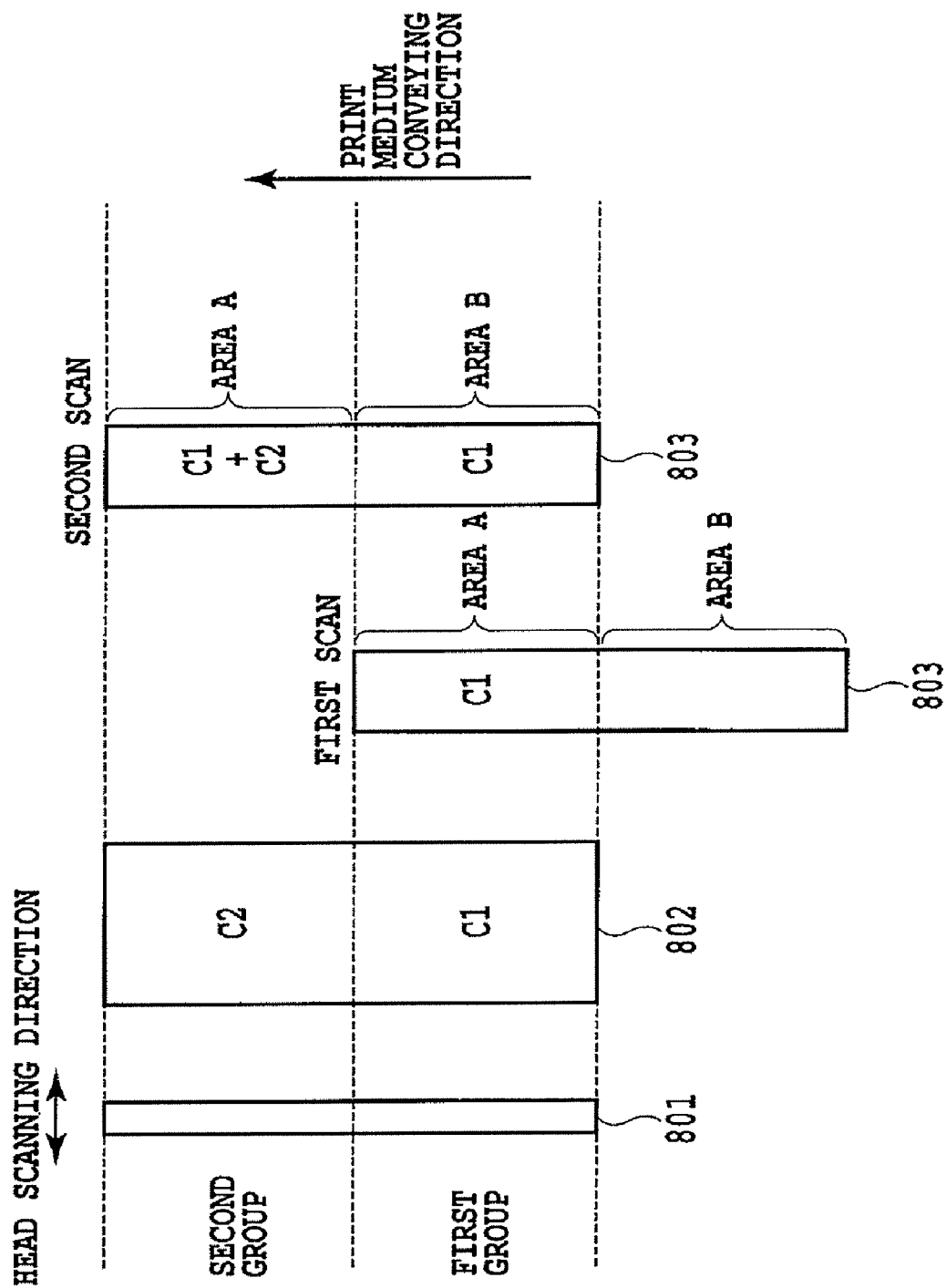
FIG. 8 is a diagram schematically showing the physical relationship of a print head, a mask pattern and a print medium in order to illustrate two-pass printing in accordance with a first embodiment of the present invention.

FIG. 8 is a diagram schematically showing mainly the positional relationship of a print head, a mask pattern and a print medium in order to illustrate two-pass printing. A print head 801 is equipped with a nozzle array of cyan ink which includes 512 nozzles arranged with 1200 dpi interval. In two-pass printing, 512 nozzles are divided into a first group of nozzles and a second group of nozzles, each group including 256 nozzles. Masks 802 (two masks C1 and C2) are associated with respective groups and the size of respective masks C1 and C2 in a sub-scan direction (conveying direction) is equivalent to 256 pixels that are the same as the number of the nozzles of respective groups. Since the masks C1 and C2 are complementary each other, superposing these masks enables printing of the area corresponding to 256 (lateral) pixels×256 (longitudinal) pixels to be completed. As shown in FIG. 8, printing is performed on a area A of a print medium 803 by using the mask C1, the print medium is conveyed by 256 pixels and then printing is performed on the area A by using the mask C2. Printing of an image is completed by the twice pass.

(Method of Creating Mask)

A method of creating the mask in accordance with this embodiment will be described regarding the case in which the mask is created by using above-mentioned sequential arrangement method.

Figure 9:
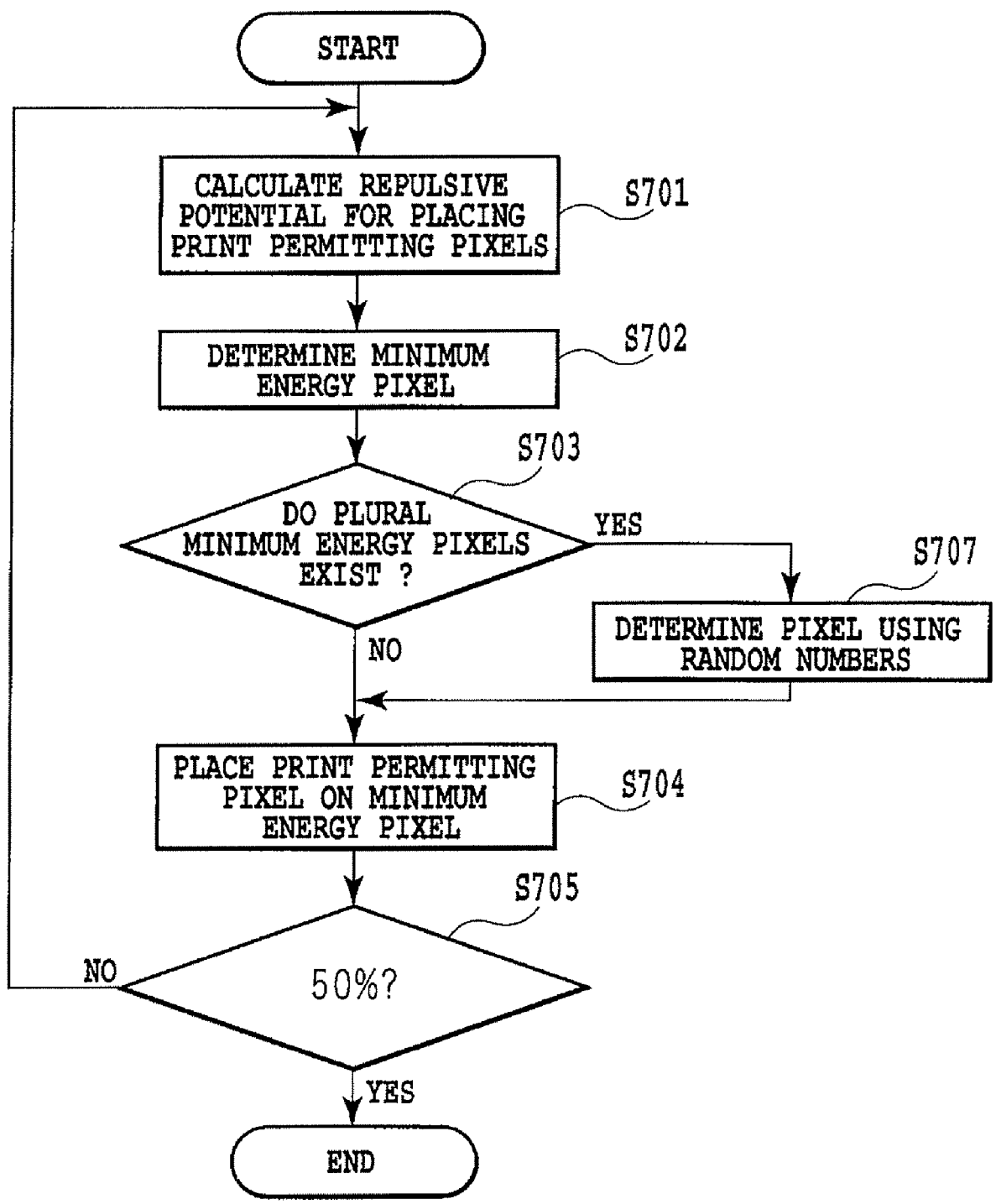
FIG. 9 is a flow chart showing arrangement processing of print permitting pixels according to a sequential arrangement method in accordance with the first embodiment.

FIG. 9 is a flow chart showing arrangement determination processing of print permitting pixels according to the sequential arrangement method in accordance with this embodiment.

In processing shown in FIG. 9, the arrangement of print permitting pixels is performed at 50% of arrangement rate in such a way that a print permitting pixel is sequentially arranged on one plane. In step S701, firstly, the plane of mask C where print permitting pixels will be arranged and the plane of a dot arrangement pattern are specified and repulsive potential is calculated for the arrangement of print permitting pixels in these planes. At this time, as described above, dots have been already arranged on the plane corresponding to the dot arrangement pattern. Thus, while the dots remain fixed, repulsive force is calculated between the dots and print permitting pixels to be arranged on the plane of mask C.

Figure 10:
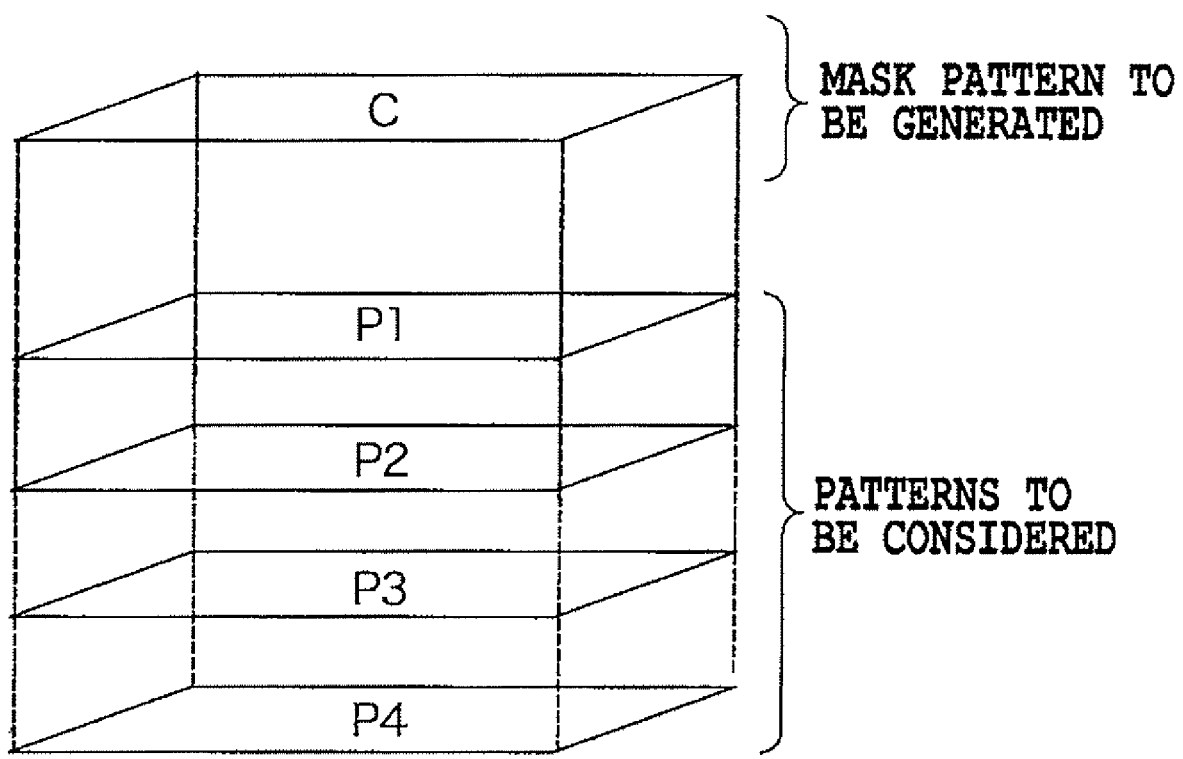
FIG. 10 is a schematic diagram for calculating a mask C in accordance with the first embodiment.

FIG. 10 is a diagram showing a concept for calculating repulsive force regarding the arrangement of print permitting pixels on the mask C. In calculating repulsive force, the dot arrangement patterns of planes P1 to P4 to be considered are fixed patterns. These dot arrangement patterns of planes P1 to P4 are predetermined for each of levels shown by index data. In processing in which the arrangement of print permitting pixels of the mask C is determined, the repulsive potential between print permitting pixels on the mask pattern C and the repulsive potential between print permitting pixels on the mask pattern C and dots on the planes P1 to P4 are calculated. Then, as described above, the arrangement of print permitting pixels on the mask C is determined based on the result of repulsive potential calculation.

FIG. 11 shows dot arrangement patterns according to the present embodiment. The dot arrangement patterns shown in FIG. 11 are composed by assembling a minimum unit pattern of 2 pixels×2 pixels, which is described above in reference with FIG. 5, at four units in longitudinal direction and four units in lateral direction. More specifically, in the patterns shown in FIG. 11, the rotated patterns or inverted patterns of the minimum unit patterns shown in FIG. 5 are arranged for respective index data levels (pattern of level 0 is not shown; all pixels are "white"), based on the predetermined rule. In the dot arrangement patterning process J0007, a pattern of size of 512 pixels×512 pixels (256 minimum unit pattern×256 minimum unit pattern), which is obtained by repeating this 8 pixels×8 pixels arrangement pattern by 64 times both longitudinally and laterally corresponding to the number of nozzles of a print head, is used. These patterns are stored in memory for respective gradation levels (0 to 4) of index data and, in patterning process, the minimum unit pattern of the 2 pixels×2 pixels is read out correspondingly to the gradation level shown by index data. The minimum unit pattern to be read out corresponds to the position of the index data. This read-out minimum unit pattern is subjected to mask processing in the subsequent conversion using mask data J0008 (FIG. 4).

Of the dot arrangement patterns for respective levels shown by index data, described above, the dot arrangement pattern of size of 256 pixels×256 pixels corresponds to 256 pixels×256 pixels of the mask C. The arrangement of print permitting pixels of the mask C is determined by considering the planes P1 to P4 that are dot arrangement patterns for respective gradation levels. Specifically, the arrangement of print permitting pixels is determined by using above-mentioned calculation of repulsive potential. The dot arrangement patterns to be considered, however, are not the repetitive 8 pixels×8 pixels patterns shown in FIG. 11. This is because inequality of repulsive potential is removed beforehand, which will be described later in detail.

FIG. 12 is a diagram showing the dot arrangements of the planes P1 to P4 that are subjected to repulsive potential calculation in determining the arrangement of print permitting pixels on the mask C. The dot arrangement patterns of the planes P1 to P4 are obtained by separating the dot arrangement pattern shown in FIG. 11 into patterns that are exclusive each other. Specifically, for the original dot arrangement pattern shown in FIG. 11, i.e. the dot arrangement pattern used in processing J0007 shown in FIG. 4, the patterns (also referred as to "dot pattern for calculation") shown in FIG. 12 are represented by the difference between respective dot arrangement patterns of respective gradation levels. The pattern (L1-L0) of the plane P1 is obtained by removing dots of the dot arrangement pattern of gradation level 0 (L0) from dots of the dot arrangement pattern of gradation level 1 (L1). Similarly, the plane P2 is the dot pattern corresponding to the difference between the pattern of gradation level 2 (L2) and the pattern of gradation level 1 (L1); the plane P3 is the dot pattern corresponding to the difference between the pattern of gradation level 3 (L3) and the pattern of gradation level 2 (L2); and the plane P4 is the dot pattern corresponding to the difference between the pattern of gradation level 4 (L4) and the pattern of gradation level 3 (L3). Since the planes P1 to P4 are exclusive patterns each other, dots would be arranged at the arrangement rate of 100% that is the same rate of gradation level 4, when superposing all the planes. In calculating repulsive potential, the dot arrangement patterns are made to be exclusive in order to prevent the inequality of the number of print permitting pixels arranged and the reduction of dispersibility due to biased repulsive potential in a certain region. That is, each dot arrangement pattern shown in FIG. 11 preserves the dot arrangement of the former level when the level is increased. Therefore, if the dot arrangement pattern itself is used for calculating repulsive potential, the preserved dots are regarded as overlapping dots on different planes. However, since dots of the dot arrangement pattern to which a mask is applied by masking processing are those of one of a plurality of levels, they do not have multiplex relation with the mask or do not interfere with the mask, as described above. Therefore, if the dot arrangement pattern itself is used for calculating repulsive potential, the values of repulsive potential calculated is biased in a certain region relative to the actual relation, thus adversely causing the inequality of the number of print permitting pixels to be arranged and the reduction of dispersibility.

Although the dot arrangement pattern in which the dot arrangement of the former gradation level is preserved when the gradation level is increased, is shown in the above example, the present invention is not limited to the above example and also can be applied to the dot arrangement pattern in which the dot arrangement of the former gradation level is not preserved.

Figure 13:
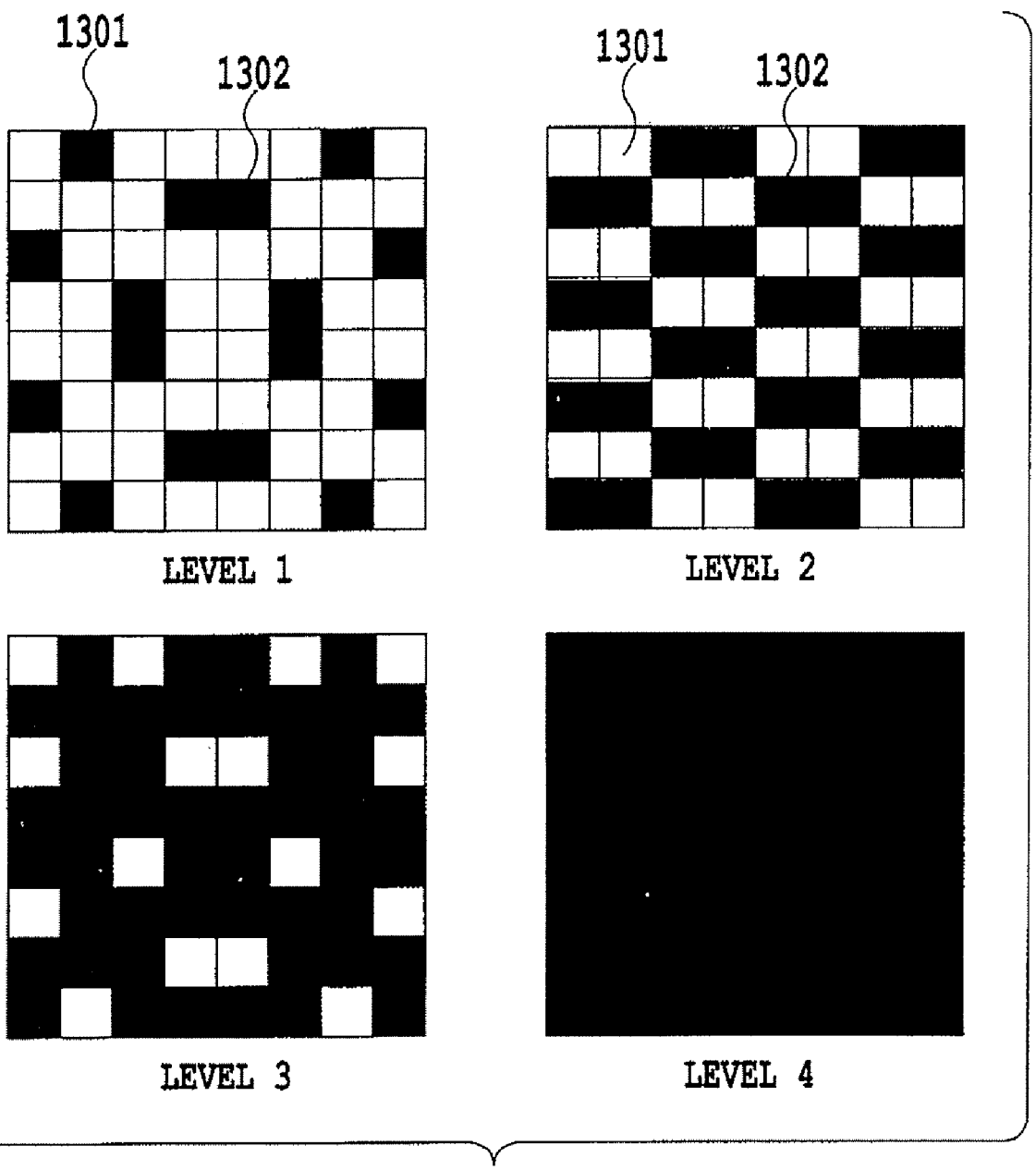
FIG. 13 is a diagram showing another dot arrangement patterns based on index data in accordance with the first embodiment.

FIG. 13 shows one example of the dot arrangement patterns in which the dot arrangement of the former gradation level is not preserved as it is when the gradation level is increased. As shown in FIG. 13, in the arrangement pattern of level 1, for example, dots are arranged on pixels 1301 and 1302. Compared to this arrangement, in level 2 where the level is increased by one level, dots are not arranged on the pixel 1301 and the dot arrangement of level 1 is not preserved, while dots are arranged likewise as the dot arrangement of level 1 on the pixel 1302. Thus, there is a dot arrangement pattern in which the dot arrangement of the former level is not preserved completely (as it is).

In using the dot arrangement pattern in which the dot arrangement is not preserved as it is when the level is increased, the dot arrangement pattern and exclusive pattern thereof are used for calculating repulsive potential. In calculating repulsive potential, the pixels (for example pixel 1301) which do not preserve the dot (arrangement) has the same influence on print permitting pixels of the mask, if the distance is not considered. Meanwhile, the pixels (for example pixel 1302) which preserve dots has overlapping and multiplex relation with print permitting pixels of the mask in calculating repulsive force. From this point of view, a dot arrangement pattern and the exclusive pattern thereof are used as planes for calculating repulsive force.

Figure 14:
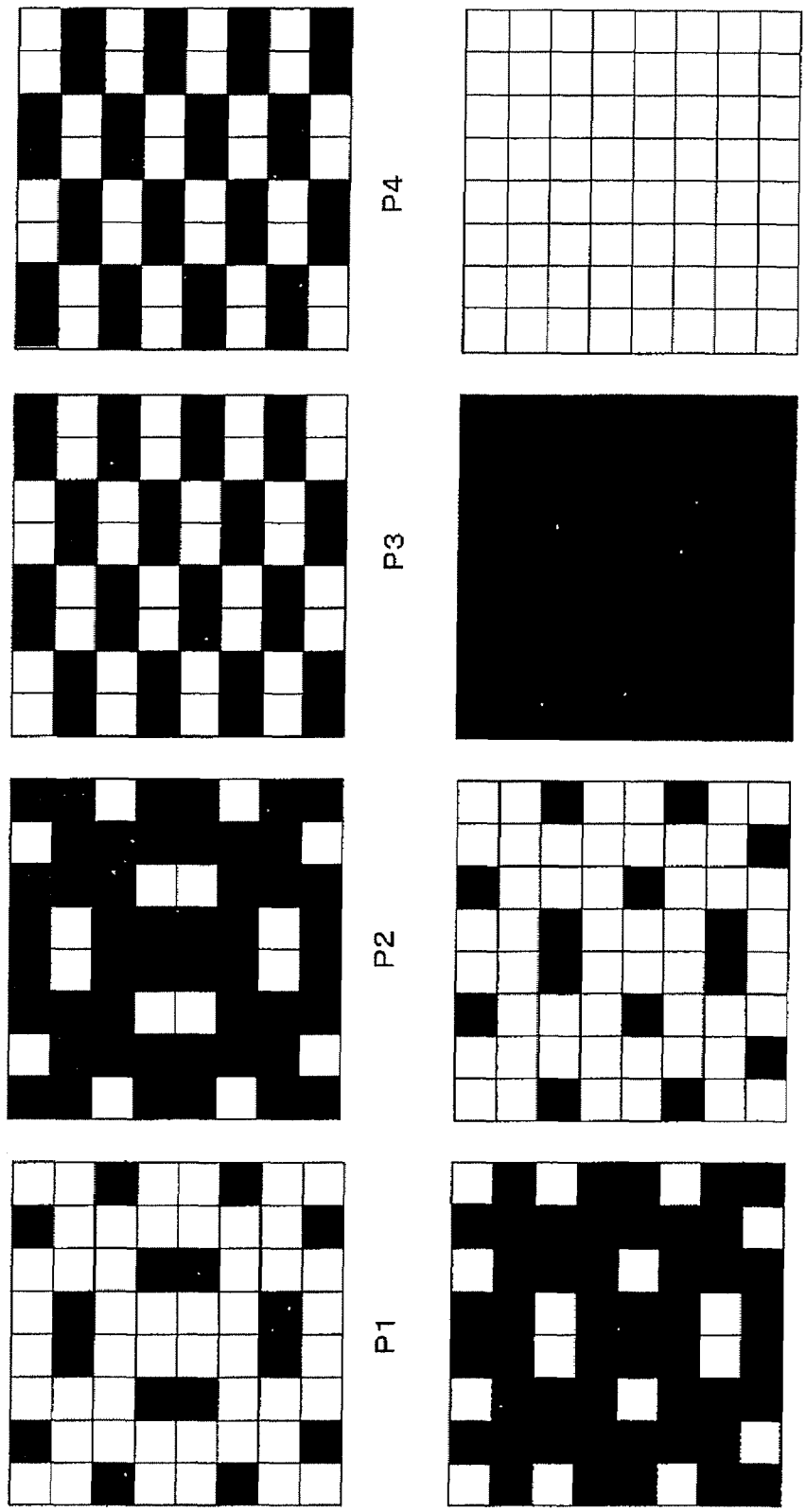
FIG. 14 is a diagram showing the patterns to be considered in creating a mask, based on the dot arrangement patterns shown in FIG. 13.

FIG. 14 shows 8 planes used for calculating repulsive potential in the case of the dot arrangement patterns shown in FIG. 13. In FIG. 14, the plane P1 has the dot arrangement pattern of level 1 shown in FIG. 13 and the plane 2 has the exclusive dot pattern thereof. Similarly, the plane 3 has the dot arrangement pattern of level 2 and the plane 4 has the exclusive dot pattern thereof; the plane 5 has the dot arrangement pattern of level 3 and the plane 6 has the exclusive dot pattern thereof; and the plane 7 has the dot arrangement pattern of level 4 and the plane 8 has the exclusive dot pattern thereof.

When the dot arrangement patterns shown in FIG. 13 are used, the calculation of repulsive potential for determining the arrangement of print permitting pixels of the mask C is performed for the plane of the mask C and the above-mentioned 8 planes, on which the dot arrangements are fixed, for the plane of the mask C.

Referring to FIG. 9 again, after calculating repulsive potential as described above, step S702 determines the position (pixel) having minimum potential energy among the repulsive potentials calculated when print permitting pixels are placed in the arrangement position of the mask C. Then, step S703 determines if there is more than one position having minimum potential energy or not. If there is more than one position, step S707 determines one position of them by using a random number. Then, step S704 arranges the print permitting pixel on the determined position having minimum potential energy.

Step S705 determines if print permitting pixels are arranged on the plane of the mask C up to 50% of the positions where pixels can be arranged or not. If not, the processing in step S701 and the subsequent steps is repeated. When print permitting pixels are arranged up to 50%, this processing is terminated.

When the mask C1, which is the mask used for the first pass of two-pass printing, is set as described above, the mask C2, which has complementary relation with the mask C1, can be specified based on the mask C1.

According to the method for creating a mask in this embodiment, as described above, firstly, the arrangement of print permitting pixels in the mask C created is well dispersed depending on above-mentioned weighting of α, β and γ. Secondly, print permitting pixels and dots are also well dispersed on the superposing of the mask C and the planes P1 to P4 of dot arrangement patterns considered in creating the mask C. That is, both the logical product and the logical sum of the print permitting pixels arranged on the mask C and the dots arranged on each of the planes P1 to P4 are dispersed. These logical product and logical sum can be obtained between print permitting pixels arranged on the mask and dots arranged on each of the planes, for example, when 256 pixels×256 pixels of the mask are associated with 256 pixels× 256 pixels of each of the planes.

The good dispersibility of above-mentioned logical sum ensures that, in both the mask C1 and the mask C2 that has complementary relation with the mask C1, the arrangement of print permitting pixels is well dispersed relative to the dot arrangement patterns shown in FIGS. 11 and 13. This can suppress the biased formation of dots by a specific scanning. Further, the good dispersibility of above-mentioned logical product also ensures that the dot pattern obtained by mask-processing for dot data according to the dot arrangement pattern shown in FIG. 11 and 13, with the use of the mask C1 (C2) are well dispersed. Such effects of the present invention is applicable to each embodiment describe below.

Consequently, when the dot patterns generated according to the dot arrangement patterns in FIG. 11 or 13 are printed, as to dots formed by each scanning, their number is not unequally high in a specific scanning and dots are well dispersed, by using the mask of this embodiment. The good dispersibility makes texture that may occur due to various factors visually unobtrusive, thus suppressing adverse effects on image quality.

(Mask Characteristic Evaluation)

Mask of this Embodiment and Mask of a Comparative Example

Figure 15:
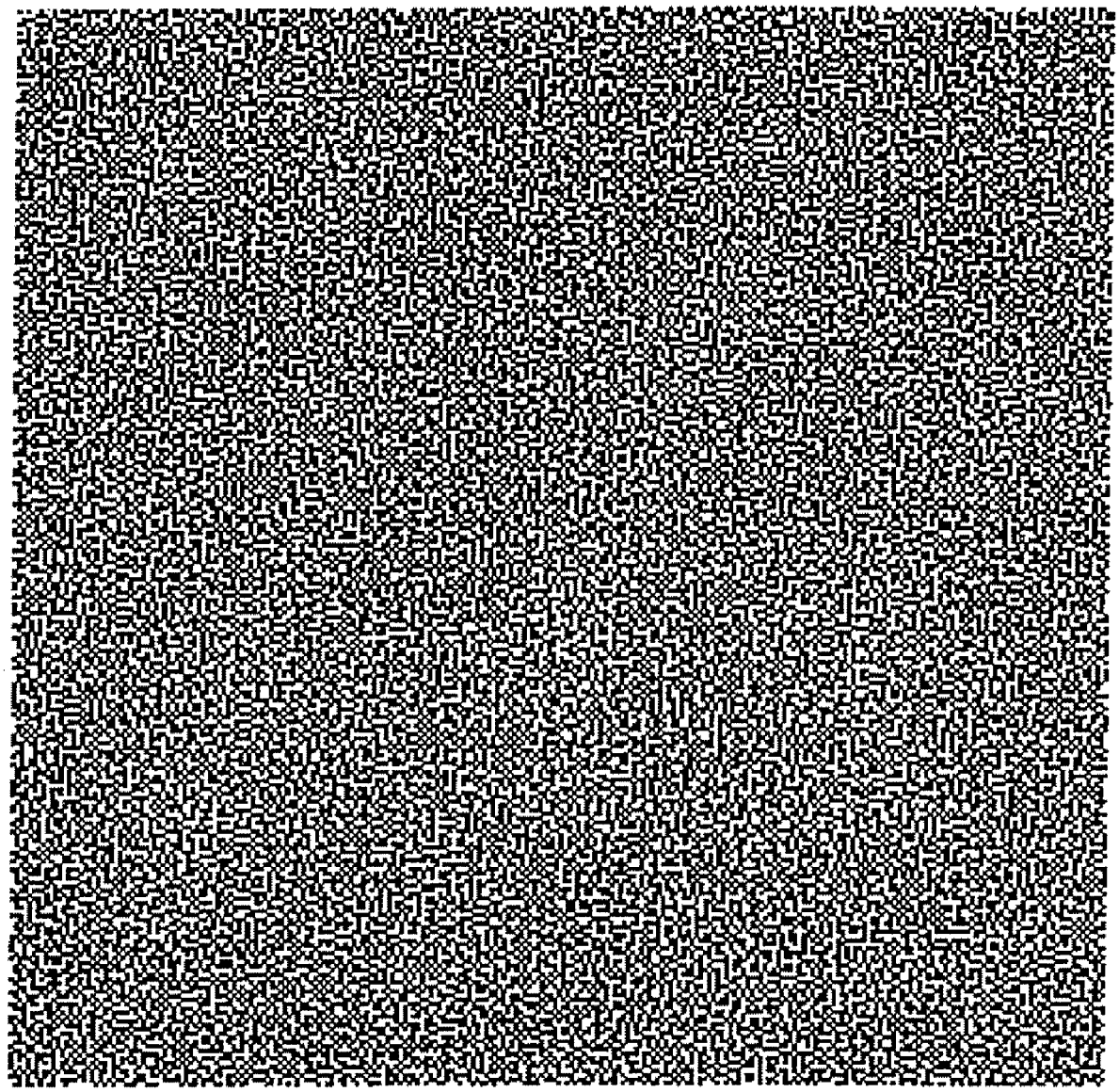
FIG. 15 is a view showing an arrangement pattern of print permitting pixels in a pattern-considered-type mask in accordance with the first embodiment.
Figure 16:
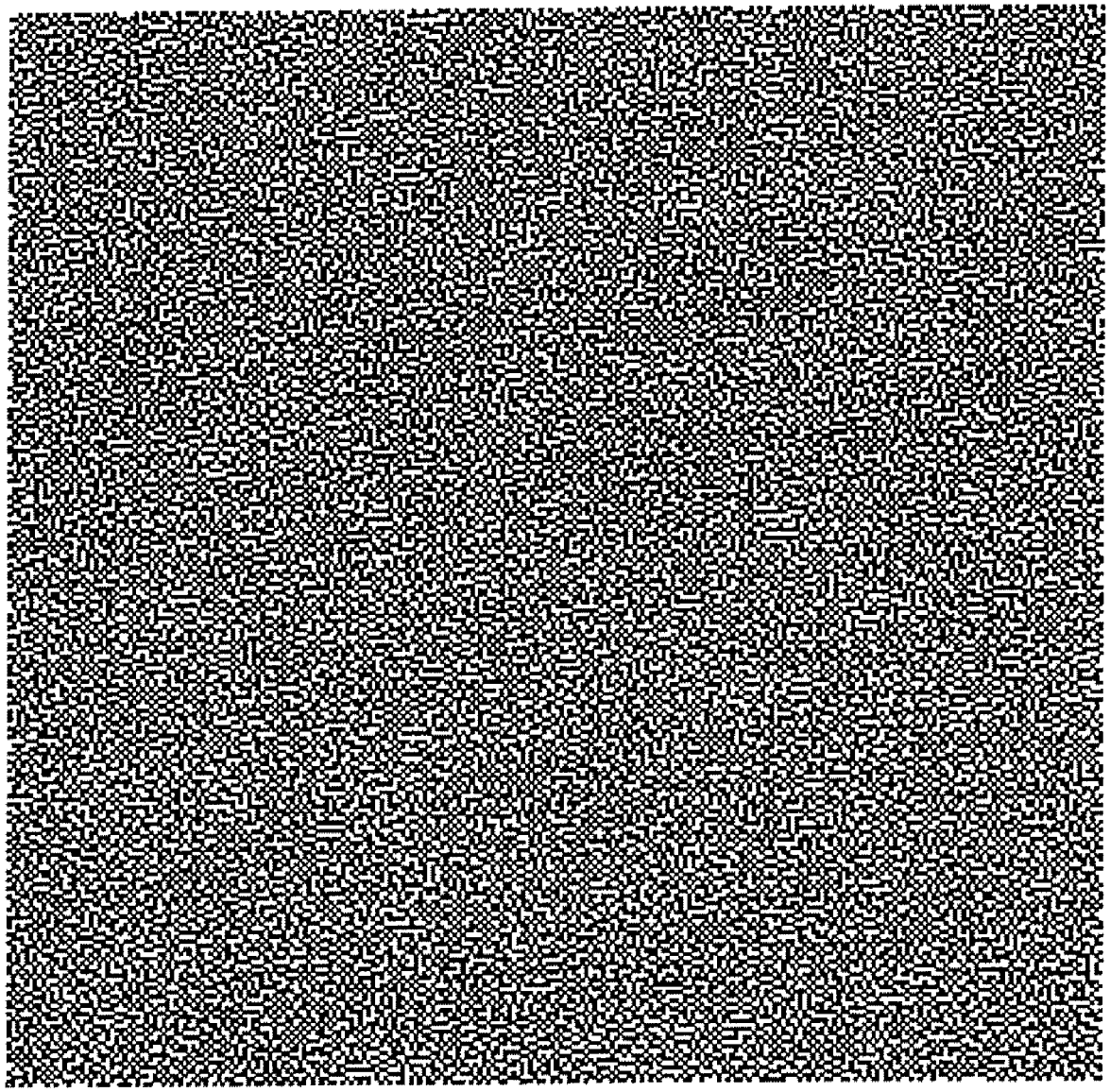
FIG. 16 is a view showing an arrangement pattern of print permitting pixels in a layer mask in relation to the present invention.

FIG. 15 shows an arrangement pattern of print permitting pixels of the mask C1 (hereinafter also referred as a pattern-considered-type layer mask) of this embodiment, created by above-mentioned method. FIG. 16 shows one arrangement pattern of a mask (hereinafter referred as a layer mask) in which print permitting pixels in respective planes are determined by calculating repulsive potential between planes of two masks for two-pass printing, disclosed in Japanese Patent Application No. 2005-197873 by the applicant of the present application. The mask patterns shown in FIGS. 15 and 16 have 256×256 pixels. In both masks, the arrangement pattern of print permitting pixels is well dispersed and has smooth impression in whole.

Figure 17:
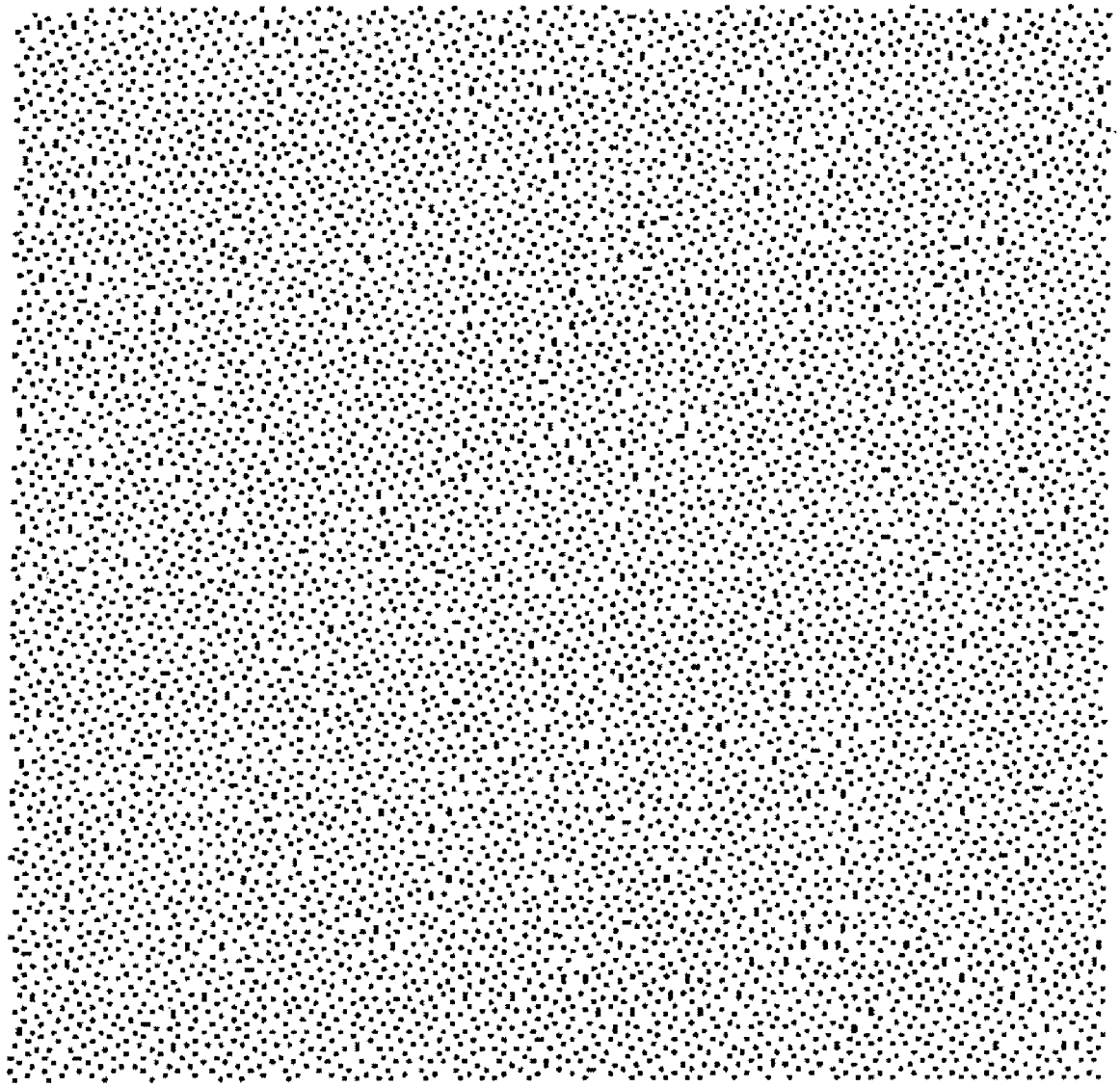
FIG. 17 is a view showing the pattern of the logical product of the pattern-considered-type layer mask C1 and the dot arrangement of level 1 shown in FIG. 11 in the first embodiment.
Figure 18:
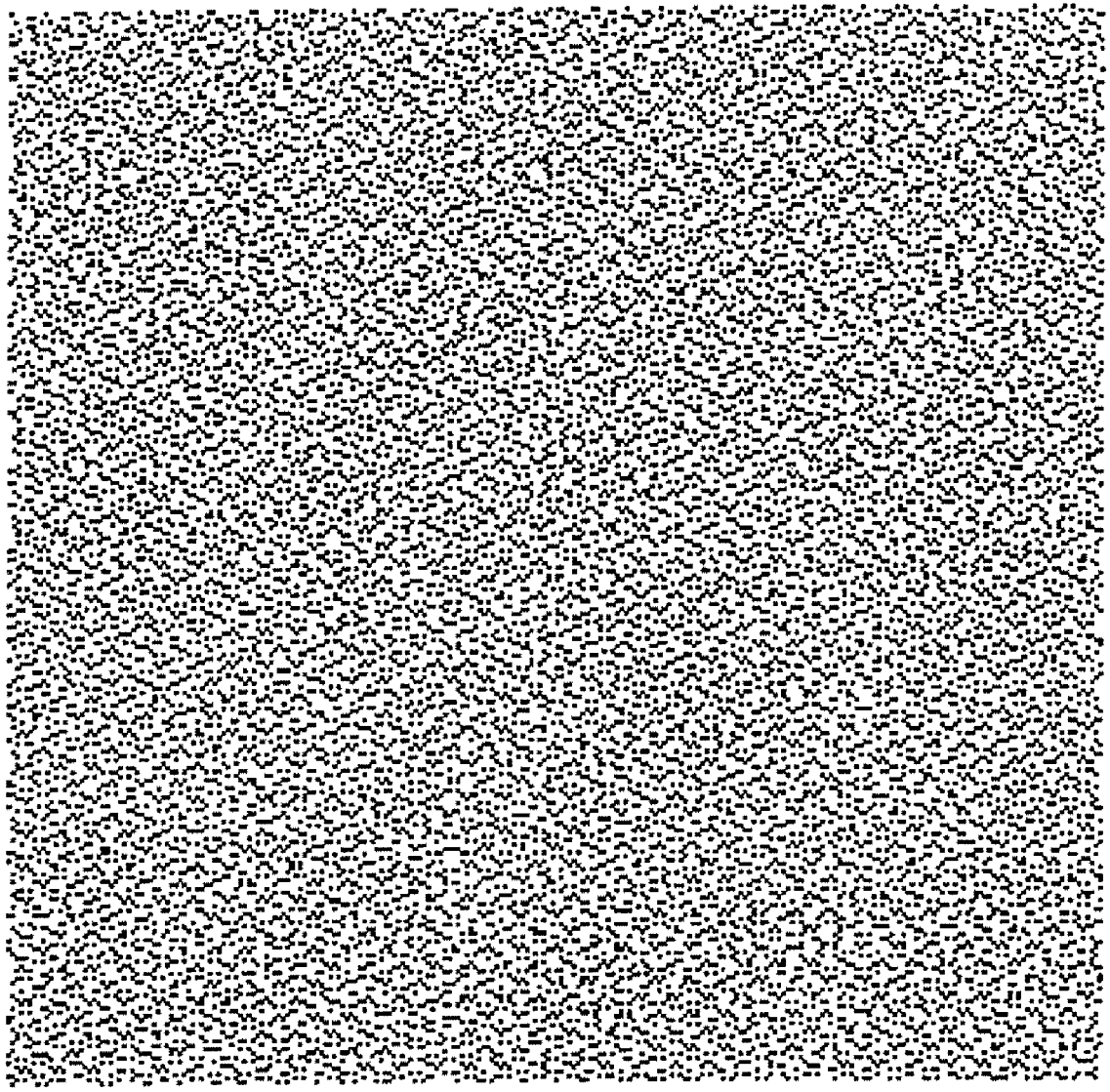
FIG. 18 is a view showing the pattern of the logical product pattern of the pattern-considered-type layer mask C1 and the dot arrangement of level 2 shown in FIG. 11 in the first embodiment.
Figure 19:
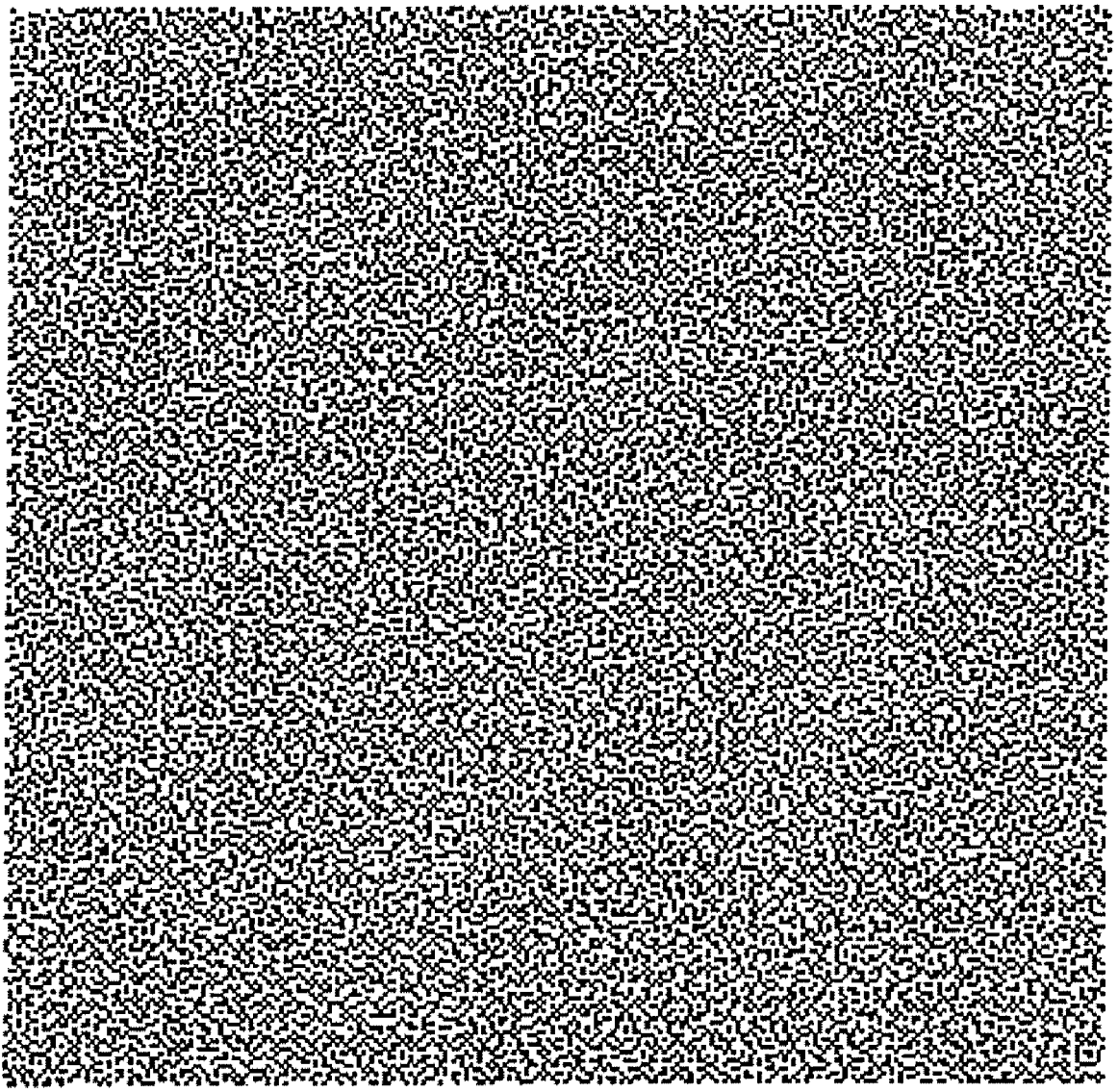
FIG. 19 is a view showing the pattern of the logical product of the pattern-considered-type layer mask C1 and the dot arrangement of level 3 shown in FIG. 11 in the first embodiment.
Figure 20:
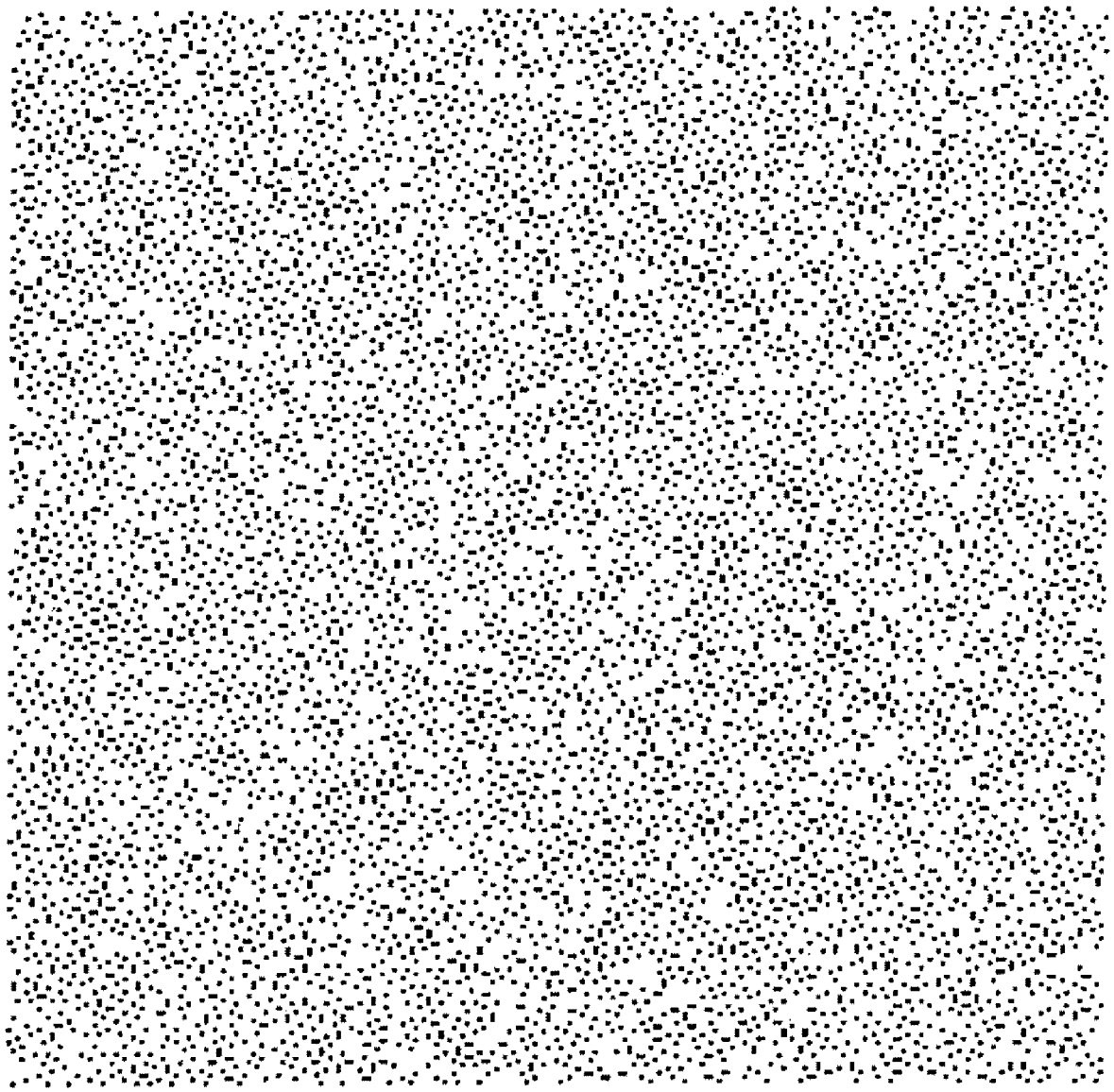
FIG. 20 is a view showing the pattern of the logical product of a layer mask in relation to the present invention and the dot arrangement of level 1 shown in FIG. 11.
Figure 21:
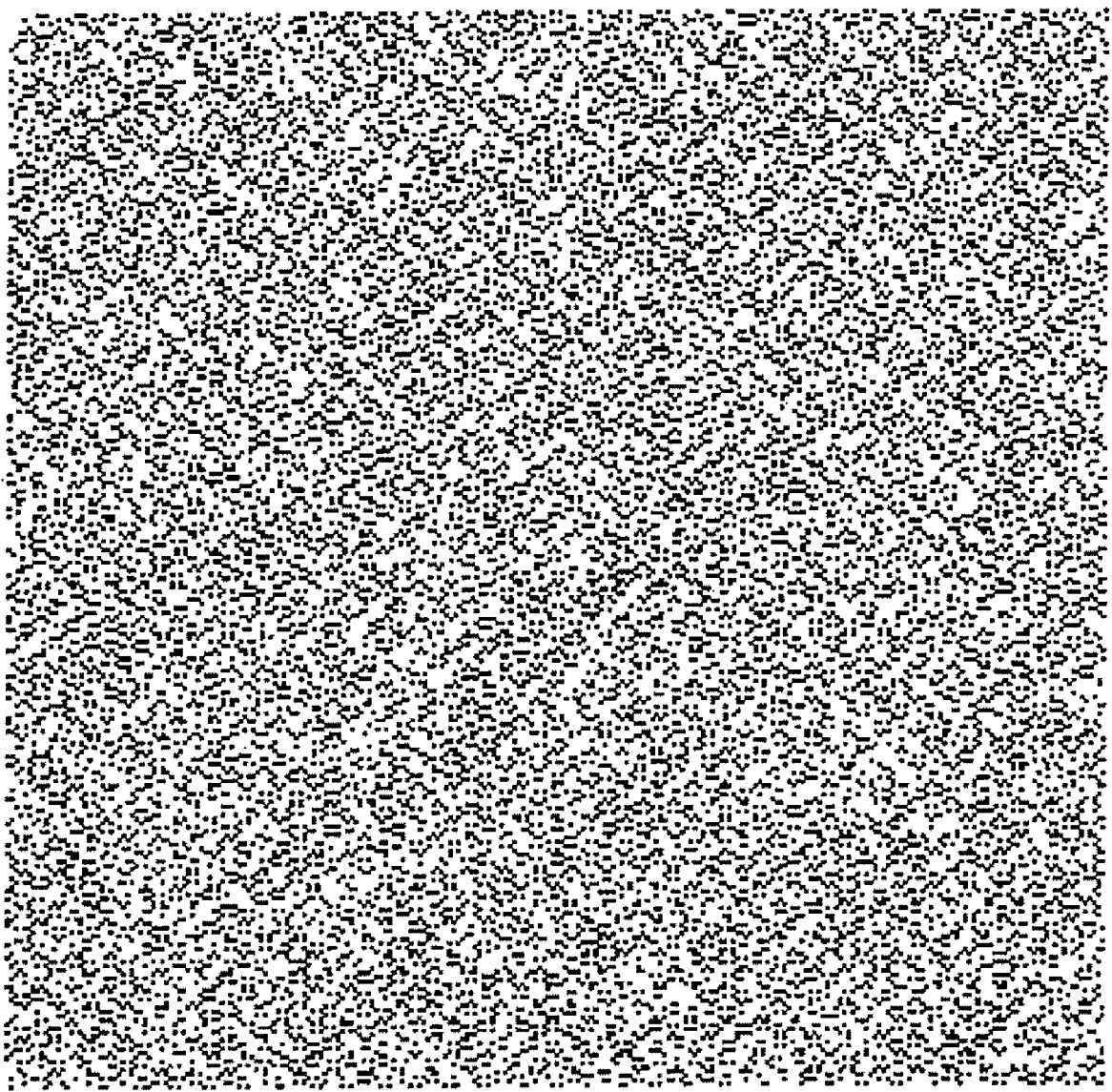
FIG. 21 is a view showing the pattern of the logical product of a layer mask in relation to the present invention and the dot arrangement of level 2 shown in FIG. 11.
Figure 22:
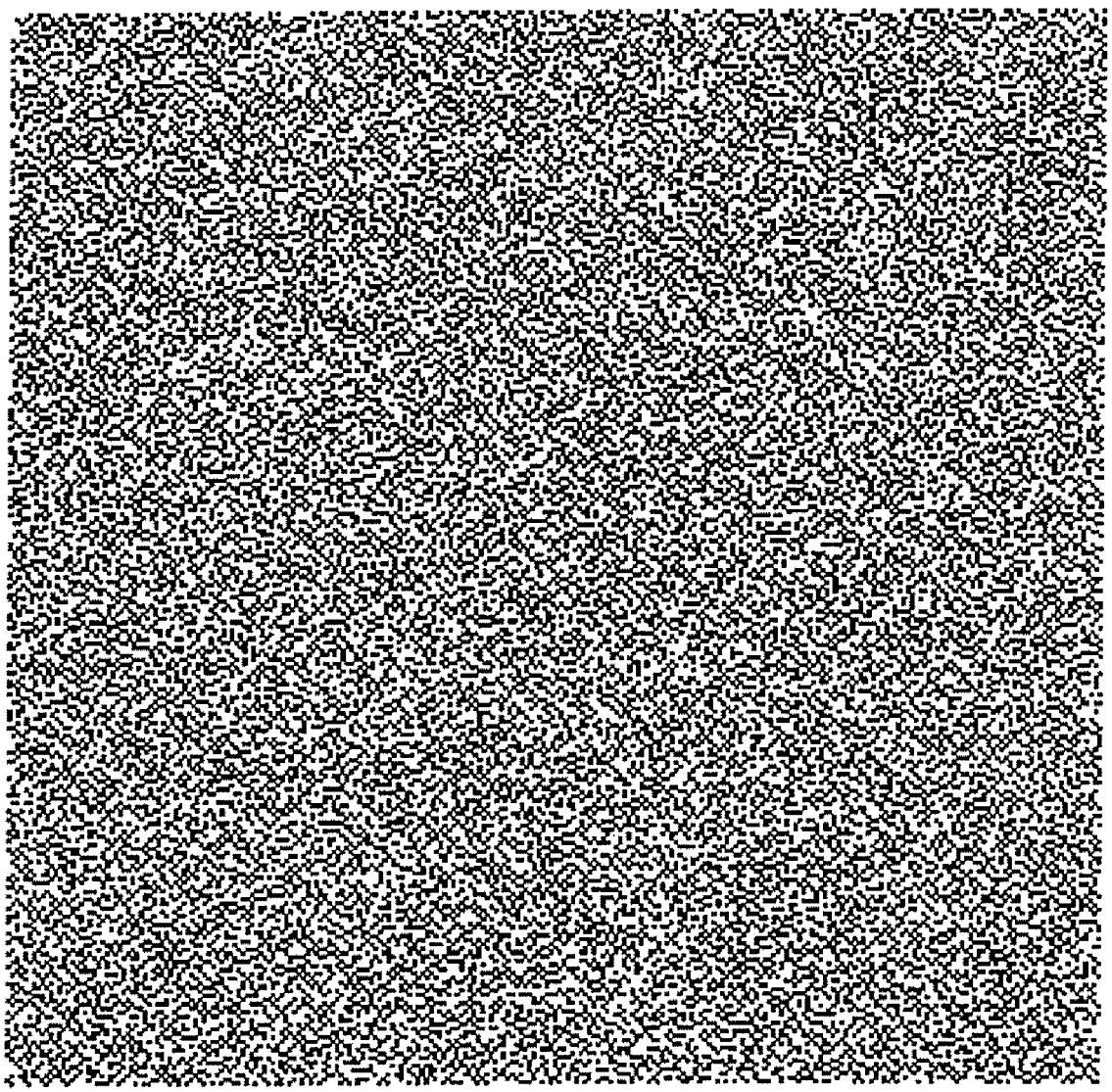
FIG. 22 is a view showing the pattern of the logical product of a layer mask in relation to the present invention and the dot arrangement of level 3 shown in FIG. 11.

FIGS. 17, 18 and 19 show the dot patterns of the logical products of the arrangement of print permitting pixels of the pattern-considered-type layer mask C1 shown in FIG. 15 and the dot arrangements of each of levels 1, 2 and 3 shown in FIG. 11, respectively. FIGS. 20, 21 and 22 show the dot patterns of the logical products of the arrangement of print permitting pixels of the layer mask shown in FIG. 16 and the dot arrangements of each of levels 1, 2 and 3 shown in FIG. 11, respectively. That is, these figures show dot patterns to be printed in the first pass (scan) when dot patterns of levels 1 to 3 corresponding to those in printing are mask-processed by using the mask C1 of masks for two-pass scanning.

As shown in comparison of FIGS. 17 to 19 and FIGS. 20 to 22, in the dot patterns (FIGS. 17 to 19) printed by using the pattern-considered-type layer mask of this embodiment, the arrangement of dots formed is more evenly distributed compared to those of FIGS. 20 to 22. Especially, difference between the masks is larger in lower level.

Evaluations Based on Power Spectra

Then, a mask of the present embodiment is evaluated based on power spectra that show frequency characteristics of a mask pattern. The power spectra described below is obtained for the mask pattern having size of 256 pixels×256 pixels. Here, the power spectra used in this evaluation is "radially averaged power spectrum" described in "T. Mitsa and k. J. Parker, "Digital Halftoning using a Blue Noise Mask", Proc. SPIE 1452, pp. 47-56 (1991)".

A term "low frequency component" used in the specification and claims of the present application means a frequency component that exists in a lower frequency side of the middle of a spatial frequency range in which components of frequency (power spectra) exist. On the other hand, a term "high frequency component" means a frequency component that exists in a higher frequency side of the middle of the spatial frequency range. In an example shown in FIG. 24, a border is defined at neighborhood of a spatial frequency "90" in the spatial frequency range, and then a lower frequency side (about 0 to 90) of the border is defined as the "low frequency region" and a higher frequency side (about 91 to 180) of the border is defined as the "high frequency region".

Further, a statement that "the low frequency components are fewer than the high frequency components" means that an integration value of components (low frequency components) that exist in the low frequency region is smaller than the integration value of components (high frequency components) that exist in the high frequency region.

Figure 23:
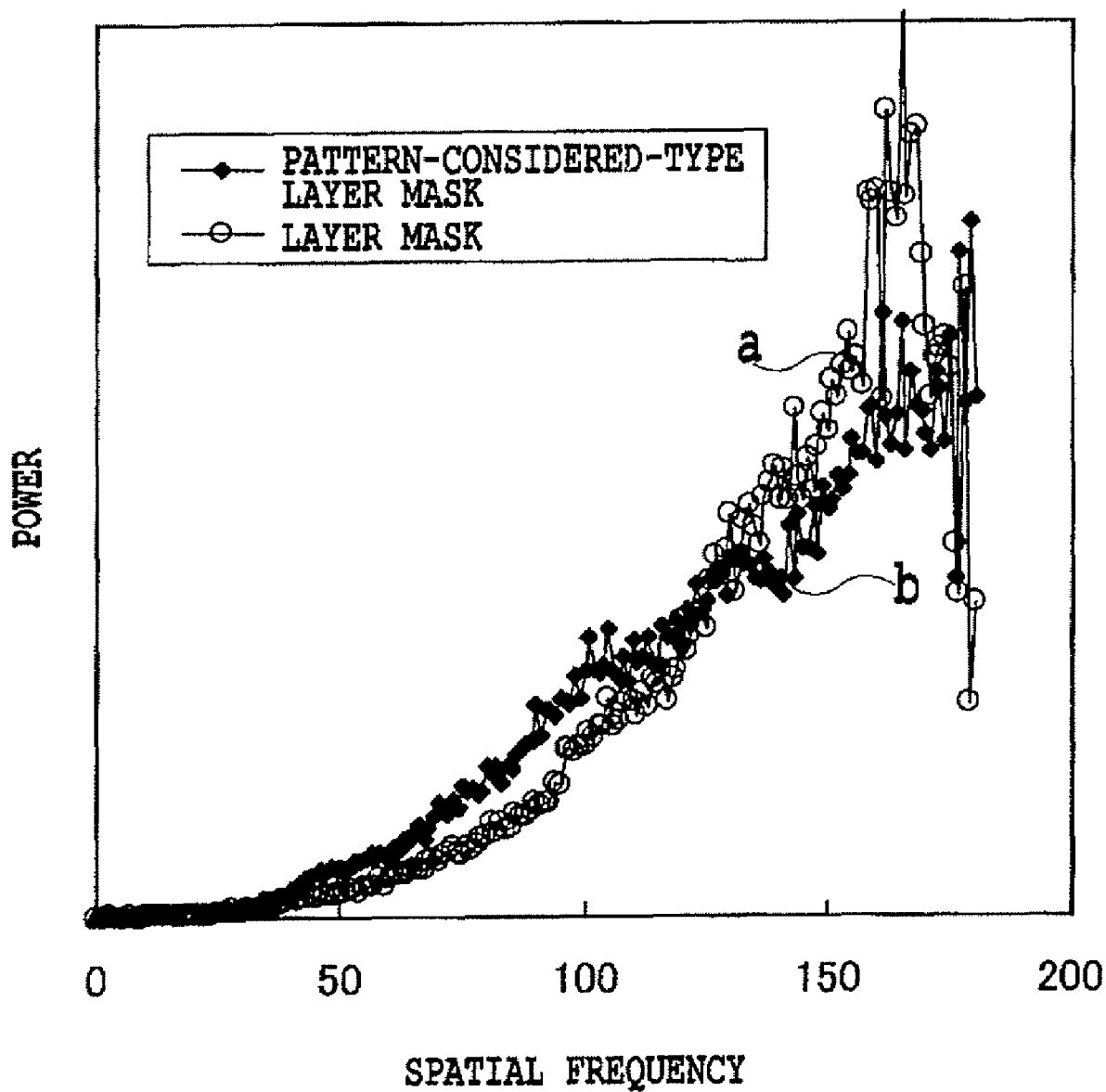
FIG. 23 is a graph illustrating the frequency characteristics of the pattern-considered-type layer mask C1 in the first embodiment and a layer mask in relation to the present invention.

FIG. 23 is a graph illustrating respective frequency characteristics of the pattern-considered-type layer mask C1 of this embodiment and a layer mask disclosed in Japanese Patent Application No. 2005-197873 (hereinafter also referred to as "related application"). In FIG. 23, each curved line shows the power spectra of each mask with respect to spatial frequencies. The curved Line b shows the power spectra of the mask pattern of the pattern-considered-type layer mask of this embodiment and the curved Line a shows the power spectra of the mask pattern of a layer mask disclosed in the related application. When these two curved lines are compared, both masks have lower power in the low frequency region and power peaks in high frequency region. Thus, also in the mask of the present embodiment which is created in considering the dot arrangement patterns, the pattern characteristics with few low frequency components and no peaks in the low frequency region are realized.

Figure 24:
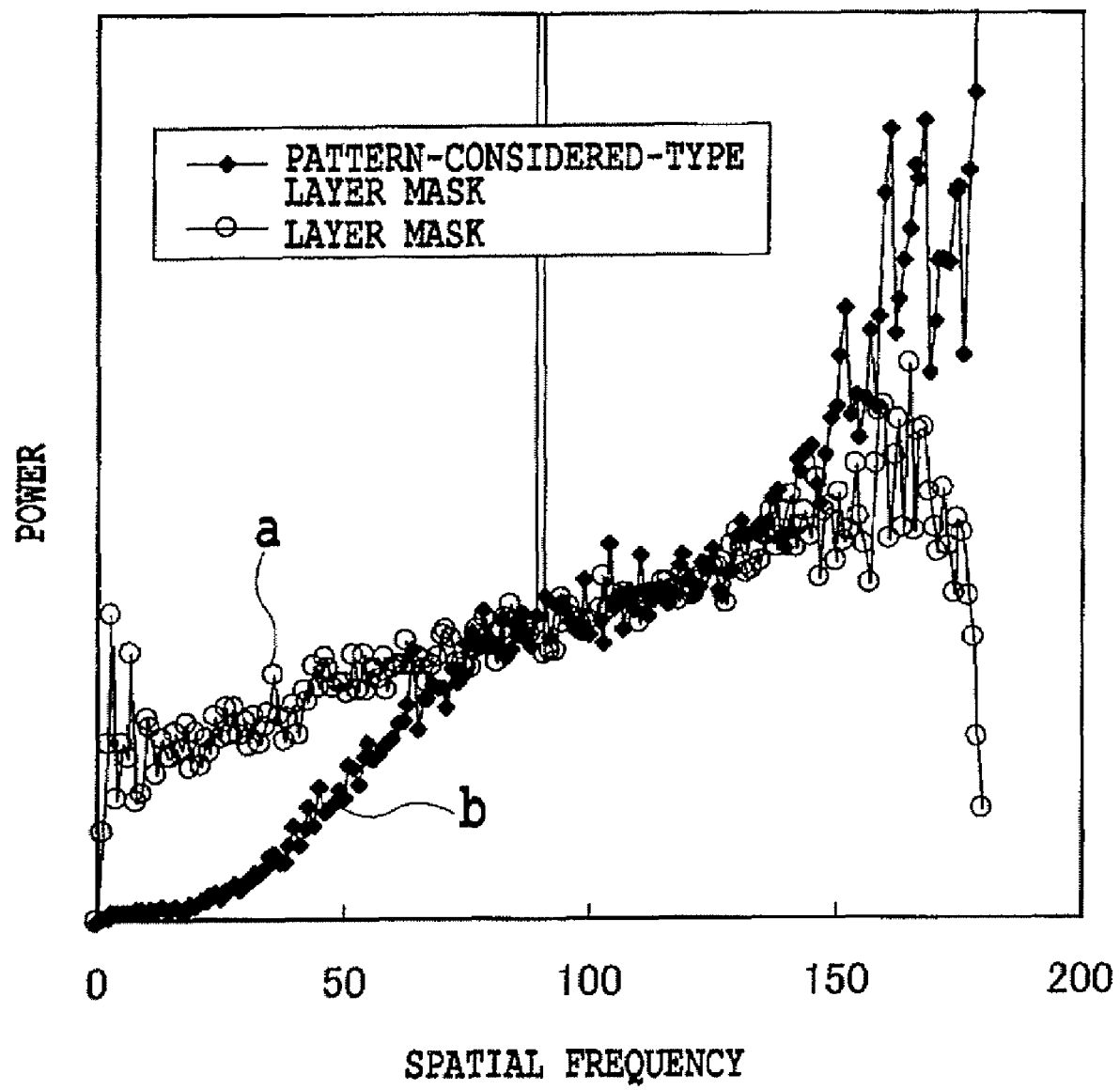
FIG. 24 is a graph illustrating the frequency characteristics of respective dot patterns (FIGS. 17 and 20) formed by a single scanning when printing is performed by mask-processing the dot pattern of level 1 with a mask according to the first embodiment and a layer mask in relation to the present invention.

FIG. 24 is a graph illustrating respective frequency characteristics of the patterns (FIGS. 17 and 20) formed by the first pass when dots patterns of level 1 are printed by using the pattern-considered-type layer mask C1 and the layer mask disclosed in the related application. The curve line a shows power spectra of the logical product pattern (that is, the logical product pattern shown in FIG. 20) of the layer mask of the related application and the dot arrangement pattern of level 1 shown in FIG. 11. The curved Line a has a power peak also in the low frequency region and has relatively great amount of the low frequency components. The fact that the power peak exists in the low frequency region means that the mask pattern and the dot arrangement pattern interfere with each other so that the arrangement of dots in one scan is biased, and biased arrangement is noticed as a noise.

On the other hand, the curved line b shown in FIG. 24 shows power spectra of the logical product pattern (that is, the logical product pattern shown in FIG. 17) of the pattern-considered-type layer mask C1 of this embodiment and the dot arrangement pattern of level 1 shown in FIG. 11. The curved Line b shows a characteristic that the low frequency components are fewer than the high frequency components, above all a characteristic that the power peaks substantially do not exist in the low frequency region and the low frequency components are relatively few. The fact that the power peak does not exist in the low frequency region means that the mask pattern and the dot arrangement pattern hardly ever interfere with each other hardly to cause any the biased arrangement of dots and that the arrangement of dots in one scan is appropriately dispersed.

The characteristics of the curved line b shown in FIG. 24 are described in further detail below. Generally, a human vision has characteristic of a so-called low-pass filter which has a high sensibility to the low frequency components, and the higher frequency, has lower sensibility. Accordingly, it is effective for decreasing of noise feeling to keep the low frequency components as low as possible so that the power peaks of the low frequency components do not exist in whole range of the low frequency region, such as the curved line b.

Among the frequency components in the low frequency region, frequency components which affect the noise feeling is the frequency components existing in a lower side of the middle (half) of the low frequency region, and in a more strict sense, is the frequency components existing in a lower side of one-fourth of the low frequency region. More specifically, the frequency characteristic regarding human vision's sensibility depends on a distance between a human's eye and a printed product. Many documents including for example Dooley's document "R. P. Dooley: Prediction Brightness Appearance at Edge Using and Non-Linear Visual Describing Functions, SPES annual Meeting (1975)" describe the above frequency characteristic. From the various experimentations, it is described that human's eye easily recognizes the components in the lower frequency region than the frequency of about 9 to 10 cycles/mm. In the example shown in FIG. 24, the spatial frequency of "50" corresponds to about 10 cycles/mm and the neighborhood of middle of the low frequency region (the spatial frequency of "45") corresponds to about 9 cycles/mm. Accordingly, a condition that the frequency components are kept to be fewer so that the power peaks do not exist in the frequency region equal to or lower than 9 cycles/mm (that is, in the frequency region that is lower side of the middle (half) of the low frequency region) is effective for decreasing the noise feeling. The curved line b satisfies this condition.

The spatial frequency becomes lower from 9 cycles/mm, the vision's sensibility gradually becomes higher, and then, the vision's sensibility rapidly increases form the neighborhood of 4.5 cycles/mm (the spatial frequency of "22.5" in FIG. 24). Then, the vision's sensibility takes the maximum at the neighborhood of the 1 to 2 cycles/mm (the spatial frequency of "5 to 10" in FIG. 24). Accordingly, it is important for the frequency components to be kept to be fewer so that the power peaks of the frequency components do not exist in the frequency region (the region lower side of one-fourth of the low frequency region) lower than 4.5 cycles/mm (the spatial frequency of "22.5" in FIG. 24). The curved line b satisfies this condition also.

As described above, according to the present embodiment, as shown in the curved line b of FIG. 24, the low frequency components can be kept to be few to the extend that the power peaks of the frequency components do not exist in the region lower side of one-fourth of the low frequency region (the region lower than about 4.5 cycles/mm), by this, the image with less noise feeling can be obtained. It should be noted that since the curved line b has no power peaks in whole region (the region equal to or less than 9 cycles/mm) lower side of the neighborhood of the half of the low frequency region, the noise feeling is hardly recognized.

As is apparent from the above description, the mask of the embodiments of the present invention has an arrangement of print permitting pixels in which the logical product pattern of the arrangement of the print permitting pixels and a dot arrangement of the dot arrangement pattern satisfies a characteristic (a) and any of characteristics (b1), (b2) and (b3). It should be noted that, in the present embodiment, it is necessary for the mask to satisfy at least the characteristic (b1) in addition to the characteristic (a). Preferably, the mask of the present embodiment further satisfies the characteristics (b2), and more preferably the mask further satisfies the characteristics (b3).

(a) The frequency components in the low frequency region are fewer than the components in the high frequency region.

(b1) the power peaks do not exist in the region lower side of one-fourth of the low frequency region.

(b2) the power peaks do not exist in the region lower side of half of the low frequency region.

(b3) the power peaks do not exist in whole are of the low frequency region.

Thus, the pattern-considered-type layer mask C1 has the arrangement of the print permitting pixels in which the logical product pattern obtained by the logical product of the arrangement of print permitting pixels on the mask C1 and the dot arrangement according to the dot arrangement pattern has characteristics that the low frequency components of the logical product pattern are fewer than the high frequency components thereof and that power peaks of the low frequency components do not exist.

By using such a pattern-considered-type layer mask, the interference with a dot arrangement pattern can be reduced to reduce the in equality of the number of dots and mask-processing can be performed to realize that dots are highly dispersed. Furthermore, since low frequency components are kept to be few, unevenness of mask patterns depending on mask cycles also can be reduced.

Embodiment 2: 100% Even Mask for Four Pass Printing

Summary of the Embodiment

A second embodiment of the present invention relates to pattern-considered-type layer masks used for multi-pass printing of four-pass that completes an image by four times of scanning (twice of reciprocating scanning) for each of cyan (C), magenta (M) and yellow (Y) inks. In the masks of this embodiment, the interference between each mask and the dot arrangement pattern obtained by index data is reduced likewise as in the first embodiment and the interference between the mask and other masks is also reduced. This especially can reduce the occurrence of beading formed by aggregation of ink droplets ejected during a plurality of scanning.

In this embodiment, the order of printing is first-pass for cyan, first-pass for magenta, first-pass for yellow, second-pass for yellow, second-pass for magenta, second-pass for cyan, third pass for cyan, . . . , forth-pass for cyan. According to this order, the order of masks to be used is C1, M1, Y1, Y2, M2, C2, C3, M3, Y3, Y4, M4 and C4. In this embodiment, since mask patterns are dispersed between respective masks as mentioned above, dots formed during a plurality of scanning are highly dispersed in an image, thus suppressing the occurrence of beading.

(Method for Creating Mask)

In the method for creating the mask in this embodiment, print permitting pixels are arranged on each mask by the plane-by-plane generation method and the sequential arrangement method mentioned above.

Figure 25:
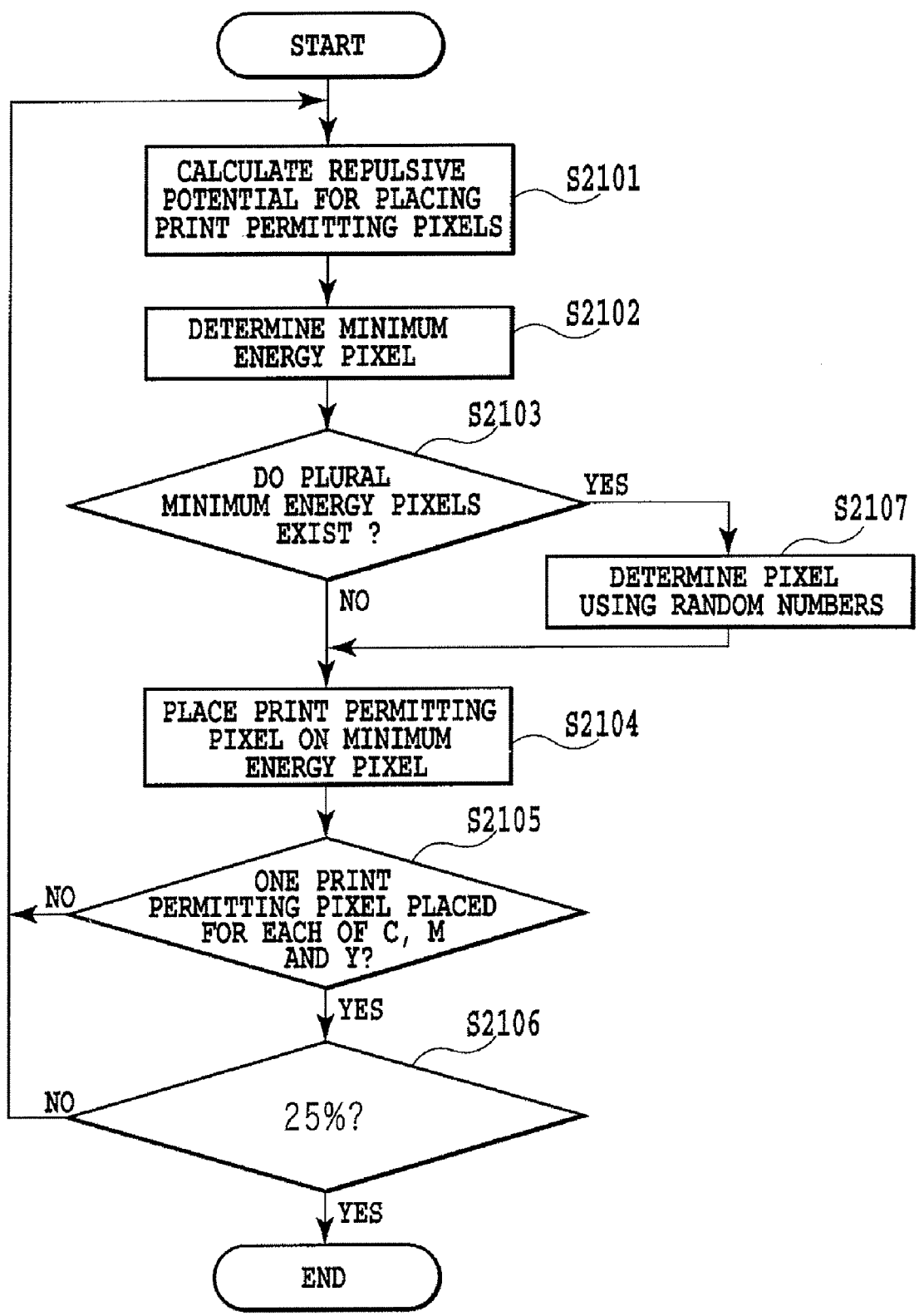
FIG. 25 is a flow chart showing arrangement determination processing of print permitting pixels according to a sequential arrangement method in a second embodiment of the present invention.

FIG. 25 is a flow chart showing mask creation processing according to this embodiment. The basic processing is the same as that of the first embodiment described in reference with FIG. 9. Mask creation processing in the second embodiment is different form the first embodiment, in that a mask on which the arrangement is determined is created for a plurality of planes (C, M and Y) in the second embodiment (S2105) and that when an print permitting pixel of interest is placed on a pixel with the lowest repulsive potential, the mask pattern for the pass that has already been created is fixed in the second embodiment (S2102). Furthermore, since the masks are provided for four-pass printing, it is needless to say that above-mentioned creation processing are repeated for respective colors and masks for 3-pass (C1, C2, C3; Y1, Y2, Y3; M1, M2, M3).

Figure 26:
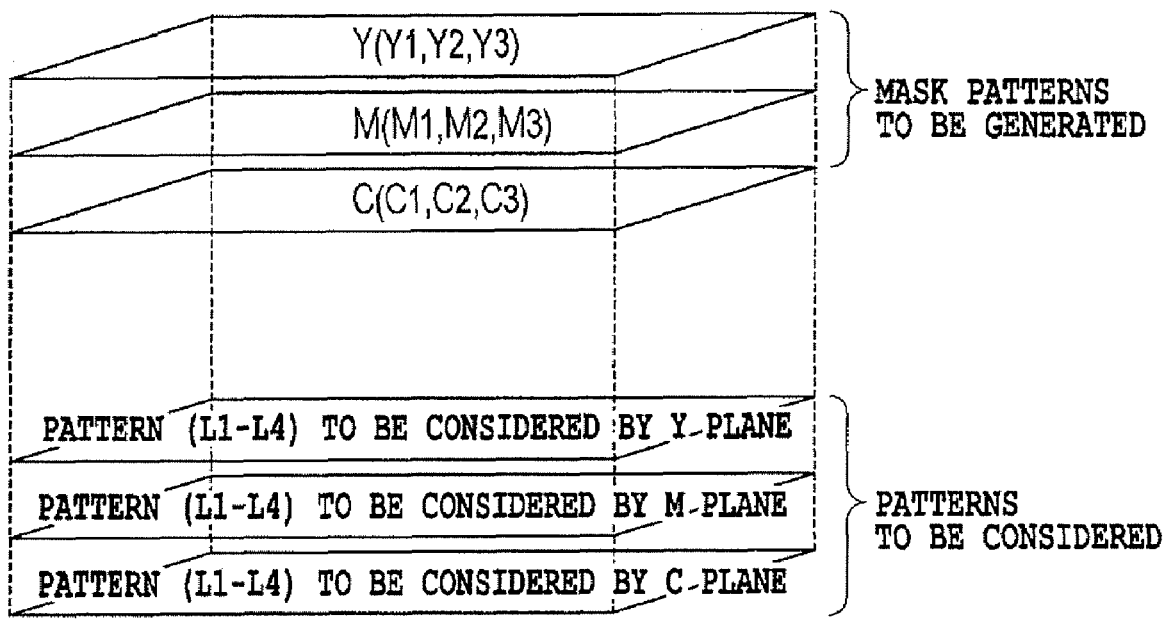
FIG. 26 is a schematic diagram showing the generation of mask patterns for each color in the second embodiment.

If there is more than one mask on which the arrangement is to be determined by calculating repulsive force, in generating the mask pattern for each color, repulsive potential is calculated in considering the dot arrangement pattern corresponding to the color, as shown in FIG. 26. For example, when generating a mask of Y, repulsive potential is calculated between the dot arrangement pattern of Y and the mask patterns of M and C.

In the case of generating the mask of Y, print permitting pixels of the mask Y may be determined by calculating the repulsive potential between the dot arrangement patterns of M, C and Y and the mask patterns of M and C. The effect of suppressing the interference of the mask Y generated and the dot arrangement pattern of Y, however, becomes less than that of above-mentioned method.

The pattern to be considered for generating the mask pattern for each color is the dot arrangement pattern for each color likewise as in the first embodiment. Therefore, it is obvious that the present invention can be applied to the case in which the dot arrangement patterns of respective colors are the same and also can be applied to the case in which the dot arrangement patterns of respective colors are different.

Figure 27:
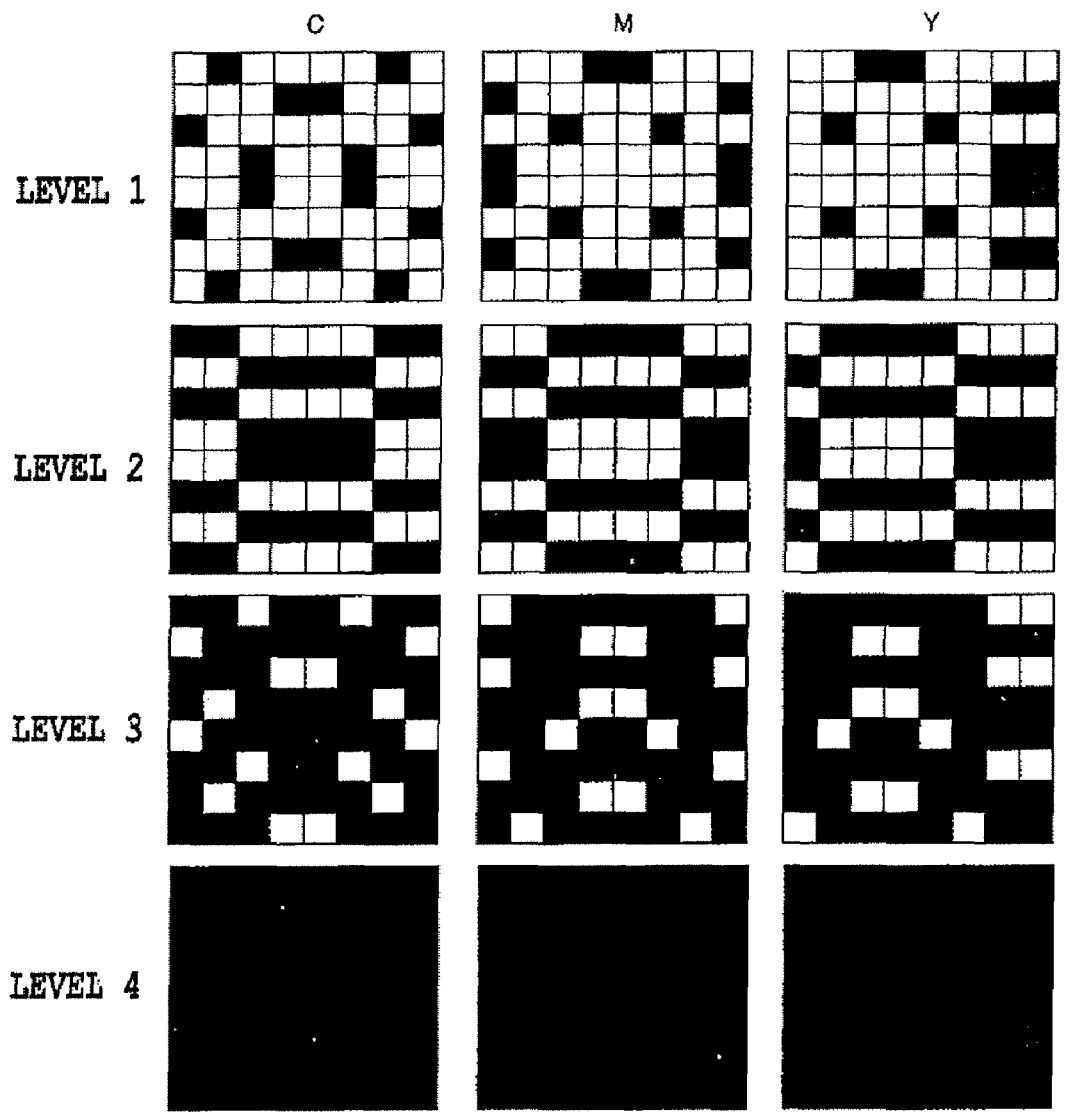
FIG. 27 is a diagram showing dot arrangement patterns in the second embodiment.
Figure 28:
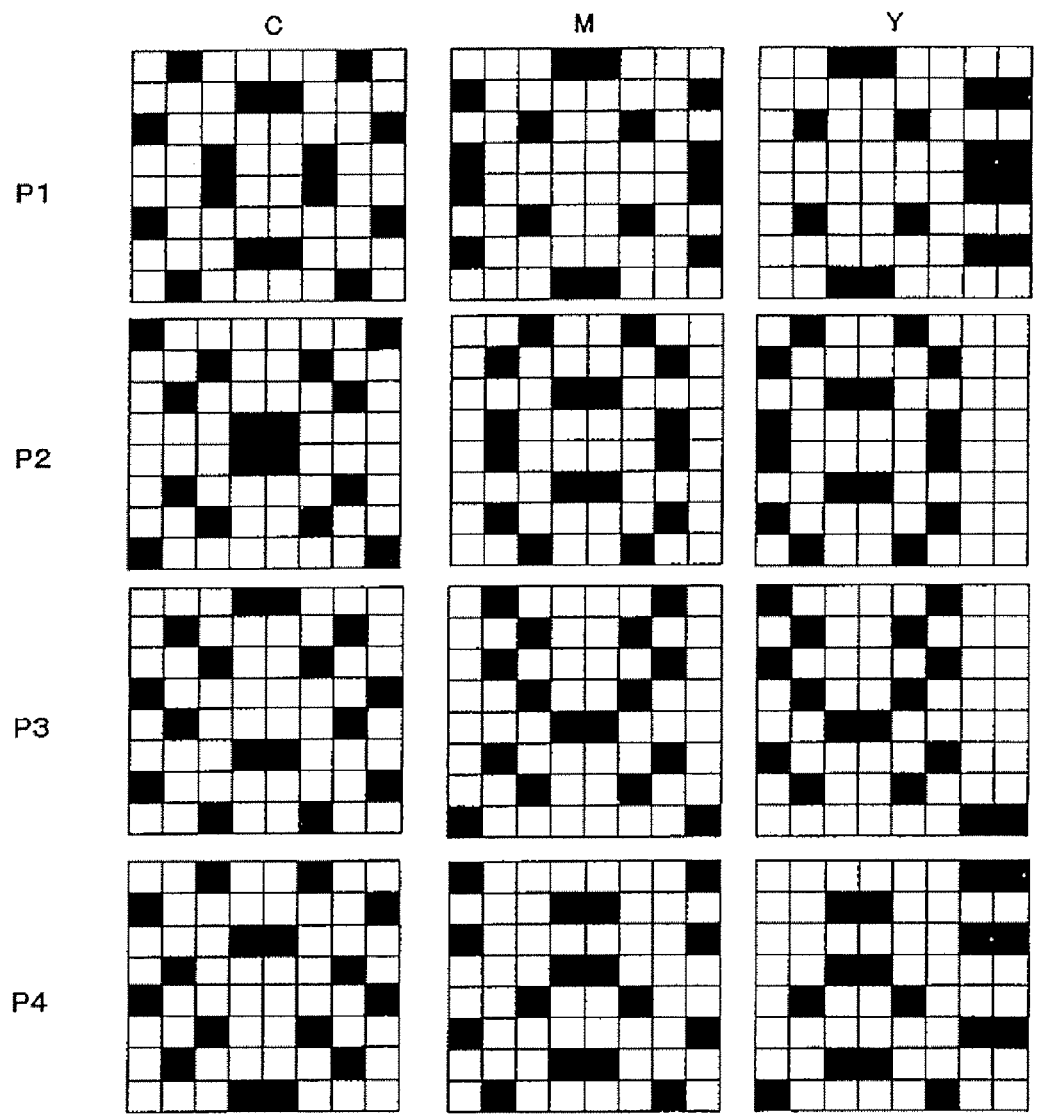
FIG. 28 is a diagram illustrating the patterns to be considered in generating a mask in the second embodiment.

FIG. 27 is a diagram showing dot arrangement patterns used in this embodiment. In this embodiment, as shown in this Figure, different dot arrangement patterns are used for respective colors. The patterns used for the actual calculation of repulsive potential are shown in FIG. 28. As described above regarding the first embodiment, the dot arrangements shown in FIG. 28 are the patterns that represent the difference between dot arrangement patterns of different levels and the dot arrangements in respective planes are exclusive each other.

(Evaluation of Mask Characteristic)

Figure 29:
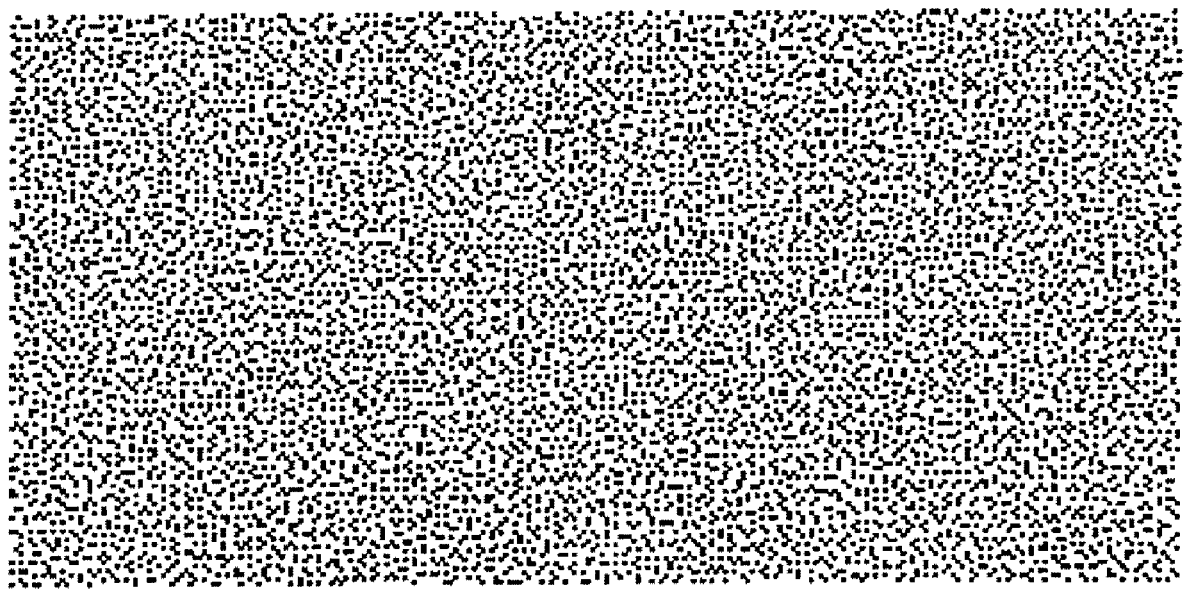
FIG. 29 is a view showing a mask pattern C in the second embodiment.
Figure 30:
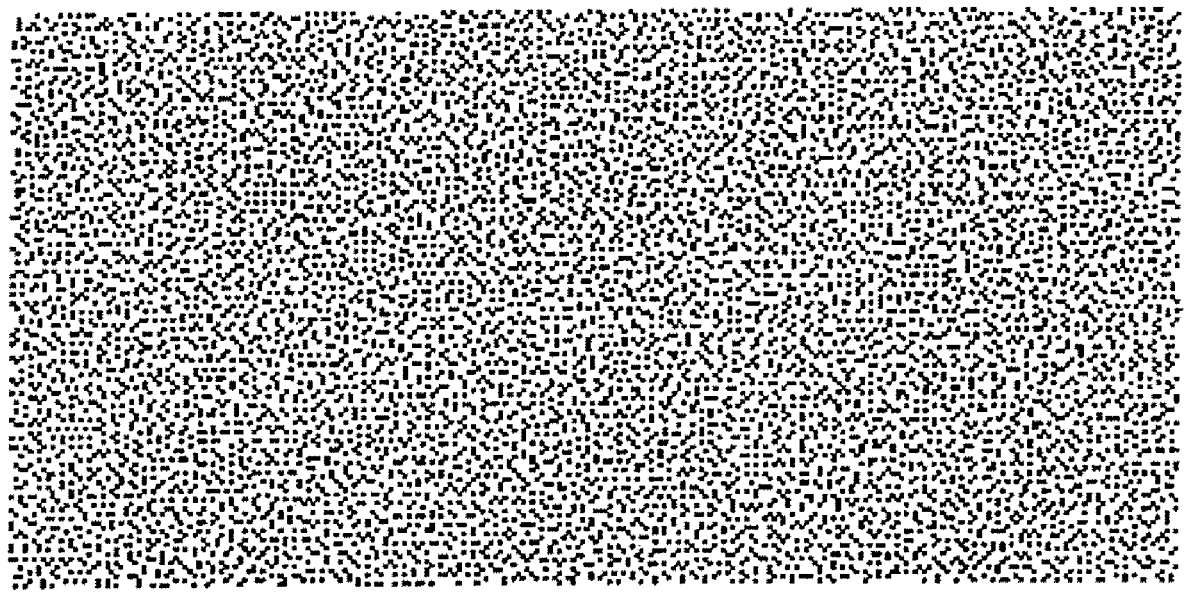
FIG. 30 is a view showing a mask pattern M in the second embodiment.
Figure 31:
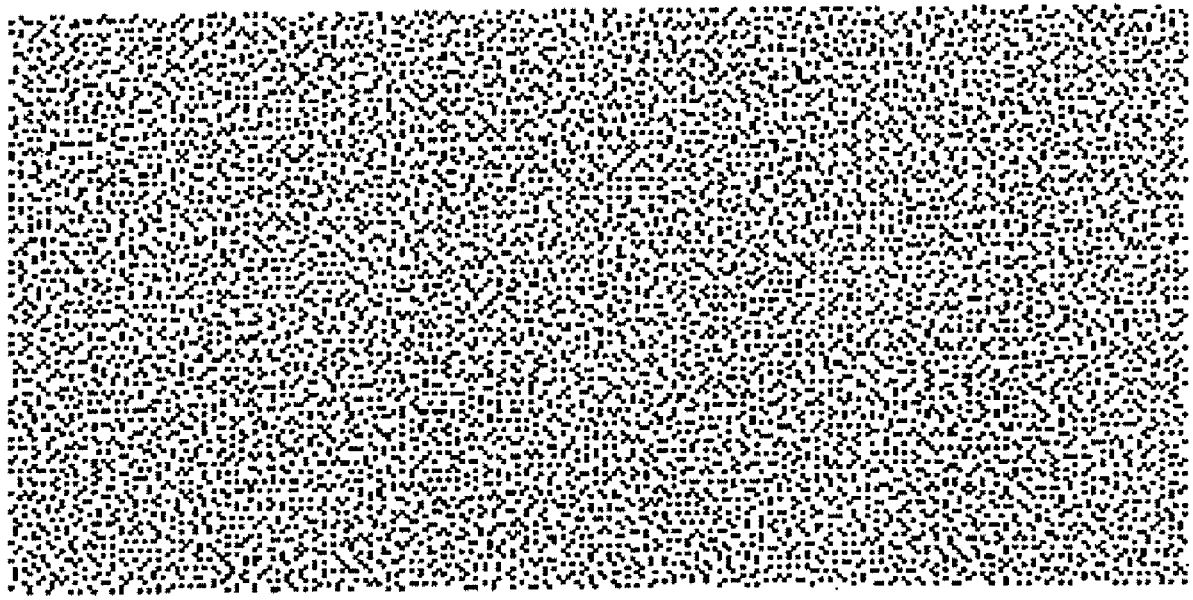
FIG. 31 is a view showing a mask pattern Y in the second embodiment.

FIGS. 29 to 31 respectively show the arrangement patterns of print permitting pixels on one plane of pattern-considered-type layer masks C1, M1 and Y1 of this embodiment, created by above-mentioned method according to this embodiment. Each mask pattern has the region of 128 pixels×256 pixels. As shown in these Figures, print permitting pixels are arranged in good dispersibility in the masks of all planes.

Figure 32:
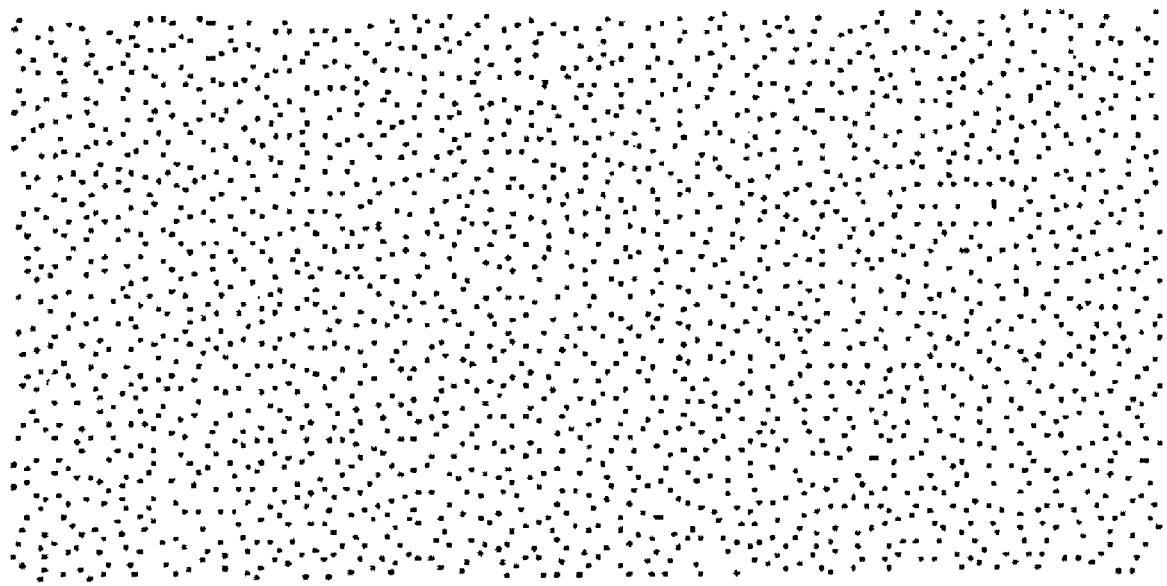
FIG. 32 is a view showing the dot pattern of the logical product of the pattern-considered-type layer mask C1 and the cyan dot arrangement of level 1 in the second embodiment.
Figure 33:
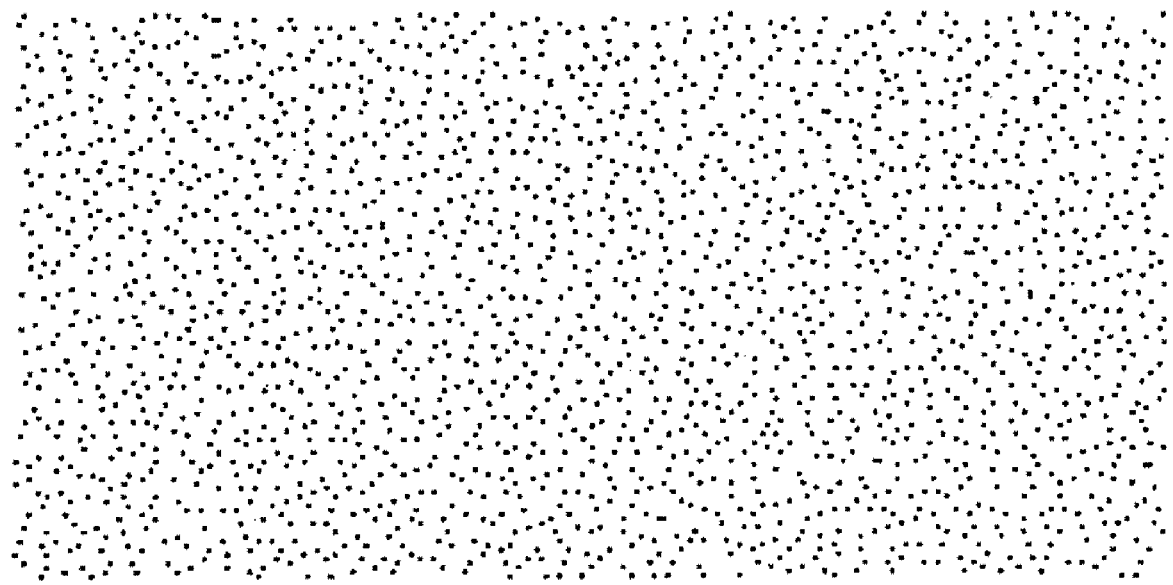
FIG. 33 is a view showing the dot pattern of the logical product of the pattern-considered-type layer mask M1 and the cyan dot arrangement of level 1 in the second embodiment.
Figure 34:
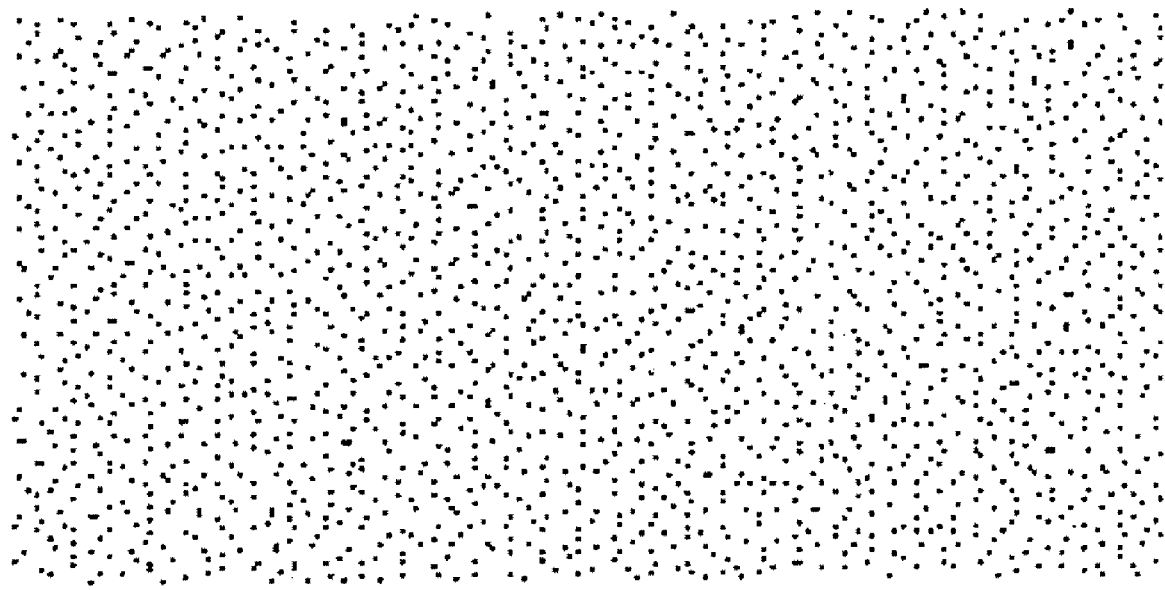
FIG. 34 is a view showing the dot pattern of the logical product of the pattern-considered-type layer mask Y1 and the cyan dot arrangement of level 1 in the second embodiment.

FIGS. 32 to 34 respectively show the dot patterns formed in first-pass when patterns of level 1 shown in FIG. 27 are printed by using above mentioned masks C1, M1 and Y1. That is, they are dot patterns, each showing the logical product of the arrangement of print permitting pixels of each of pattern-considered-type layer masks C1, M1 and Y1 and each of dot arrangements of level 1 shown in FIG. 27.

As seen from FIGS. 32 to 34, the logical product of each mask and the dot arrangement pattern corresponding to the mask, i.e. the dot arrangement pattern obtained by mask-processing is well dispersed. As to the masks for second-pass and third-pass C2, C3, Y2, Y3, M2 and M3, dot arrangements are also well dispersed. This is because repulsive potential is calculated between each of these masks and the dot arrangement patterns corresponding to each of these masks.

Figure 35:
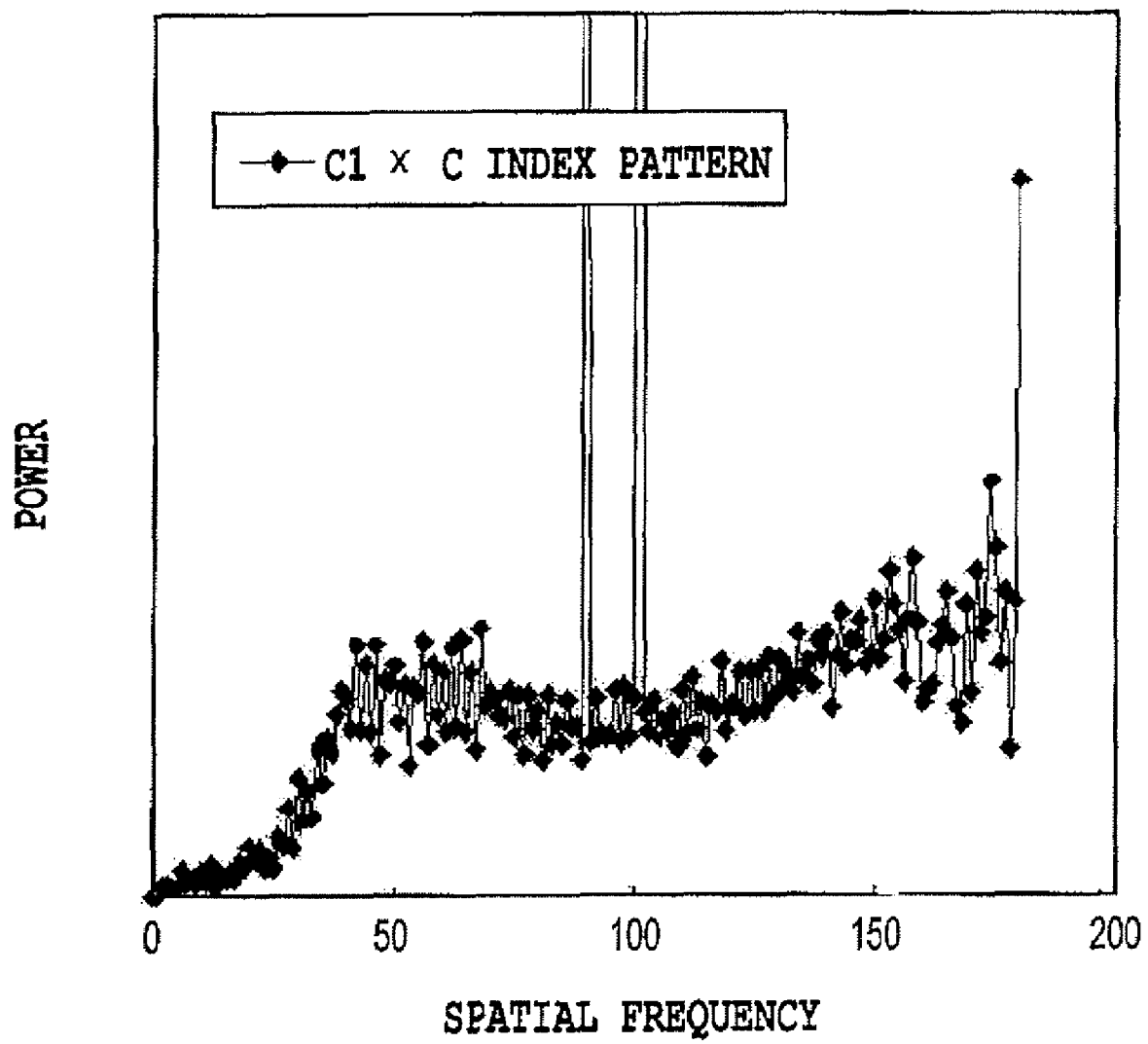
FIG. 35 is a graph illustrating the frequency characteristics of respective dot patterns (logical product patterns obtained by logical product of a mask pattern and dot arrangement pattern) formed by a single scanning when printing is performed by mask-processing dot arrangement patterns with a mask according to the second embodiment.

FIG. 35 is a graph showing a frequency characteristic of the logical product pattern of the dot arrangement pattern of predetermined level and respective masks C1. As shown in this Figure, the logical product pattern is a pattern in which the low frequency components are fewer than the high frequency components and the peaks substantially do not exist in the region lower side of one-fourth of the low frequency region. Thus, the biased arrangement of dots due to the interference of the mask pattern and the dot arrangement pattern hardly occurs and dots arranged by one scanning are well dispersed.

It should be noted that the masks of the Embodiment 2 is not limited to the masks in which the logical product pattern of the mask and the dot arrangement pattern are that shown in FIGS. 32 to 34. The mask patterns of the Embodiment 2 may be the mask pattern satisfying following characteristic (a) and any of characteristics (b1), (b2) and (b3), similarly to Embodiment 1. Further, the same is true on Embodiments 3 to 5.

(a) The frequency components in the low frequency region are fewer than the components in the high frequency region.

(b1) the power peaks do not exist in the region lower side of one-fourth of the low frequency region.

(b2) the power peaks do not exist in the region lower side of half of the low frequency region.

(b3) the power peaks do not exist in whole are of the low frequency region.

In this embodiment, when the arrangement of print permitting pixels of a mask is determined, repulsive potential between the mask and other masks is also calculated in order to consider the interference with other masks or dispersibility, likewise as the configuration disclosed in Japanese Patent Application No. 2005-197873 by the present applicant. This can increase the dispersibility of dots formed during scanning before the completion of an image, thus suppressing the occurrence of beading.

The beading is liable to occur especially in recent ink jet printing systems. In recent ink jet printing, the increase of printing speed, printing density and variety of ink types are significant, which causes the increase of the amount of ink applied per unit of time and per unit area of a printing medium. Under such a circumstance, ink absorption speed cannot catch up with ink applying speed even if the printing media can absorb all the amount of ink applied. Specifically, even if all the amount of ink applied is finally absorbed and a problem such as ink fixing property or smear does not occur, ink droplets that have not been absorbed yet contact each other, which may cause a problem in a printed image.

For example, consider the case in which a blue image represented by cyan and magenta inks is printed on a print medium with a glossy surface by using two-pass of the multi-pass printing. In many serial-type ink jet printing apparatuses, ejection openings for four basic colors—cyan, magenta, yellow and black—are arranged in parallel along the scanning direction of a print head. Therefore, each color is applied to the same area of the print medium by the same printing scanning. That is, in the above example, cyan dots corresponding to the image data thinned out to ½ of the original image and magenta dots corresponding to the image data thinned out to ½ of the original image are applied by the same printing scan with a slight time difference. At this time, if cyan and magenta dots are printed on the same printed pixel or adjacent pixels, they attract each other due to mutual surface tension and form a large dot of twice (or more) size of usual dot (hereinafter referred as grain). Once such a grain is generated, the ink droplets applied to the position adjacent to the grain by the subsequent scanning are liable to be attracted by the grain. That is, the first-formed grain gradually grows as a nucleus, finally forming a large grain. Such a grain noticeably appears mainly in the high density region where the amount of ink applied is high. In a uniform image region, such grains are randomly distributed and the adverse effect called as beading is recognized.

The phenomenon of above-mentioned grain does not occur only due to the surface tension between different color ink droplets. For example, if inter-reactive printing agents are printed by the same printing scanning, contacting droplets may be bonded by stronger chemical reaction to form the nucleus of a grain. Also in the configuration in which the same color ink is printed by using two nozzle arrays, grains are formed.

To deal with this problem, in this embodiment, the dispersibility between masks is also considered, thus enabling suppressing the grain formation.

Embodiment 3: 100% Gradation Mask for Two-Pass Printing

A third embodiment of the present invention relates to reducing the interference or increasing dispersibility between a gradation mask and a dot arrangement pattern in the case of using the gradation mask. Specifically, likewise as above-mentioned embodiments, repulsive potential between the gradation mask of this embodiment and the dot arrangement pattern is calculated to determine the arrangement of print permitting pixels.

Figure 36B:
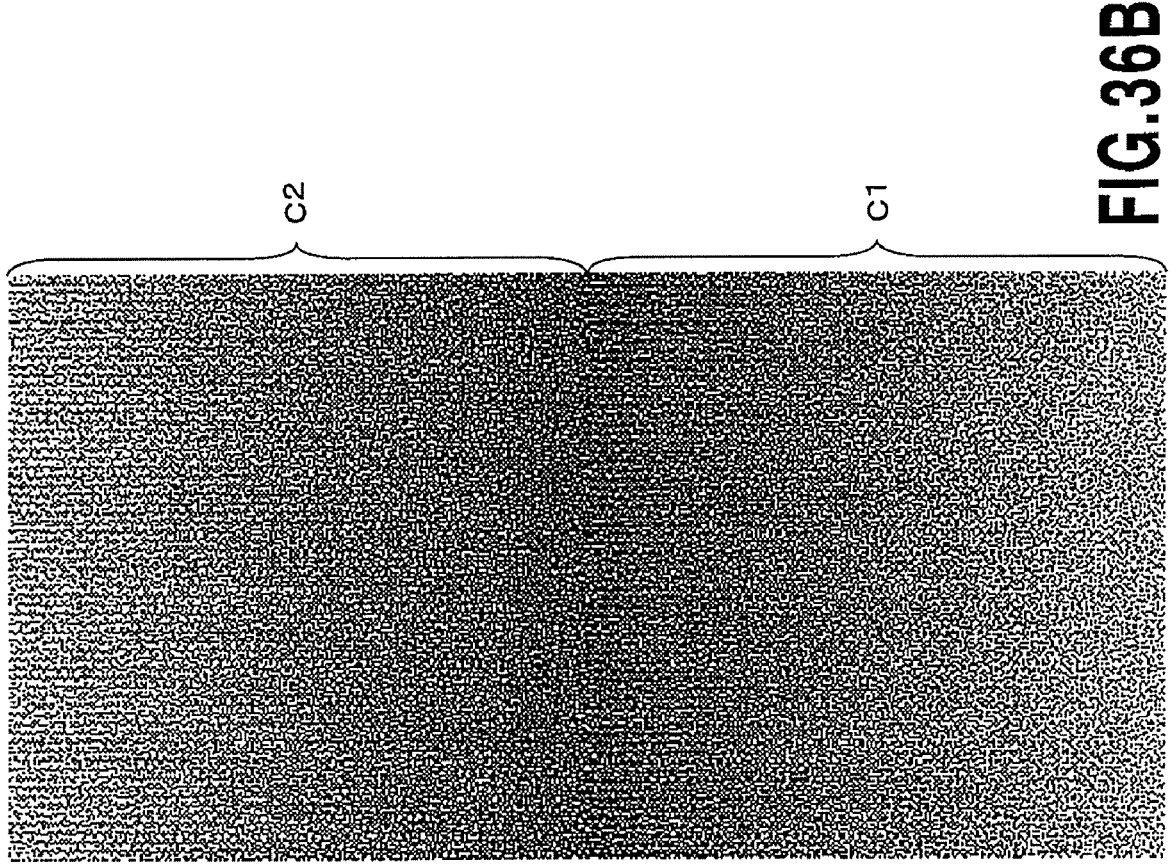
FIGS. 36A and 36B are views showing print ratios corresponding to nozzle positions of a gradation mask and a mask pattern of two-pass printing thereof respectively, in a third embodiment of the present invention.
Figure 36A:
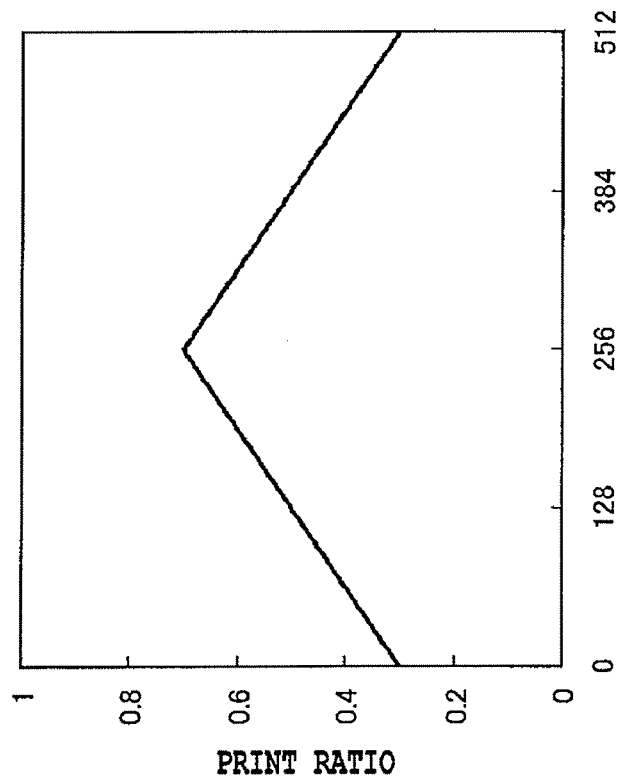

FIGS. 36A and 36B are views respectively showing the print ratio (ratio of print permitting pixels arranged in a predetermined region) corresponding to nozzle positions of a gradation mask and a mask pattern thereof for two-pass printing. In this embodiment, the number of print permitting pixels that meet the print ratio corresponding to each nozzle number is arranged. The planes of dot arrangement patterns to be considered for calculating repulsive potential are four planes P1, P2, P3 and P4 shown in FIG. 12, likewise as in the first embodiment.

In FIGS. 36A and 36B, in each scanning of two-pass printing, nozzles of No. 0 to 255 correspond to the mask C2 and nozzles of No. 256 to 511 correspond to the mask C1.

A method for creating masks is basically same as that of the first embodiment, except that in placing the print permitting pixel on the pixel with minimum energy, if the number of print permitting pixels in a raster including the pixel with minimum energy exceed the number of allocable print permitting pixels for that raster, which is determined depending on the print ratio corresponding to each nozzle, the print permitting pixel is placed on the pixel with next lowest energy in the raster which has the pixel with the next lowest energy and is within the limitation of the number of allocable print permitting pixels. This enables each raster to have different print ratio and also enables the highly dispersed gradation mask that considers the dot arrangement pattern to be obtained.

Embodiment 4: 150% Even Mask for Two-Pass Printing

The present invention can also be applied to a plurality of masks in which the combined print ratio of the plurality of masks that are complementary each other exceeds 100%. A forth embodiment of the present invention relates to the mask in which two same color planes used for two-pass printing, each having 75% of print ratio, have 150% of print ratio in total.

A method for creating the mask of this embodiment can be performed fundamentally likewise as the first embodiment. This embodiment is different from the first embodiment, in that, after creating the mask pattern of 75% print ratio for first-pass, the mask for second-pass is not created by arranging print permitting pixels on the exclusive position. That is, the mask pattern of 75% print ratio for second-pass is also generated by repeating the same processing as that used for the mask for first-pass.

The creation of the mask will now be described in detail, using the sequential arrangement method. Basically, the same processing as that shown in FIG. 9 in accordance with the first embodiment is performed. The processing is different in that the determination process similar to step S705 determines if print permitting pixels are arranged up to 75% or not. In addition, as to the creation of the mask for second pass, in the process similar to step S704 shown in FIG. 9, overlapping of printing pixels of different planes of the same color is not prohibited when print permitting pixels are arranged. That is, in attempting to place a print permitting pixel on the position with the lowest energy, even if they overlap the print permitting pixels of a different plane of the same color in the position, it is still placed there. This can generate a mask with 150% print ratio exceeding 100% by overlapping of 2 masks.

Figure 37B:
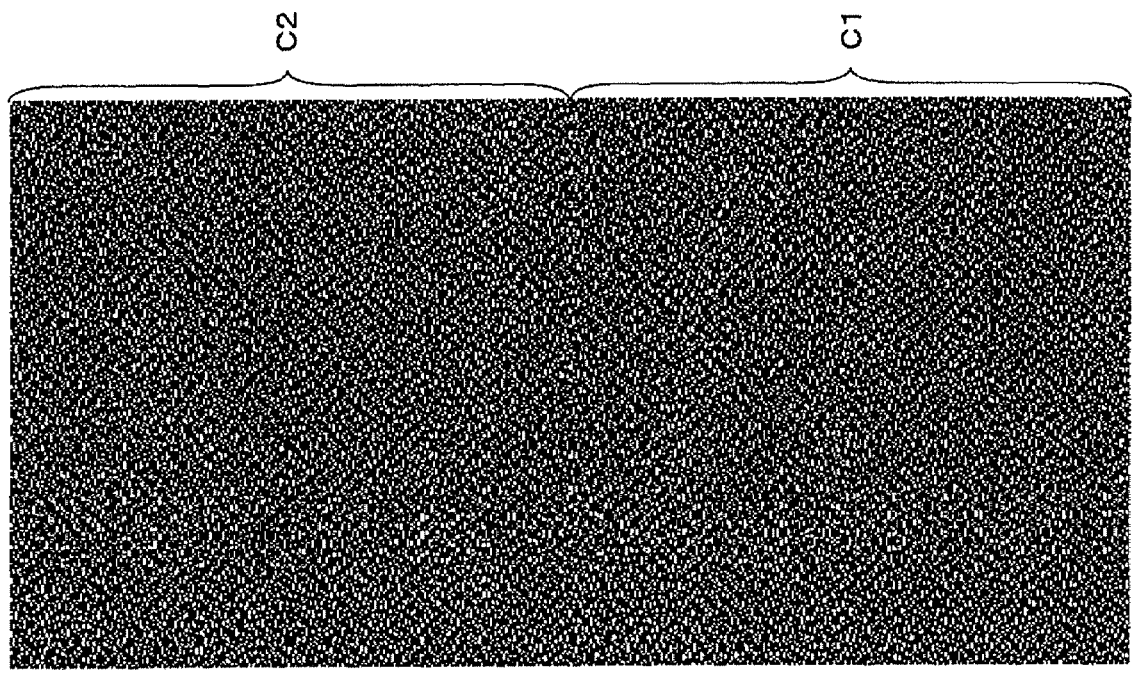
FIGS. 37A and 37B are views showing the print ratios corresponding to respective nozzles of a two-pass 150% uniform mask and the actual mask pattern thereof respectively, in a fourth embodiment of the present invention.
Figure 37A:
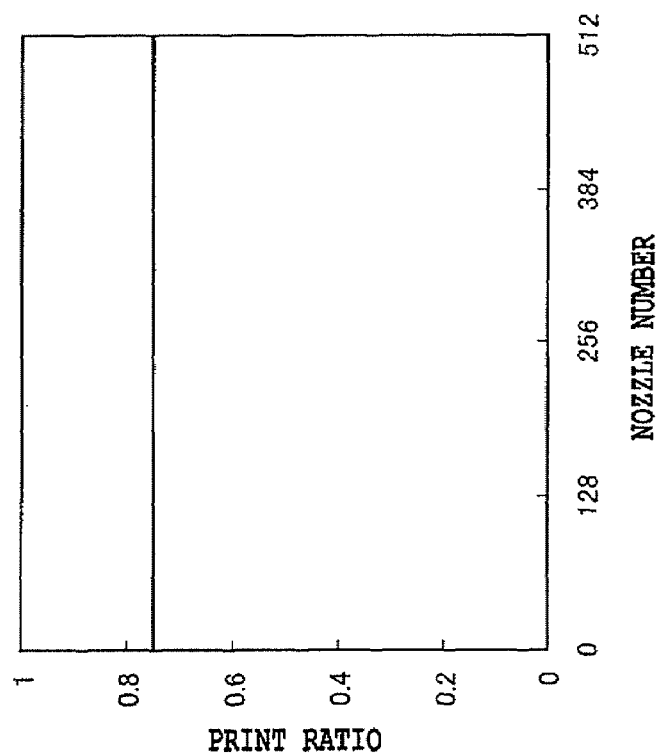

FIGS. 37A and 37B respectively show the print ratio corresponding to each nozzle of a two-pass 150% even mask in this embodiment and the actual mask pattern thereof. The patterns considered are the patterns shown in FIG. 10 likewise as in the first embodiment.

Figure 38:
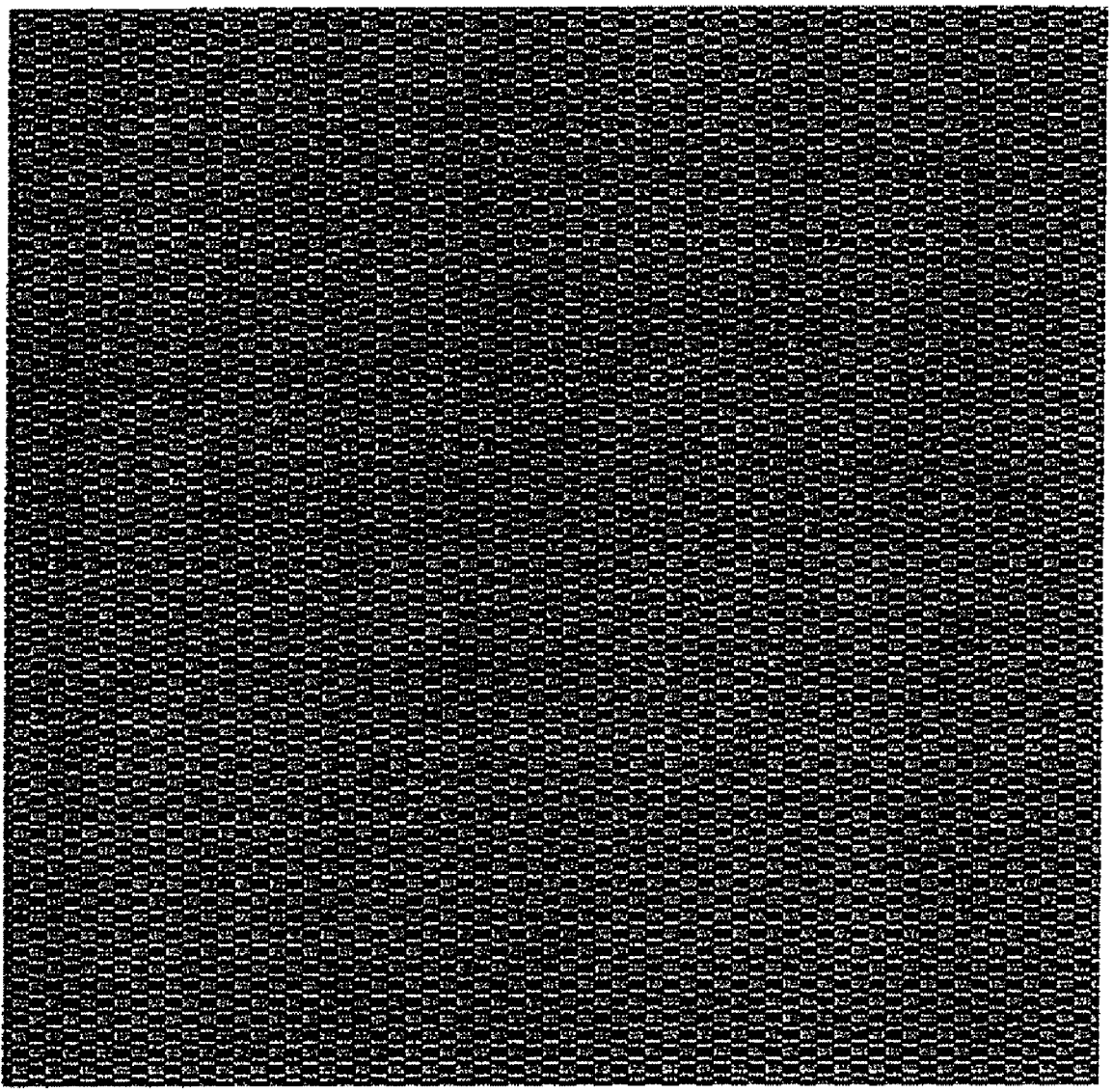
FIG. 38 is a view showing the logical addition of C1 and C2 shown in FIG. 37B in accordance with the fourth embodiment.

FIG. 38 shows the logical sum of the masks C1 and C2 shown in FIG. 37B. In FIG. 38, pixels represented by black are pixels of two overlapping dots; pixels represented by gray are pixels of one dot. The pixels of two overlapping dots are specified beforehand and a mask is created.

Figure 39:
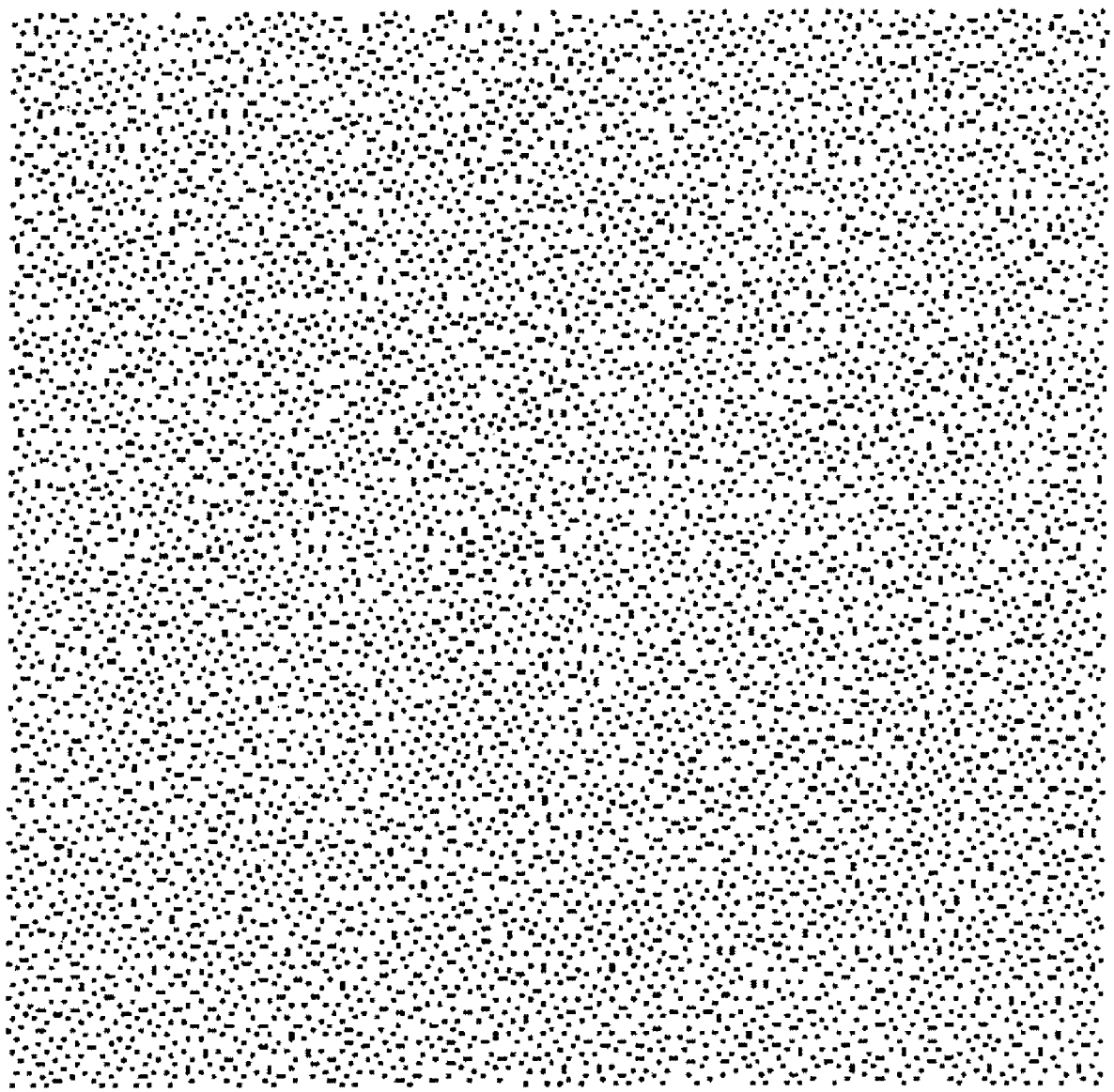
FIG. 39 is a view showing the dot arrangement of the logical product of the mask pattern shown in FIG. 37 in the fourth embodiment and the dot arrangement pattern of level 1 used in this embodiment.

FIG. 39 shows the dot arrangement of the logical product of the mask pattern shown in FIG. 37B and the dot arrangement pattern of level 1 used in this embodiment i.e. the dot arrangement pattern formed by a single pass when the level of an image data is in level 1. As seen from this Figure, in a dot pattern formed by a single scanning, dots are not unevenly distributed and are well dispersed.

Embodiment 5: Mask of m×n Cluster Size

A fifth embodiment of the present invention relates to the creation of a cluster mask in which m×n print permitting pixels is regarded as one unit. Here, m indicates the number of pixels that are consecutive in the main scanning direction; n indicates the number of pixels that are consecutive in the sub-scanning direction.

In this embodiment, a 100% uniform mask for two-pass printing is described in the case of the cluster size of 2×2 pixels. The method for creating the mask according to this embodiment is basically performed likewise as in the first embodiment.

FIG. 40A shows the dot arrangement patterns used in this embodiment. The patterns shown in FIG. 40A are similar to those shown in FIG. 11 in that the patterns, each having the size of 8×8 pixels with 2×2 pixels being as a unit, are used repeatedly. However, the content and arrangement pattern of the 2×2 pixel units are different from those of patterns shown in FIG. 11. Specifically, in any of patterns of levels 1 to 3, when the 2×2 pixel units are classified into A, B, C and D by their dot arrangement shown in FIG. 40B, the orders of arrangement of A, B, C and D are different.

FIG. 41 shows four planes to be considered in creating the mask in this embodiment, based on the dot arrangement patterns shown in FIG. 40A. As shown in the FIG. 41, in any of the planes P1 to P4, the 2 pixels×2 pixels area is regarded as a unit of dots, corresponding to the cluster mask size to be created. The relation of the arrangement of dot units on these planes is exclusive or complementary each other. This enables well-dispersed arrangement of print permitting pixels without uneven distribution thereof to be obtained, when the arrangement of print permitting pixels is determined in the cluster mask of this embodiment by calculating repulsive potential between the mask and these planes.

Figure 42:
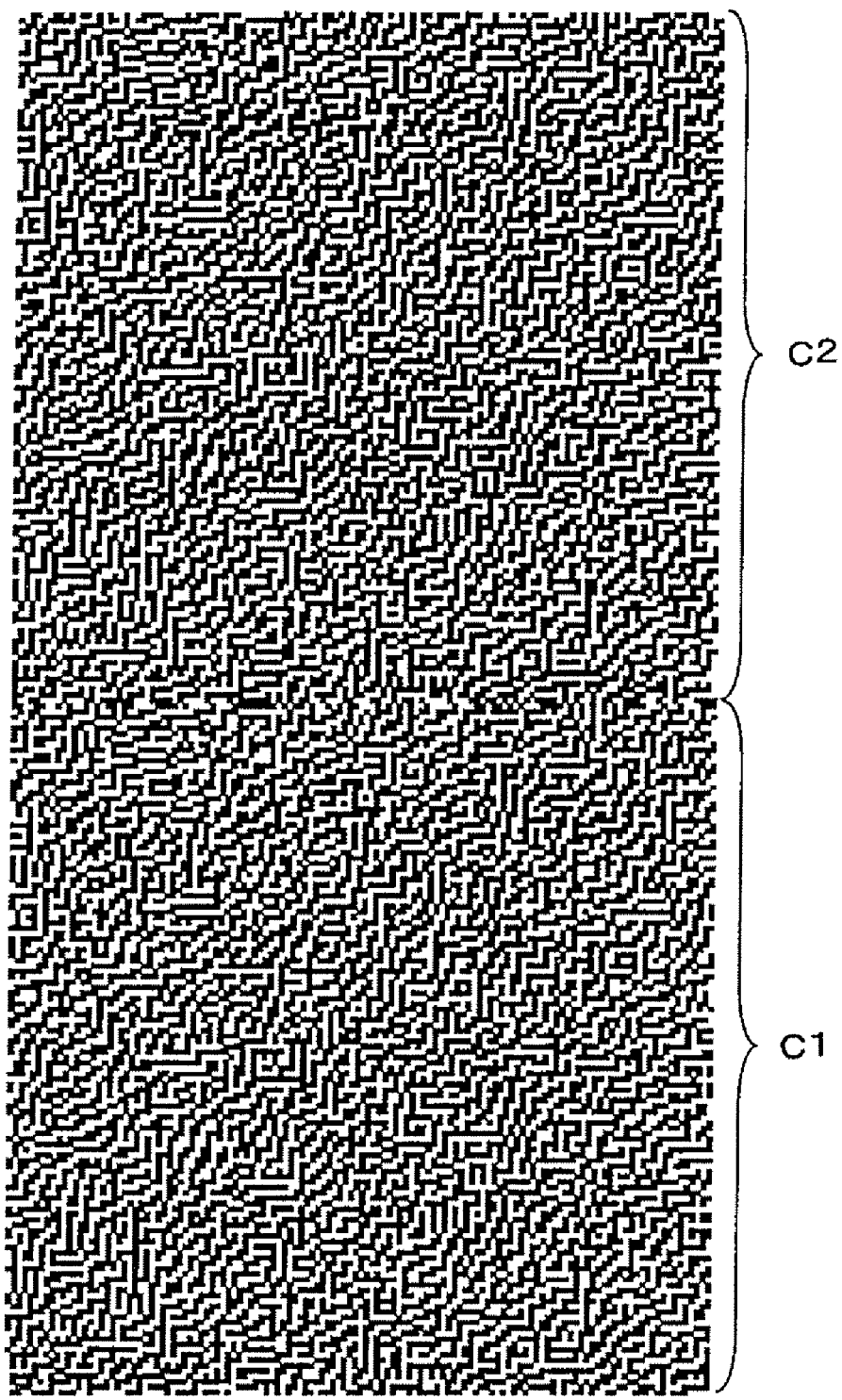
FIG. 42 is a view showing a mask pattern of 2×2 cluster size created in the fifth embodiment.
Figure 43:
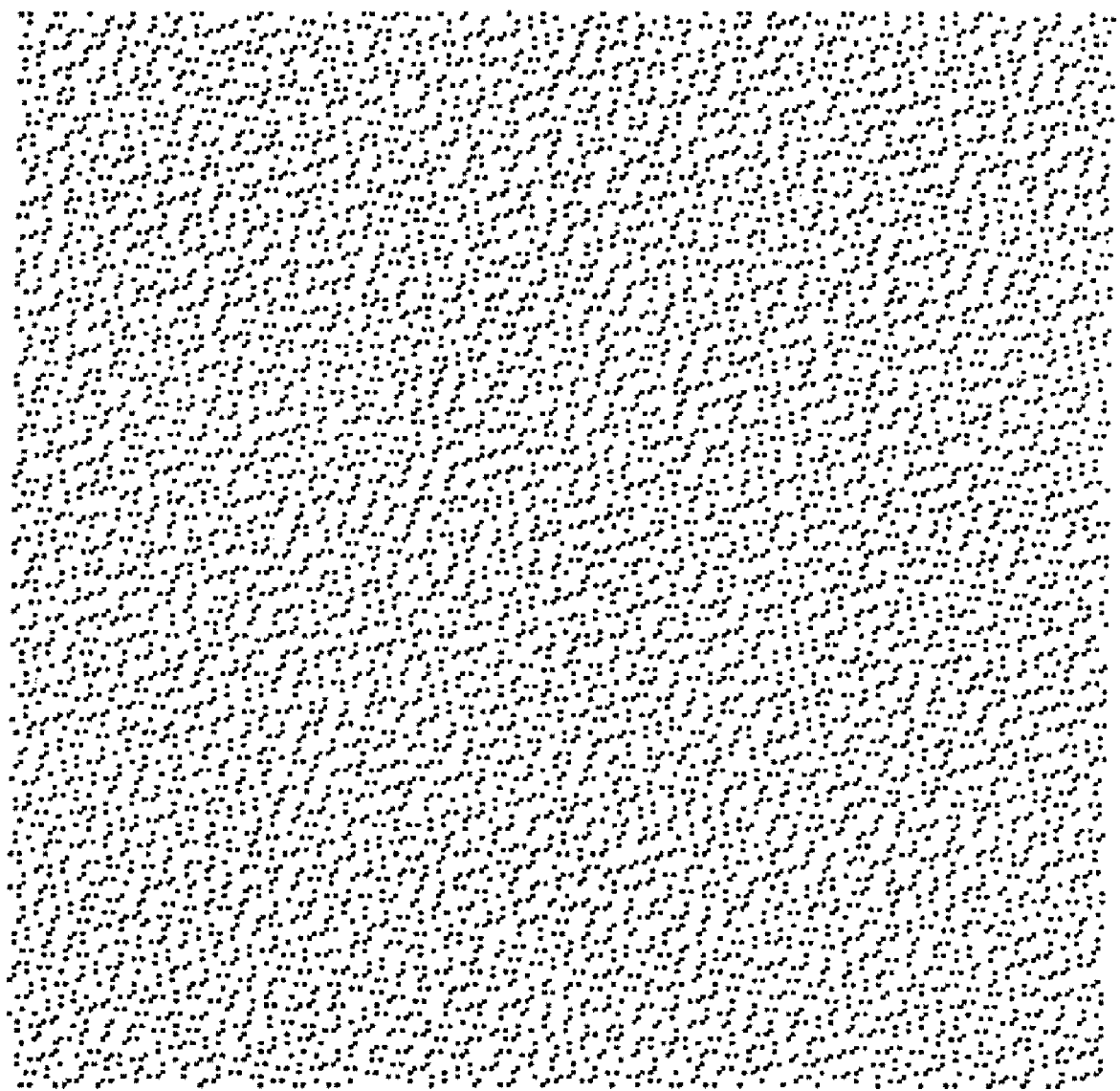
FIG. 43 is a view showing a dot pattern printed by a single scanning when the mask pattern shown in FIG. 42 created in the fifth embodiment is used.

FIG. 42 shows the mask C1 created by considering four planes P1 to P4 and the mask C2 that is complementary with the mask C1. FIG. 43 shows the dot pattern formed when the dot arrangement pattern shown in FIG. 40A is subjected to mask-processing by using the mask C shown in FIG. 42. As seen from this Figure, in the formed dot pattern, dots are well dispersed without uneven distribution of dots in number.

As described above, also in the cluster mask, dots formed are not unevenly distributed in number and the dispersibility in the pattern is increased by considering the dot arrangement pattern. This high dispersibility makes texture, even if it occurs, visually unobtrusive, thus suppressing adverse effects on image quality.

Although the mask employing 2 pixels×2 pixels as one unit was described as an example of a cluster mask employing m pixels×n pixels as one unit, this embodiment is not limited to the mask employing 2×2 pixels. For example, a mask employing 1×2 pixels as one unit or a mask employing 2×4 pixels as one unit also can be used. As to the values of m and n, both m and n should be positive integers and at least either m or n should be an integer of two or more.

Other Embodiments

In above-mentioned embodiments, print permitting pixels in a mask pattern are determined by considering the dot arrangement patterns corresponding to all of gradation levels 1 to 4. However, the present invention is not limited to these embodiments. For example, print permitting pixels in a mask pattern may be determined by considering the dot pattern corresponding to levels 1-3, levels 1 and 2, or level 1 among 4 levels. In these cases, although the dispersibility of dots is lower than that in the case where dot arrangement patterns corresponding to all levels are considered, the dispersibility of dots is higher than that in the case where any dot arrangement pattern is not considered. Therefore, any manner in which the arrangement of print permitting pixels in a mask pattern is determined by considering the dot arrangement pattern corresponding to at least one gradation level should be within the scope of the present invention.

Although, in above-mentioned embodiments, the cases in which the dot arrangement pattern corresponding to gradation levels are used are described, the application of the present invention is not limited to these cases. For example, if recoding data is formed by the pattern with a repetitive cycle, the same effect as mentioned above can be obtained by creating a mask considering the cycle pattern.

Further, although two-pass and four-pass printings are described in above-mentioned embodiments, it is obvious from the description above that the present invention can be applied to the pass of any number. Although the mask used for two-pass printing is described for only 1 color, it is needless to say that a mask is not limited to this mask. For example, the present invention also can be applied to the mask of each of C, M and Y for two-pass printing. It is also obvious from the creation of the mask of the second embodiment described in reference with FIG. 26.

Furthermore, although a recoding device (printer) functions as the data processing apparatus of the present invention and performs mask processing and the related processing in above-mentioned embodiments, it is obvious that the application of the present invention is not limited to this configuration. For example, a data supplying device (for example, the host apparatus shown in FIG. 3 or 4) for supplying binary data generated by mask processing used for each scanning to a printer may function as the data processing apparatus of the present invention and performs mask-processing by using the mask described in above-mentioned embodiments.

Further, the present invention is put into practice by executing program codes of software such as those shown in FIGS. 9 and 25, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-108906, filed Apr. 11, 2006, which is hereby incorporated by reference herein in its entirety.

What is claimed is:

1. A data processing apparatus, comprising:
mask processing means for performing a mask process for binary data, which is obtained by a binarization process using a dot arrangement pattern, by using mask patterns having print permitting pixels to generate binary data used for each of a plurality of scans of a print head to a same area of a print medium,
wherein a logical product pattern obtained by a logical product operation of an arrangement pattern of the print permitting pixels in at least one of the mask patterns and the dot arrangement pattern satisfies following characteristics;
(a) frequency components of a low frequency region are fewer than that of a high frequency region; and
(b) peaks of the frequency components do not exist in a region lower side of half of the low frequency region.

2. A data processing apparatus as claimed in claim 1, wherein the mask patterns are respective mask patterns used for three or more scans for a same color, and
frequency components of the low frequency component region in logical product patterns, which are obtained by logical products of respective arrangement patterns of the print permitting pixels of the mask patterns used for the three or more scans, are fewer than that of the high frequency component region.

3. A data processing apparatus as claimed in claim 1, wherein the mask patterns are respective mask patterns used for different colors, and
frequency components of the low frequency component region in logical product patterns, which are obtained by logical products of respective arrangement patterns of the print permitting pixels of the mask patterns for the different colors, are fewer than that of the high frequency component region.

4. A data processing apparatus as claimed in claim 1, wherein ratios of the print permitting pixels of the mask pattern have bias along an arrangement direction of a plurality of printing elements in the print head.

5. A data processing apparatus as claimed in claim 1, wherein each of the mask patterns used for the plurality of scans to the same area has print permitting pixels in which a total of the ratios of the print permitting pixels is greater than 100%.

6. A data processing apparatus as claimed in claim 1, wherein the mask pattern has the arrangement of the print permitting pixels in which m pixels ×n pixels are arranged as a unit of arrangement of the print permitting pixels.

7. A data processing apparatus as claimed in claim 1, further comprising a memory for storing the mask patterns,
wherein said mask processing means executes a logical product operation using the mask patterns read from said memory and the binary data which is binarized by using the dot arrangement pattern to generate the binary data used for each of the plurality of scans.

8. A data processing apparatus as claimed in claim 1, wherein said data processing apparatus is a printing apparatus that performs printing by means of the print head, based on binary data used for each of the plurality of scans.

9. A data processing apparatus as claimed in claim 1, wherein said data processing apparatus is a data supply apparatus that supplies binary data generated by the mask processing to a printing apparatus that performs printing by means of the print head, based on binary data used for each of the plurality of scans.

10. A data processing apparatus, comprising:
mask processing means for performing a mask process for binary data, which is obtained by a binarization process using a dot arrangement pattern, by using mask patterns having print permitting pixels to generate binary data used for each of a plurality of scans of a print head to a same area of a print medium,
wherein a logical product pattern obtained by a logical product operation of an arrangement pattern of the print permitting pixels in at least one of the mask patterns and the dot arrangement pattern satisfies following characteristics;
(a) frequency components of a low frequency region are fewer than that of a high frequency region; and
(b) peaks of the frequency components do not exist in a region lower side of one-fourth of the low frequency region.

11. A data processing apparatus, comprising:
mask processing means for performing a mask process for binary data, which is obtained by a binarization process using a dot arrangement pattern, by using mask patterns having print permitting pixels to generate binary data used for each of a plurality of scans of a print head to a same area of a print medium,
wherein a logical product pattern obtained by a logical product operation of an arrangement pattern of the print permitting pixels in at least one of the mask patterns and the dot arrangement pattern satisfies following characteristics;
(a) frequency components of a low frequency region are fewer than that of a high frequency region; and
(b) peaks of the frequency components do not exist in a whole area of the low frequency region.

12. A data processing apparatus, comprising:
mask processing means for performing a mask process for binary data, which is obtained by a binarization process using a plurality of dot arrangement patterns which correspond to different gradation levels, by using mask patterns having arrangements of print permitting pixels to generate binary data used for each of a plurality of scans of a print head to same area of a print medium,
wherein a logical product pattern obtained by a logical product operation of an arrangement pattern of the print permitting pixels in at least one of the mask patterns and each of the plurality of dot arrangement patterns satisfies following characteristics;
(a) frequency components of a low frequency region are fewer than that of a high frequency region;
(b) peaks of the frequency components do not exist in a region lower side of one-fourth of the low frequency region.

13. A data processing apparatus as claimed in claim 12, wherein the arrangement of the print permitting pixels in at least one of the mask patterns is determined based on a repulsive potential calculated between the arrangement of the print permitting pixels and a dot arrangement in each of a plurality of dot arrangement patterns for calculation, which are obtained based on the plurality of dot arrangement patterns and which include a plurality of patterns of which respective dot arrangements are exclusive each other.

14. A printing apparatus that performs printing by executing a plurality of scans of a print head to a same area of a print medium, said apparatus comprising:

mask processing means for performing a mask process for binary data, which is obtained by a binarization process using a dot arrangement pattern, by using mask patterns, in order to divide the binary data obtained by the binarization process using the dot arrangement pattern into binary data used for each of the plurality of scans, wherein a logical product pattern obtained by a logical product operation of an arrangement pattern of print permitting pixels in the mask pattern and the dot arrangement pattern has characteristics that frequency components of a low frequency region are fewer than that of a high frequency region and peaks of the frequency components do not exist in a region lower side of half of the low frequency region.

15. A printing apparatus that performs printing by executing a plurality of scans of a print head to a same area of a print medium, said apparatus comprising:

mask processing means for performing a mask process for binary data, which is obtained by a binarization process using a plurality of dot arrangement patterns which correspond to different gradation levels, by using mask patterns, in order to divide the binary data obtained by the binarization process using the plurality of dot arrangement patterns into binary data used for each of the plurality of scans, wherein a logical product pattern obtained by a logical product operation of an arrangement pattern of print permitting pixels in at least one of the mask patterns and at least one of the plurality of dot arrangement patterns has characteristics that frequency components of a low frequency region are fewer than that of a high frequency region and peaks of the frequency components do not exist in a region lower side of one-fourth of the low frequency region.

16. A method of creating a mask pattern used for performing a mask process for binary data, which is obtained by a binarization process using a plurality of dot arrangement patterns which correspond to different gradation levels, by using a mask pattern to generate binary data used for each of a plurality of scans of a print head to a same area of a print medium, said method comprising:

a determining step of determining an arrangement of print permitting pixels in the mask pattern, wherein said determining step determines the arrangement of print permitting pixels so that a logical product pattern obtained by a logical product operation of a pattern indicative of the arrangement of the print permitting pixels in the mask pattern and each of the plurality of dot arrangement patterns has a characteristic that low frequency components of the logical product pattern are decreased.

17. A method as claimed in claim 16, wherein said determining step determines the arrangement of the print permitting pixels in the mask pattern based on a repulsive potential calculated between the arrangement of the print permitting pixels and a dot arrangement in each of a plurality of dot arrangement patterns for calculation, which are obtained based on the plurality of dot arrangement patterns and which include a plurality of patterns of which respective dot arrangements are exclusive each other.

18. A method as claimed in claim 17, wherein said determining step includes a first step of, when placing the print permitting pixel on a position of the mask pattern, calculating the repulsive potential among the print permitting pixel to be placed on the position, other print permitting pixels and dots arranged in the dot arrangement patterns for calculation;

a second step of placing the print permitting pixels, each of which has been subjected to the repulsive potential calculation, on a position at which the repulsive potential is minimum; and a third step of repeating said first and second steps to place a number of print permitting pixels which corresponds to print ratio of the mask pattern being created.

19. A program that is read by an apparatus to cause the apparatus to function as a data processing apparatus, the program comprising:

a code for performing a mask process for binary data, which is obtained by a binarization process using a dot arrangement pattern, by using the mask patterns having print permitting pixels, wherein a logical product pattern obtained by a logical product operation of an arrangement pattern of the print permitting pixels in at least one of the mask patterns and the dot arrangement pattern has characteristics that frequency components of a low frequency region are fewer than that of a high frequency region and peaks of the frequency components do not exist in the low frequency region.

* * * * *